United States Patent [19]
Anderson et al.

[11] Patent Number: 6,021,333
[45] Date of Patent: *Feb. 1, 2000

[54] METHOD AND SYSTEM FOR TRANSFERRING INFORMATION WITHIN A MOBILE COMMUNICATION SYSTEM

[75] Inventors: Gary B. Anderson, Carnelian Bay, Calif.; Sherman Gavette; William D. Hetherington, both of Colorado Springs, Colo.

[73] Assignee: Omnipoint Corporation, Colorado Springs, Colo.

[*] Notice: This patent issued on a continued prosecution application filed under 37 CFR 1.53(d), and is subject to the twenty year patent term provisions of 35 U.S.C. 154(a)(2).

[21] Appl. No.: 08/532,466

[22] Filed: Sep. 22, 1995

Related U.S. Application Data

[63] Continuation-in-part of application No. 08/284,053, Aug. 1, 1994, which is a continuation-in-part of application No. 08/215,306, Mar. 21, 1994, abandoned, which is a continuation-in-part of application No. 08/146,496, Nov. 1, 1993, abandoned.

[51] Int. Cl.[7] .................................. H04Q 7/30
[52] U.S. Cl. ........................... 455/560; 455/517
[58] Field of Search ...................... 379/58, 59; 455/33.1, 455/560, 561, 445; 370/337, 335, 349, 545, 401

[56] References Cited

U.S. PATENT DOCUMENTS

| | | | |
|---|---|---|---|
| 4,748,655 | 5/1988 | Thrower | 379/57 |
| 5,128,928 | 7/1992 | Wilder et al. | 455/517 |
| 5,157,661 | 10/1992 | Kanai et al. | 370/95.1 |
| 5,212,724 | 5/1993 | Nazarenko | 379/58 |
| 5,239,545 | 8/1993 | Buchholz | 370/349 |
| 5,321,690 | 6/1994 | Sato | 455/561 |
| 5,394,399 | 2/1995 | Kawasaki | 370/545 |
| 5,418,838 | 5/1995 | Havermons | 379/59 |
| 5,422,933 | 6/1995 | Barnett et al. | 379/60 |
| 5,440,613 | 8/1995 | Fuentes | 379/59 |
| 5,442,682 | 8/1995 | Svedin et al. | 379/59 |
| 5,467,390 | 11/1995 | Brankley et al. | 379/229 |
| 5,471,471 | 11/1995 | Freeburg | 455/560 |
| 5,479,400 | 12/1995 | Dilworth | 370/349 |
| 5,481,533 | 1/1996 | Honig | 455/33.1 |
| 5,497,424 | 3/1996 | Vanderpool | 379/59 |
| 5,533,096 | 7/1996 | Bales | 455/560 |
| 5,555,260 | 9/1996 | Rinnback | 455/33.1 |
| 5,570,411 | 10/1996 | Sicher | 379/57 |
| 5,592,468 | 1/1997 | Sato | 370/349 |
| 5,727,058 | 3/1998 | Blumhardt et al. | 379/242 |

*Primary Examiner*—Dwayne D. Bost
*Assistant Examiner*—Myron K. Wyche
*Attorney, Agent, or Firm*—Lyon & Lyon LLP

[57] ABSTRACT

A mobile communication system having a layered architecture communicates user and signaling data among components of the communication system in the form of information elements which are encapsulated within packets and which may be passed across one or more system interfaces. The mobile communication system may comprises mobile user stations, base stations, and base station controllers and operates as a transparent data pipeline between application end users, such as a telephone service, connected at base station controllers and mobile user stations. Each system interface functions as a communication channel between system components, providing the lower layers of a layered communication system architecture. In a particular embodiment, the interface between the base station and the user stations is a TDMA interface, and the interface between a base radio transceiver and a line card processor comprises a dual-port RAM which is used as a shared resource across the interface. Prioritized queues may be used to facilitate response to relatively urgent signaling and control messages.

24 Claims, 21 Drawing Sheets

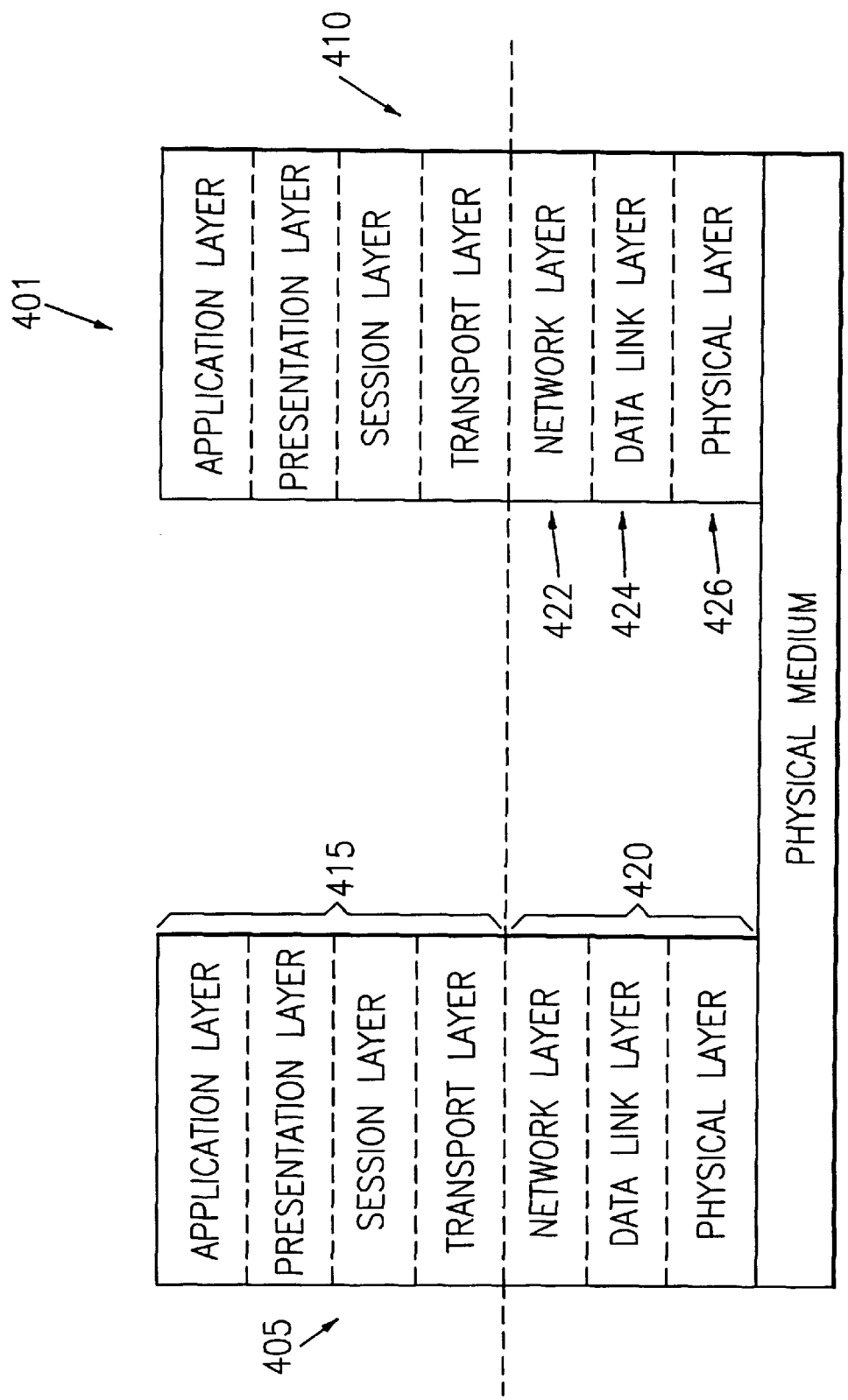

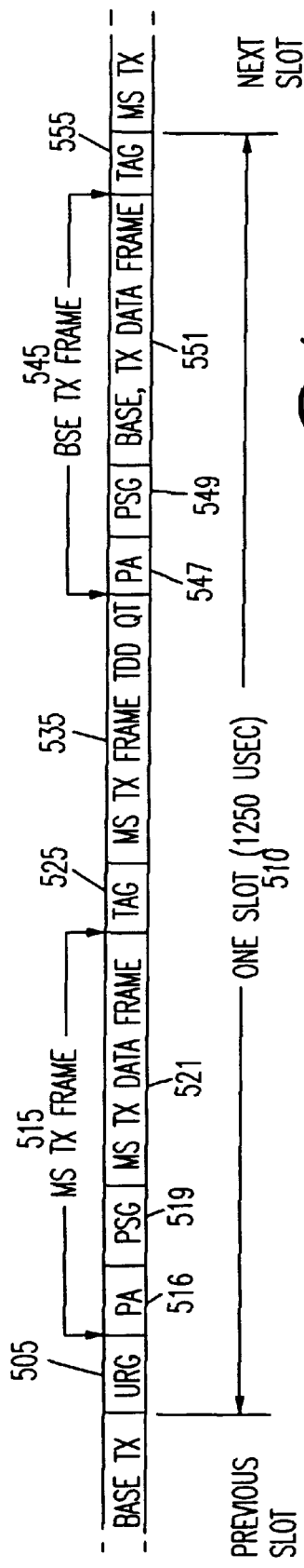
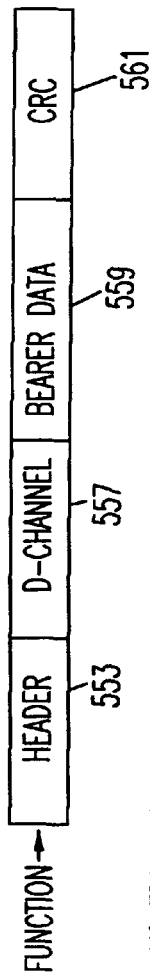
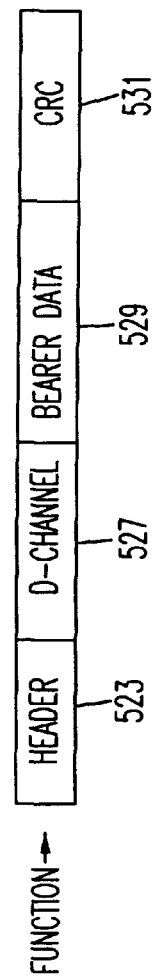
Fig. 5A
Fig. 5B
Fig. 5C

| INFORMATION ELEMENT | LENGTH IN BITS |
|---|---|
| HEADER | 24 |
| D CHANNEL | 8 |
| O NOTE | 192 |
| FCW | 16 | fig.10

| |
|---|
| OPENING FLAG |
| ADDRESS |
| ADDRESS |
| CONTROL |
| N-NOTE |
| FCS |
| FCS |
| CLOSING FLAG | fig.11

| | |
|---|---|
| ELEMENT IDENTIFIER | 1 BYTE |
| NUMBER OF QUEUES. INDICATES THE NUMBER OF PRIORITIZED QUEUES IN THE LINE CARD DP RAM. | 1 BYTE |
| QUEUE 1 PUT PTR. THE ADDRESS OF THE POINTER USED FOR WRITING TO QUEUE 1 OF THE LINE CARD DP RAM. | 2 BYTES |
| QUEUE 1 GET PTR. THE ADDRESS OF THE POINTER USED FOR READING FROM QUEUE 1 OF THE LINE CARD DP RAM. | 2 BYTES |
| QUEUE 1 START ADDRESS. THE ADDRESS OF THE START OF QUEUE 1 OF THE LINE CARD DP RAM. | 2 BYTES |
| QUEUE 1 LENGTH. THE NUMBER OF BYTES IN QUEUE 1 OF DP RAM. | 4 BYTES |
| ... | |
| QUEUE N PUT PTR. THE ADDRESS OF THE POINTER USED FOR WRITING TO QUEUE 1 OF THE LINE CARD DP RAM. | 2 BYTES |
| QUEUE N GET PTR. THE ADDRESS OF THE POINTER USED FOR READING FROM QUEUE 1 OF THE LINE CARD DP RAM. | 2 BYTES |
| QUEUE N START ADDRESS. THE ADDRESS OF THE START OF QUEUE 1 OF THE LINE CARD DP RAM. | 2 BYTES |
| QUEUE N LENGTH. THE NUMBER OF BYTES IN QUEUE 1 OF DP RAM. | 4 BYTES |

Fig. 15

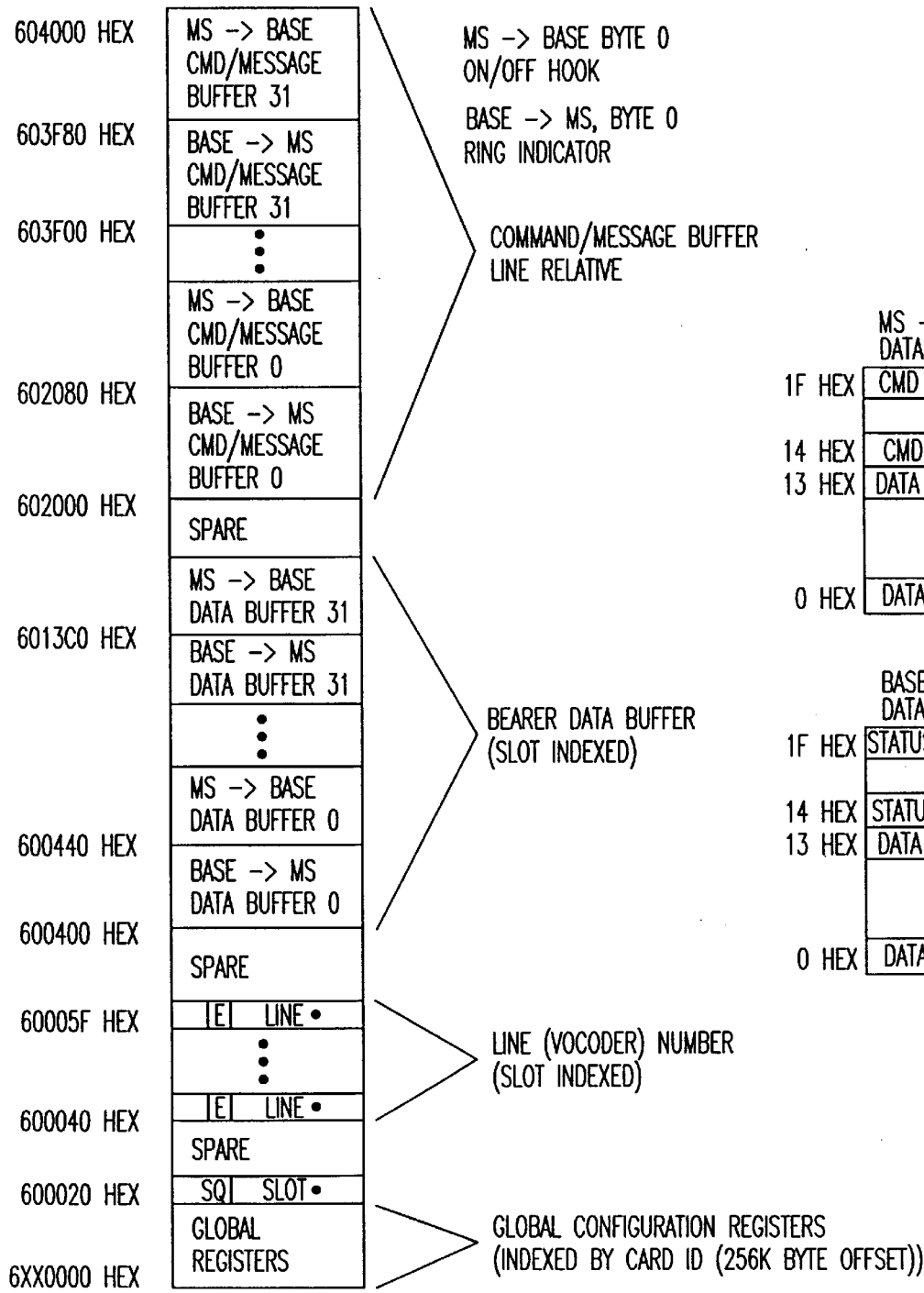
FIG. 17A  STANDARD LINE INTERFACE DUAL PORT MEMORY MAP

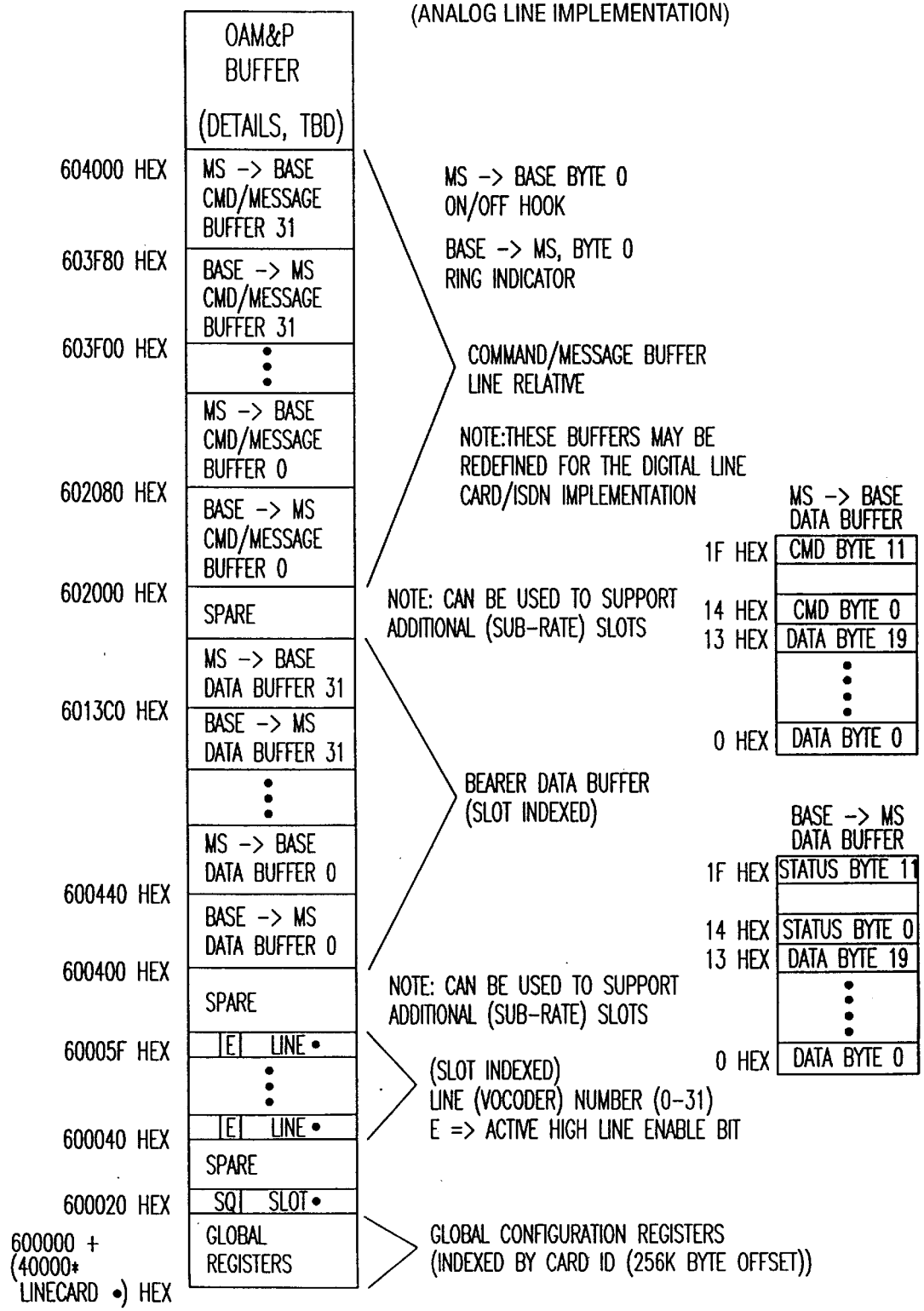
Fig. 17B  STANDARD LINE INTERFACE DUAL PORT MEMORY MAP (ANALOG LINE IMPLEMENTATION)

METHOD AND SYSTEM FOR TRANSFERRING INFORMATION WITHIN A MOBILE COMMUNICATION SYSTEM

RELATED APPLICATION DATA

This application is a continuation-in-part application of U.S. application Ser. No. 08/284,053 filed on Aug. 1, 1994, and hereby incorporated by reference as if fully set forth herein, which is a continuation-in-part of U.S. Application Ser. No. 08/215,306 filed on Mar. 21, 1994, now abandoned, which is a continuation-in-part of U.S. application Ser. No. 08/146,496 filed on Nov. 1, 1993, now abandoned.

BACKGROUND OF THE INVENTION

1. Field of the Invention

The field of this invention pertains to communications and, more particularly, to a means for transferring information within a mobile communication system.

2. Description of the Related Art

Digital communication systems have become increasingly popular for many applications. One advantage of a digital communication system is the flexibility to carry many different types of information over a single system. A single digital communication system may be used, for example, to transmit digitized sound, text, computer data, digital video, or other information existing in digital form.

To achieve flexibility, a communication system may be designed to transfer digital information from one end user to another in a transparent fashion. The communication system then operates as a transparent data pipeline for one or more other systems which are called application end users. Each application end user connected to the communication system generally has the responsibility for ensuring that the data ultimately delivered is in a form which is properly recognized by the user.

To better achieve such flexibility, it has been suggested that a communication system be designed with a layered architecture. One example of a general layered architecture for digital communication systems is the International Organization for Standardization (ISO) Reference Model for Open Systems Interconnection ("OSI Reference Model"). The OSI Reference Model has been adopted as an international standard by the ISO and by the International Telephone and Telegraph Consultative Committee (CCITT).

FIG. 4A is a diagram showing the OSI Reference Model 401. The OSI Reference Model 401 comprises a communication system having seven layers which form a communication path between a first end user 405 and a second end user 410. The seven layers may be divided into two sets—a set of upper layers 415 and a set of lower layers 420. The upper four layers 415 normally reside in the application end users desiring to communicate. A communication system may in some cases be defined by the lower three layers 420, individually known as the network layer 422, the data link layer 424 and the physical layer 426.

In the OSI Reference Model, each layer is responsible for specific, defined operations in the communication process between application end users 405, 410. In furtherance of these operations, each layer may communicate information with the layers above and below it through defined interfaces (although there is not always a definitive separation between layers). Thus, for example, the transport layer may operate independently of the specific operational details of the network layer 422, the data link layer 424, and the physical layer 426 below it. The set of lower layers 420 thus operates as a transparent data pipeline to an application end user connected to the system at the transport layer interface.

FIG. 4B illustrates a flow of data between layers such as may occur during communication between two application end users. As shown in FIG. 4B, information may be passed between like layers (e.g., the transport layer in the FIG. 4B example) of each end user through a path ultimately connected at the physical layer 426. The rules that govern how data is passed between like layers at each end user are collectively referred to as a "peer-to-peer protocol." A variety of different application end users operating with different peer-to-peer protocols may communicate over a communication system so long as each application end user presents the proper upper layer interface to the communication system. Conversely, an application end user may connect with any communication system having a compatible lower layer interface.

Additional details regarding the OSI Reference Model may be found in "Telecommunication Networks" by Mischa Schwartz (Addison-Wesley Publishing Co., 1987).

One class of digital communication systems provides wireless data communication connections to stationary or mobile user stations (e.g., handsets). Examples of such wireless mobile communication systems include public safety radio systems, cellular telephone systems, and personal communication systems (PCS). A wireless communication system may include a number of base stations for completing communication paths with the user stations. The base stations may be connected to a network, either directly of via a switch.

In many mobile communication systems it is desired that user stations have the ability to initiate and receive telephone calls. By connecting a communication system to a public switched telephone network (PSTN), a user station may generally communicate with any telephone connected to the telephone network. Alternatively, a communication system may access the telephone system through an intermediate communication system such as the Global System for Mobile Communications (GSM).

In operation, it is often necessary to pass signaling information among various components of a communication system. Signaling information may, for example, comprise control messages relating to the operation of the communication system. An example of signaling information is a message from a user station to a base station indicating a malfunction. One difficulty with the user of signaling information is that it must be distinguished within the system from data communication (i.e., information intended solely for the application end user), and must be extracted by the system component needing the signaling information to perform its tasks.

The transfer of necessary control and data information can be difficult within certain types of wireless systems. For example, in a time division multiple access (TDMA) system, wherein a base station communicates with a plurality of user stations (typically mobile) in a different time slots, the amount of information that can be transferred between the base station and the user station in a given time slot is necessarily limited. In contrast, a network to which a call is connected often transfers information in large data blocks (e.g., 64 kilobyte segments). The base station should have the capability of supporting data transfers and control functions required by the network, while at the same time supporting the transfer of information and control messages to the user station over a TDMA channel.

It would be advantageous to provide a mobile communication system with an improved method of communicating both user and signaling data among system components. It would be further advantageous to provide a mobile communication system having the characteristics of a layered architecture so as to provide a transparent data pipeline to application end users.

SUMMARY OF THE INVENTION

The present invention comprises in one aspect a system and method of transferring information (including user data and signaling information) within a mobile communication system.

In one aspect of the invention, internal components of a mobile communication system communicate system signaling data across internal interfaces implemented according to a layered architecture. System interfaces effectively function as communication channels between the system components. The system components appear as application end users to the internal communication channels defined by the system interfaces.

In another aspect of the invention, a mobile communication system transfers signaling data and end user data over a common set of interfaces, without using separate or dedicated internal communication channels for signaling data.

In a preferred embodiment, the communication system includes a base station capable of communicating with a plurality of user stations. The base station is connected with a base station controller (which may also be connected to other base stations). The base station controller may be connected to a network. In a preferred embodiment, the base station comprises two separate processors, an over-the-air (OTA) processor and a base station controller (BSC) interface processor (also called a line card processor). The OTA processor controls a base station transceiver which carries out communication with user stations over communication links. In a preferred embodiment, the interface between the OTA processor and the line card processor comprises a dual-port RAM which is used as a shared resource across the interface. Prioritized queues may be used to facilitate response to relatively higher priority signaling and control messages.

In another aspect of the invention, an over-the-air interface provides for the transfer of signaling information or data information, or both. The over-the-air interface comprises a plurality of time division multiple access (TDMA) channels. An information packet sent over a TDMA channel includes a relatively long bearer field (B-field) and a relatively short byte-serial field (also called a D-field). Low priority signaling messages may be segmented and transmitted over a plurality of time slots in the D-field. Higher priority signaling messages may be sent in the B-field, pre-empting normal bearer traffic. A field or flag in a header of an OTA information packet indicates to the receiving entity the usage of the B-field and the D-field for a given packet.

The above aspects of the invention are described with respect to preferred sets of messages, wherein each set of messages is associated with a different interface between system components.

BRIEF DESCRIPTION OF THE DRAWINGS

The various objects, features and advantages of the present invention may be better understood by examining the Description of the Preferred Embodiments found below, together with the appended figures, wherein:

FIG. 4A is a diagram of a multi-layer communication system architecture according to the OSI Reference Model.

FIG. 5A is a diagram of a preferred slot structure, and FIGS. 5B and 5C are diagrams of a base station traffic message structure and a user station traffic message structure, respectively.

FIG. 10 is a diagram of an information packet in accordance with one embodiment of the present invention.

FIG. 11 is a diagram of an exemplary data frame for transmitting messages to and from a base station controller.

FIG. 15 is a table of an exemplary dual-port RAM map.

FIGS. 17A and 17B are exemplary dual-port RAM maps.

DESCRIPTION OF THE PREFERRED EMBODIMENTS

Figure 1A:
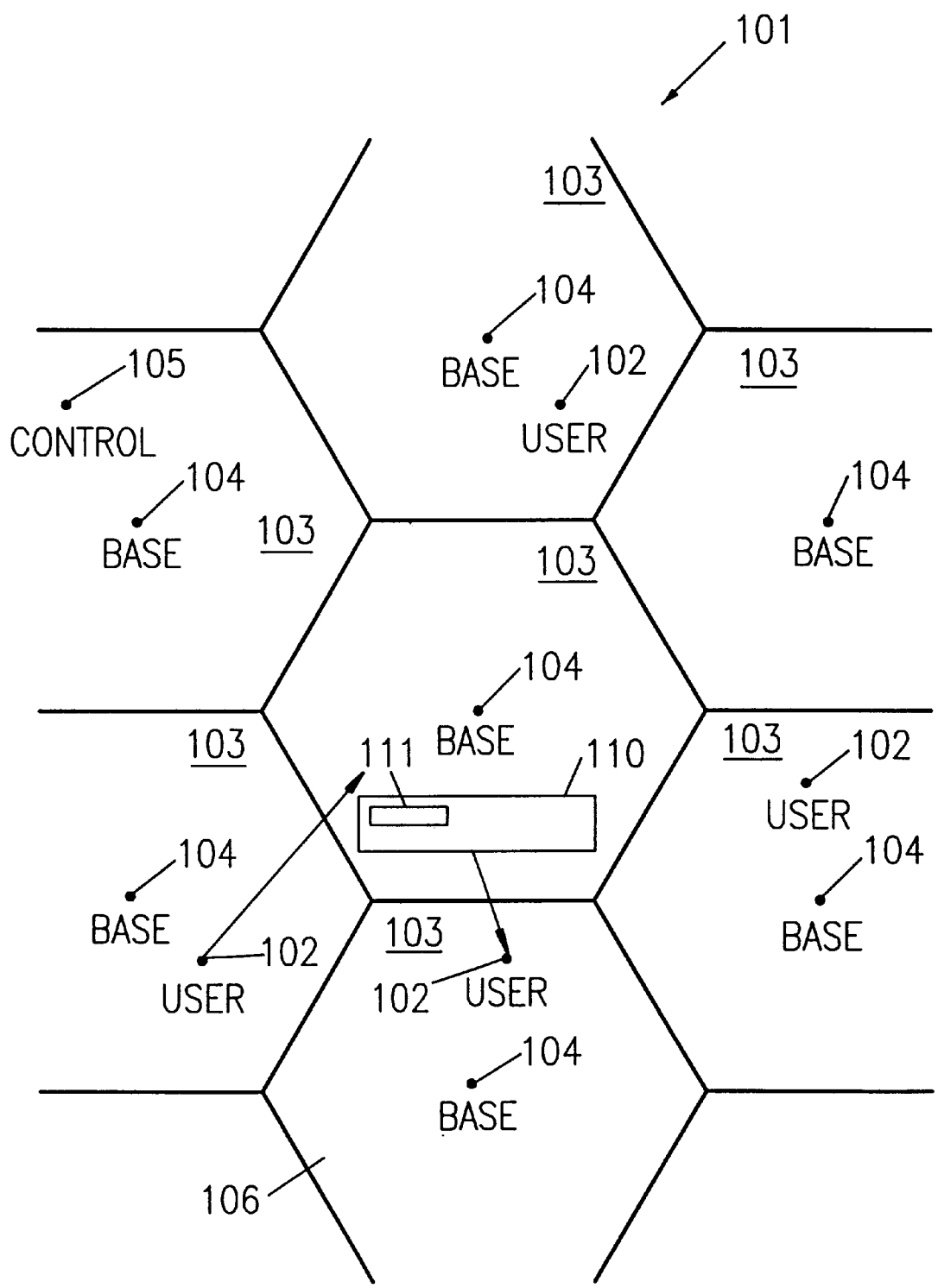
FIG. 1A is a diagram of a pattern of cells in a wireless communication system.

FIG. 1A is a diagram of a pattern of cells in a wireless communication system 101 for communication among a plurality of user stations 102. The wireless communication system 101 of FIG. 1A includes a plurality of cells 103, each with a base station 104, typically located at the center of the cell 103. Each station (both the base stations 104 and the user stations 102) generally comprises a receiver and a transmitter.

In a preferred embodiment, a control station 105 (also comprising a receiver and a transmitter) manages the resources of the system 101. The control station 105 (sometimes referred herein as a "base station controller") may assign the base station 104 transmitters and user station 102 transmitters in each cell 103 a spread-spectrum code for modulating radio signal communication in that cell 103. The resulting signal is generally spread across a bandwidth exceeding the bandwidth necessary to transmit the data, hence the term "spread spectrum". Accordingly, radio signals used in that cell 103 are spread across a bandwidth sufficiently wide that both base station 104 receivers and user station 102 receivers in an adjacent cell 103 may distinguish communication which originates in the first cell 103 from communication which originates in the adjacent cell 106.

Figure 1B:
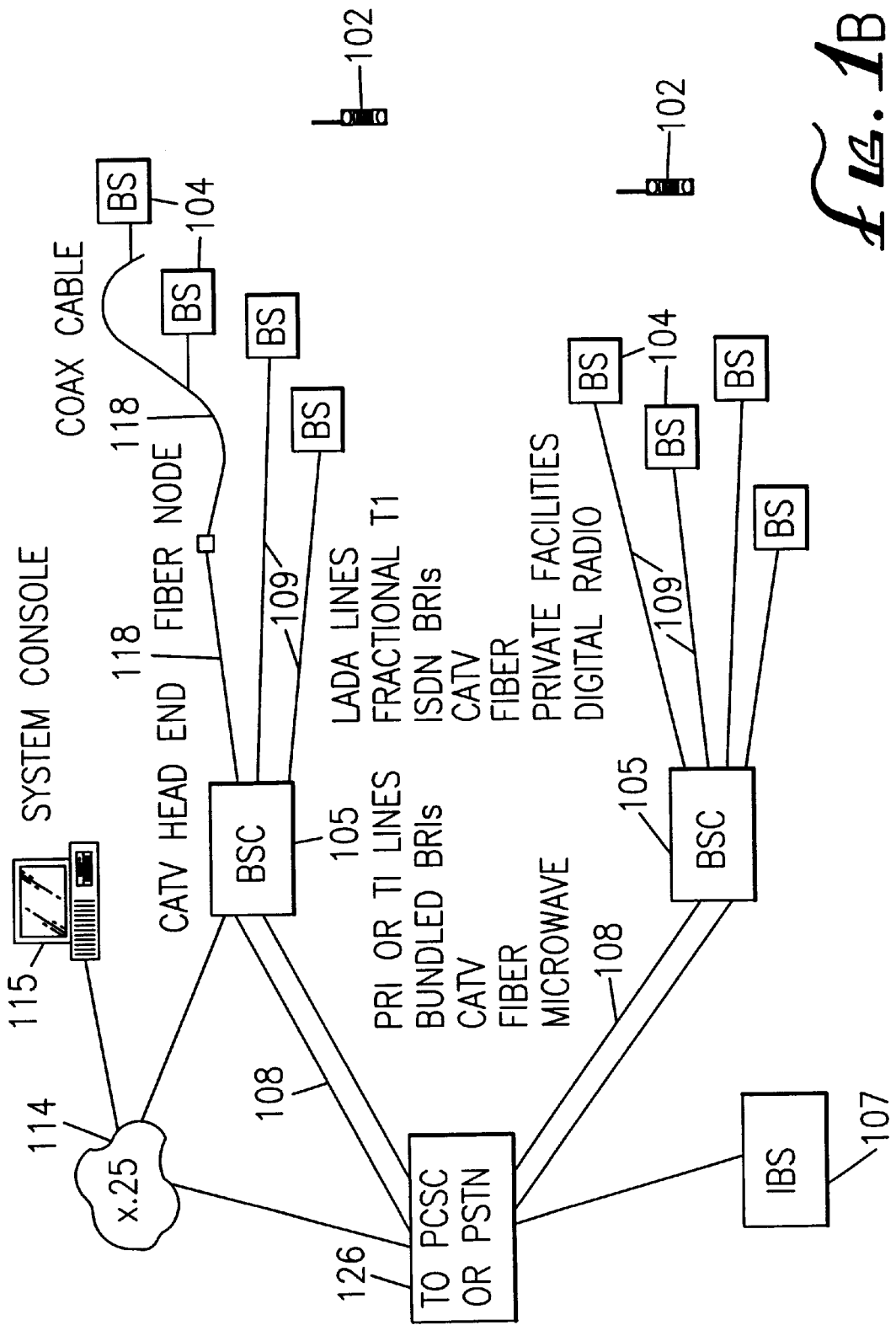
FIG. 1B is a block diagram of a communication system.

FIG. 1B is a block diagram of a communication system architecture utilized in a preferred embodiment of the present invention. The FIG. 1B communication system comprises a plurality of base stations 104 for communicating with a plurality of user stations 102. The base stations 104 and user stations 102 may operate in a personal communications system (PCS), such as may be authorized under rules prescribed by the Federal Communications Commission (FCC).

Each base station 104 may be coupled to a base station controller 105 by any of a variety of communication paths 109. The communication paths 109 may each comprise one or more communication links 118. Each communication link 118 may include a coaxial cable, a fiber optic cable, a digital radio link, or a telephone line.

Each base station controller 105 may also be connected to one or more communication networks 126, such as a public switched telephone network (PSTN) or personal communication system switching center (PCSC). Each base station controller 105 is connected to a communication network 126 by means of one or more communication paths 108, each of which may include a coaxial cable, a fiber optic cable, a digital radio link, or a telephone line.

The FIG. 1B communication system also may include one or more "intelligent" base stations 107 which connect directly to a communication network 126 without interfacing through a base station controller 105. The intelligent base stations 107 may therefore bypass the base station controllers 105 for local handoffs and switching of user stations 102, and instead perform these functions directly over the network 126. In terms of the interfaces described hereinafter (see FIG. 6), an intelligent base station 107 does not require an N-Interface, and the functions of the base station controller 105 for transmitting to the network 126 are incorporated within the intelligent base station 107.

In operation each base stations 104 formats and sends digital information to its respective base station controller 105 (or directly to the network 126 in the case of an intelligent base station 107). The base station controllers 105 receive inputs from multiple base stations 104, assist handoffs between base stations 104, and convert and format channel information and signaling information for delivery to the network 126. The base station controllers 105 may also manage a local cache VLR database, and may support basic operation, administration and management functions such as billing, monitoring and testing. Each base station controller 105, under control of the network 126, may manage local registration and verification of its associated base station 104 and may provide updates to the network 126 regarding the status of the base stations 104.

The network 126 connects to the base station controllers 105 for call delivery and outgoing calls. Intelligent base stations 107 may use ISDN messaging for registration, call delivery and handoff over a public telephone switch. The intelligent base station 107 may have all the general capabilities of a base station 104 but further incorporate a BRI card, additional intelligence and local vocoding.

If the network 126 is a GSM network, then base stations 104 may connect to the network 126 through a defined "A" interface. The "A" interface may be incorporated in base station controllers 105 and in intelligent base stations 107. Features and functionality of GSM may be passed to and from the base stations 104 over the "A" interface in a manner that is transparent to the end user.

The system may also interconnect to cable television distribution networks. The base stations 104 may be miniaturized so that they can be installed inside standard cable TV amplifier boxes. Interfacing may be carried out using analog remote antenna systems and digital transport mechanisms. For example, T1 and FT1 digital multiplexer outputs from the cable TV network may be used for interfacing, and basic rate (BRI) ISDN links may be used to transport digital channels.

Figure 1C:
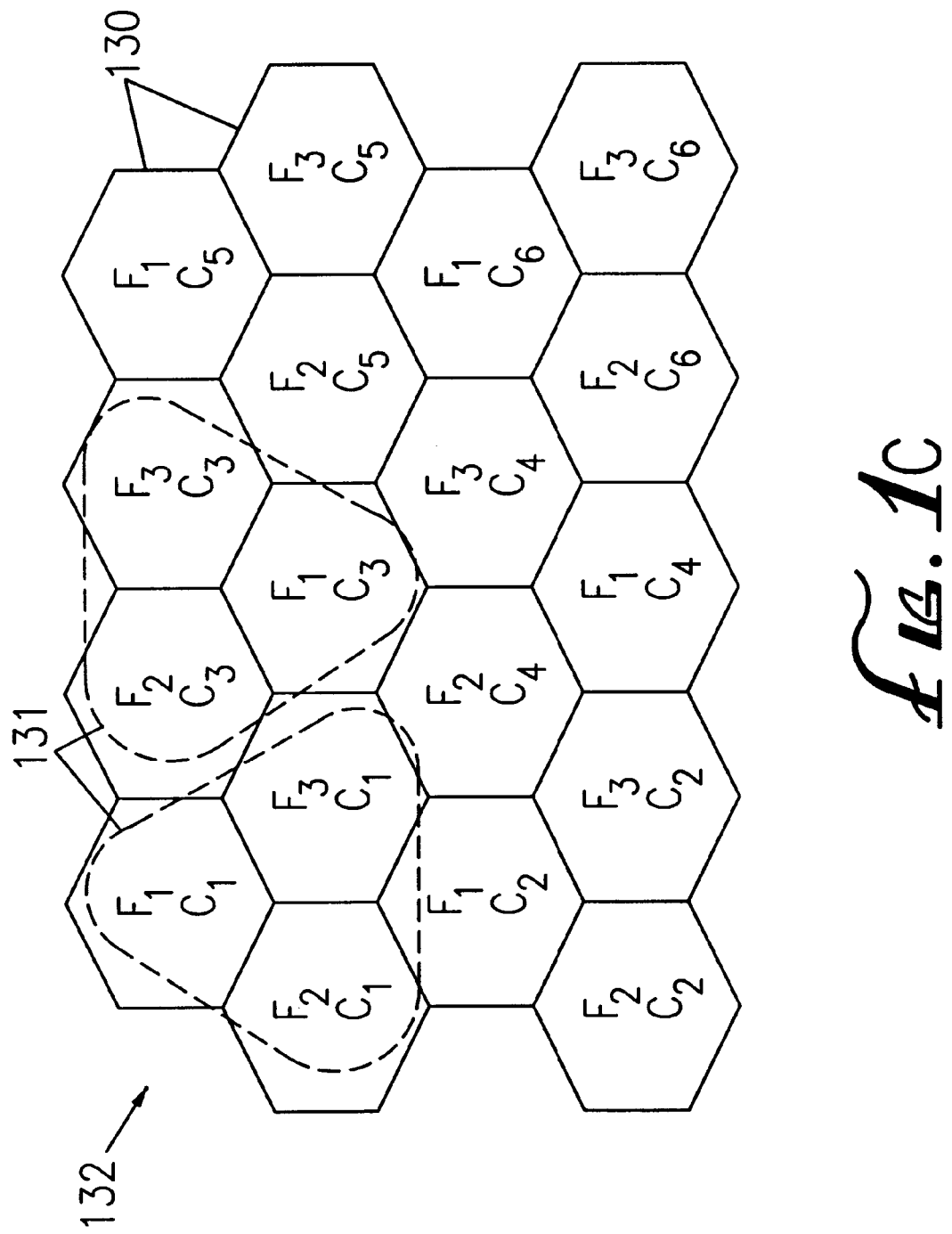
FIG. 1C is a diagram of an arrangement of cells in a wireless communication system showing an exemplary code and frequency reuse pattern.

FIG. 1C is a diagram of a particular cellular environment in which the invention may operate. In FIG. 1C, a geographical region 132 is divided into a plurality of cells 130. Associated with each cell 130 is an assigned frequency from among frequencies F1, F2 and F3, and an assigned spread spectrum code (or code group) from among the codes (or code groups) C1, C2, C3, C4, C5 and C6. The three different frequencies F1, F2 and F3 are preferably assigned in such a manner that no two adjacent cells 130 have the same assigned frequency F1, F2 or F3, thereby resulting in minimization of interference between adjacent cells 130. The spread spectrum codes C1 through C6 are preferably orthogonal and may be assigned in adjacent clusters 131 such as shown in FIG. 1C. Although six spread spectrum codes C1 through C6 are depicted in FIG. 1C, other numbers of spread spectrum codes may be used depending upon the particular application.

Further details regarding an exemplary cellular pattern are described in, e.g., U.S. Pat. No. 5,402,413, entitled "Three Cell Wireless Communication System," which application is assigned to the assignee of the present invention, and is hereby incorporated by reference as if fully set forth herein.

Figure 2:
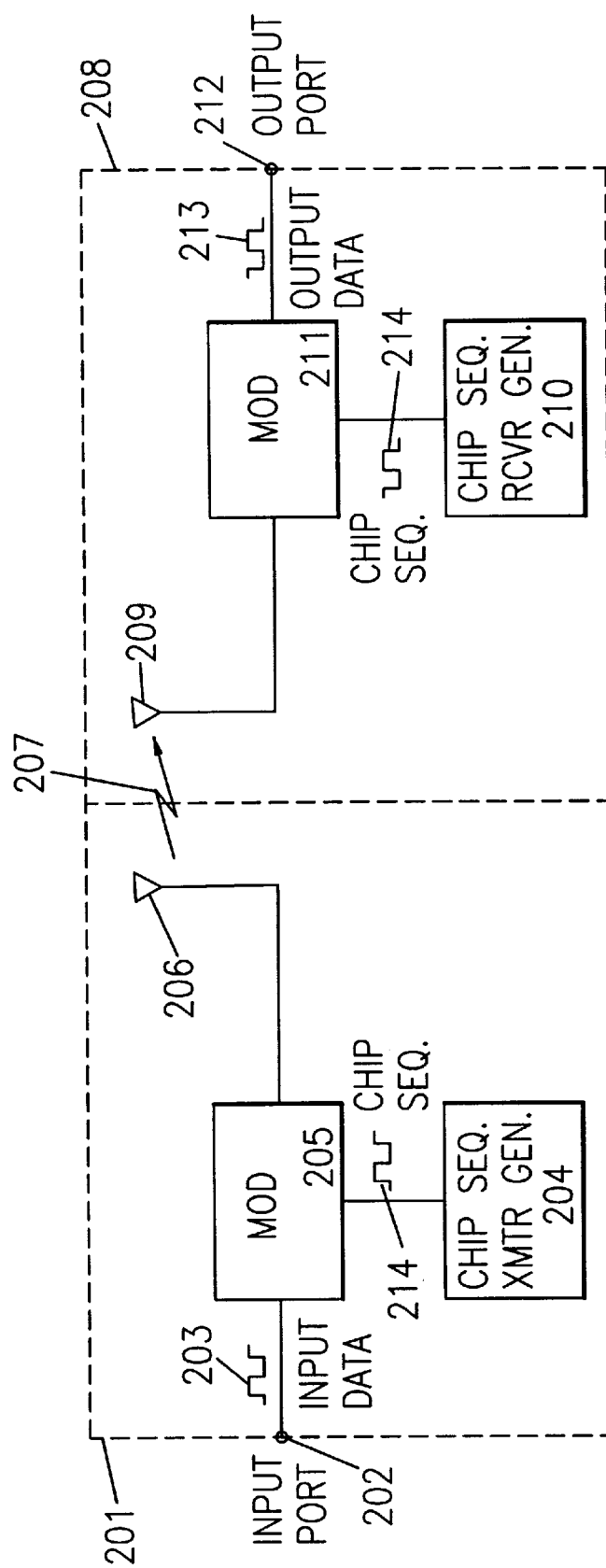
FIG. 2 is a block diagram of a transmitter and a receiver in a spread spectrum communication system.

FIG. 2 is a block diagram of an exemplary transmitter and receiver in a spread spectrum communication system as may be employed for spreading and despreading signals in the communication system of FIG. 1A. In FIG. 2, a spread-spectrum transmitter 201 comprises an input port 202 for input data 203, a chip sequence transmitter generator 204, a modulator 205, and a transmitting antenna 206 for transmitting a spread-spectrum signal 207. A spread-spectrum receiver 208 comprises a receiver antenna 209, a chip sequence receiver generator 210, a demodulator 211, and an output port 212 for output data 213. In operation, a single chip sequence 214 is identically generated by both the transmitter generator 204 and the receiver generator 210, and appears essentially random to others not knowing the spreading code upon which it is based. The spread-spectrum signal 207 is despread with demodulator 211 by correlating the received signal with a locally generated version of the chip sequence 214. Exemplary correlators are described in, e.g., U.S. Pat. Nos. 5,022,047 and 5,016,255, each of which are assigned to the assignee of the present invention, and each of which are incorporated by reference as if fully set forth herein. A preferred method of correlation is described in U.S. patent application Ser. No. 08/481,613 (attorney docket 212/049) entitled "Multi-Bit Correlation of Continuous Phase Modulated Signals," filed Jun. 7, 1995 in the name of inventors Randolph L. Durrant and Mark T. Burbach, hereby incorporated by reference as if set forth fully herein.

Spread spectrum communication techniques are further described in, e.g., Robert C. Dixon, *Spread Spectrum Systems with Commercial Applications* (John Wiley & Sons, 3d ed. 1994).

Data may be transmitted between the base station 104 and user stations 102 using an M-ary spread spectrum technique. Suitable M-ary spread spectrum transmission and reception techniques are described in, e.g., U.S. Pat. No. 5,022,047 and in U.S. patent application Ser. No. 08/484,007 (attorney docket 211/289) entitled "Method and Apparatus for Decoding a Phase Encoded Signal," filed Jun. 7, 1995 in the name of inventors Randolph L. Durrant, Mark T. Burbach and Eugene P. Hoyt, both of which are incorporated by reference as if set forth fully herein. In a preferred embodiment, the base station 104 and user stations 102 each transmit an M-ary direct sequence spread spectrum signal, with M=6, using spread spectrum codes (called "symbol codes") of 32 chips. Thirty-two different symbol codes are used to represent up to thirty-two different data symbols, each comprising five bits of data; phase encoding may also be used to allow transmission of a 6th bit of data for each symbol code. Techniques of phase encoding for transmission of an additional bit of information per symbol code are described in, e.g., U.S. patent application Ser. No. 08/484,007, cited above.

User stations 102 in one embodiment may comprise mobile handsets capable of multi-band and/or multi-mode operation. The user stations 102 may be multi-mode in that they may be capable of both spread spectrum (i.e., wideband) communication and also narrowband communication. The user stations 102 may be multi-band in the sense that they may be set to operate on a plurality of different frequencies, such as frequencies in either the licensed or unlicensed PCS bands. The user stations 102 may operate in one mode (e.g., wideband) over a first frequency band, and another mode (e.g., narrowband) over a second frequency band.

As an example, a user station 102 may be set to operate on a plurality of frequencies between 1850 and 1990 MHz, with the frequencies separated in 625 kHz steps. Each user station 102 may be equipped with a frequency synthesizer that may be programmed to allow reception and/or transmission on any one of the plurality of frequencies. Further information regarding dual-mode and/or dual-band communication is set forth in U.S. patent application Ser. No. 08/483,514 (attorney docket 214/071) entitled "Dual-Mode Wireless Unit with Two Spread Spectrum Frequency Bands," filed on Jun. 7, 1995 in the name of inventors Robert C. Dixon et al.

Figure 3:
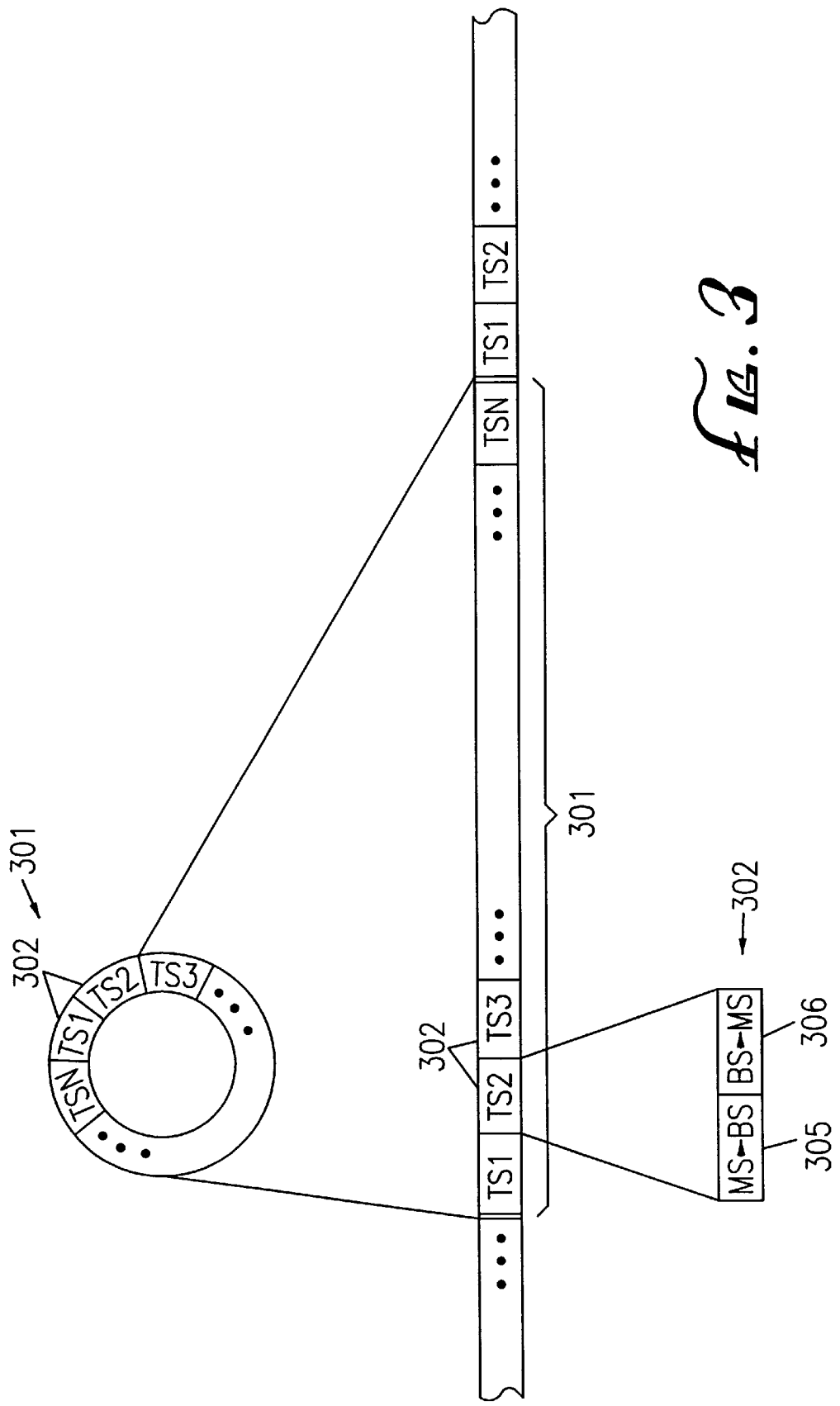
FIG. 3 is a diagram of a time frame divided into a plurality of time slots.
Figure 4B:
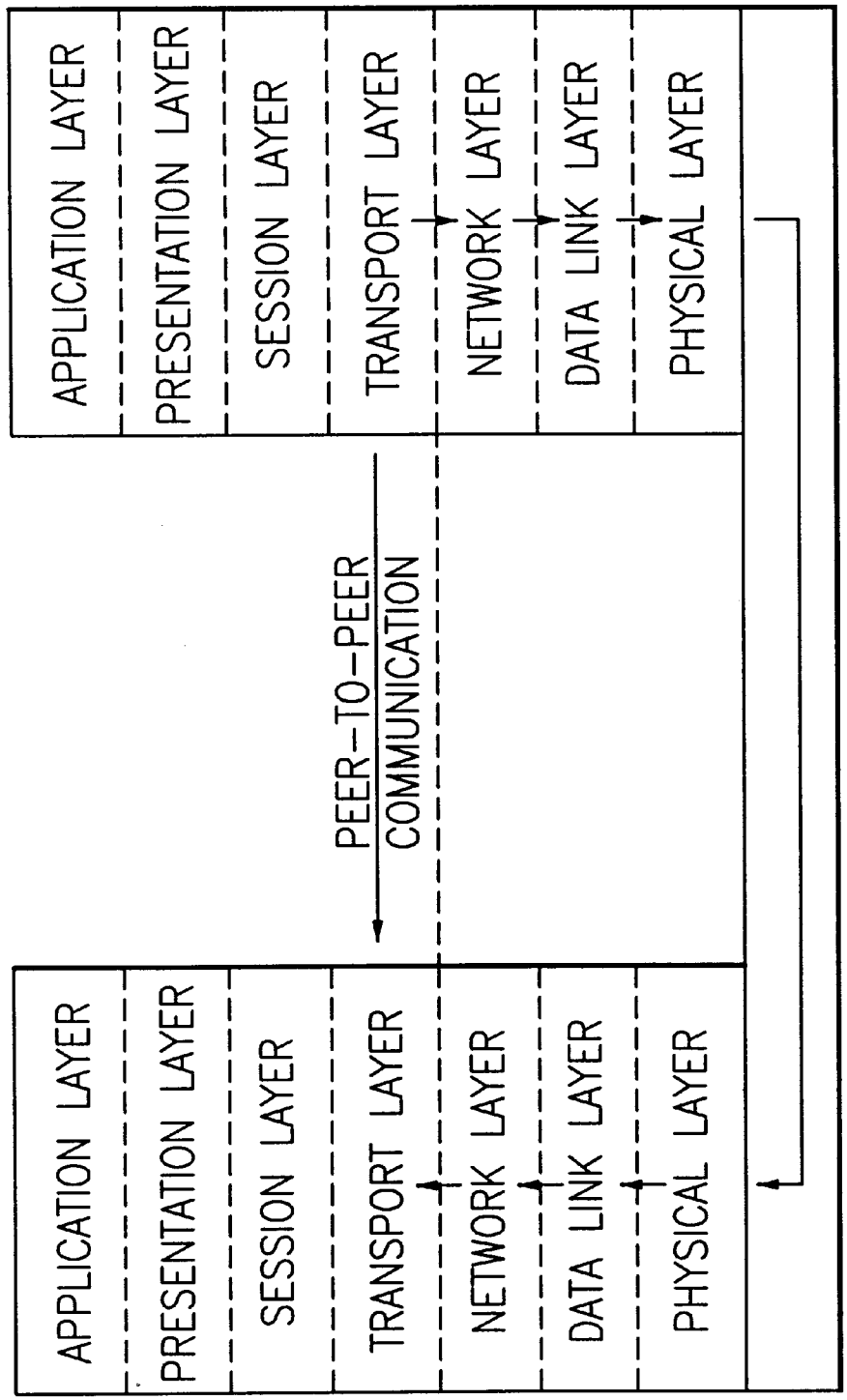
FIG. 4B is a diagram illustrating peer-to-peer communication in the layered communication system architecture of FIG. 4A.

FIG. 3 is a diagram showing a timing structure for a particular TDMA system. According to the timing structure of FIG. 3, communication over time is broken into a continuous series of time frames 301. A single complete time frame 301 is shown along a timeline 310 in FIG. 3; similar time frames are assumed to precede and follow time frame 301 in a continuous pattern along the timeline 310.

Time frame 301 is divided into a plurality of time slots 302 numbered consecutively TS1, TS2 . . . TSN, each of which may support duplex communication with a user station 102. Time frame 301 may be thought of as a "polling loop" or a time loop, as depicted in FIG. 3, whereby user stations 102 are communicated with sequentially over the time frame 301 in a manner analogous to polling, each user station 102 transmitting and receiving messages in its designated time slot 302. In the FIG. 3 embodiment, each time slot 302 comprises a user portion 305, wherein a user station 102 transmits a user-to-base message to the base station 104, and a base portion 306, wherein the base station 104 transmits a base-to-user message to the user station 102.

Time slots 302 define a set of transmission channels. Each transmission channel may further defined by a distinct frequency channel, a distinct spread spectrum code, a distinct spatial direction, or some combination thereof.

In an exemplary TDMA communication system, time frames 301 are each 20 milliseconds in duration, and each time frame 301 comprises sixteen time slots 302 or, alternatively, eight time slots 302 to support extended range through increased guard times.

In a preferred embodiment, each time slot 302 is 1.25 milliseconds long. Each time slot 302 in such an embodiment comprises a total of 3125 chip periods, and base station transmissions sent during base portions 306 of the time slot 302 and user station transmissions sent during user portions 305 of the time slot 302 each have a chipping rate of 2.5 Megachips/second.

In some embodiments, a user station 102 may communicate in more than one time slot 302 in each time frame 301, so as to support an increased data rate. Similarly, in some embodiments, a user station 102 may periodically skip time frames 301 and communicate in some subset of all time frames 301 (e.g., every other time frame 301, or every fourth time frame 301), so as to support a reduced data rate where a full speed communication link is not necessary. Further information about an exemplary TDMA system supporting variable data rates may be found in copending U.S. patent application Ser. No. 08/284,053 filed Aug. 1, 1994 in the name of inventors Gary B. Anderson, Ryan N. Jensen, Bryan K. Petch, and Peter O. Peterson, originally entitled "PCS Pocket Phone/Microcell Over-Air Protocol," which is hereby incorporated by reference as if fully set forth herein. An alternative over-the-air protocol is also described therein.

FIG. 5A is a diagram of a preferred slot structure, and FIGS. 5B and 5C are diagrams of a base station traffic message structure and a user station traffic message structure, respectively. In FIG. 5A, a time slot 510 comprises a variable radio delay gap 505, a user station transmit frame 515, a base processor gap 525, a guard time 535, a base station transmit frame 545, and a radar gap 555. Each user station transmit frame 515 comprises a user preamble 516, a user preamble sounding gap 519, and a user station data frame 521. Similarly, each base station transmit frame 545 comprises a base preamble 547, a base preamble sounding gap 549, and a base transmit data frame 551.

FIG. 5B illustrates a preferred message structure for the base transmit data frame 551. The message structure of FIG. 5B comprises a base header field 553, a base D-channel field 557, a base data field 559, and a base cyclical redundancy check (CRC) field 561. In a preferred embodiment, the base header field 553 is 23 bits, the base D-channel field 557 is 8 bits, the base data field 559 is 192 bits, and the base CRC field 561 is 16 bits.

FIG. 5C illustrates a preferred message structure for the user station transmit data frame 521. The message structure of FIG. 5C comprises a user header field 523, a user D-channel field 527, a user data field 529, and a user CRC field 531. In a preferred embodiment, the user header field 523 is 17 bits, the user D-channel field 527 is 8 bits, the user data field 529 is 192 bits, and the user CRC field 531 is 16 bits.

Signaling messages (i.e., messages used for control traffic) may be used to assist in acquisition and maintenance of a channel from the network. A message may include a message type data element located in a message type field. The message type data element defines the format of the rest of the message, and acts as an operation code to the destination unit (either user station 102 or base station 104).

Exemplary message types (and their abbreviations) appear in Table 6-1 below.

TABLE 6-1

| Message Type | Message |
|---|---|
| ACK | Acknowledge |
| AUT | Authentication Request |
| AUR | Authentication Response |
| BAI | Base Assist Information |
| BAR | Base Assist Request |
| CIP | Set Cipher Mode |
| CNC | Call Connected |
| CNL | Connect Link |
| CSC | Circuit Switch Complete |
| DRG | De-registration Request |
| HLD | Hold |
| HOF | Handover Failed |
| MAI | User Station Assist Information |
| MAR | User Station Assist Request |
| OHC | Originating Handover Complete |
| ORH | Originating Handover Request |
| ORG | Originate Call |
| RCP | Registration Complete |
| REL | Release Link |
| RRQ | Registration Request |
| SPR | Specific Response |
| STL | Set Link |
| SYN | Synchronize |
| THC | Terminating Handover Complete |
| THR | Target handover Request |
| TRA | Transport Message with TCID |

The message type data element may be, e.g., 8 bits in length.

Figure 6:
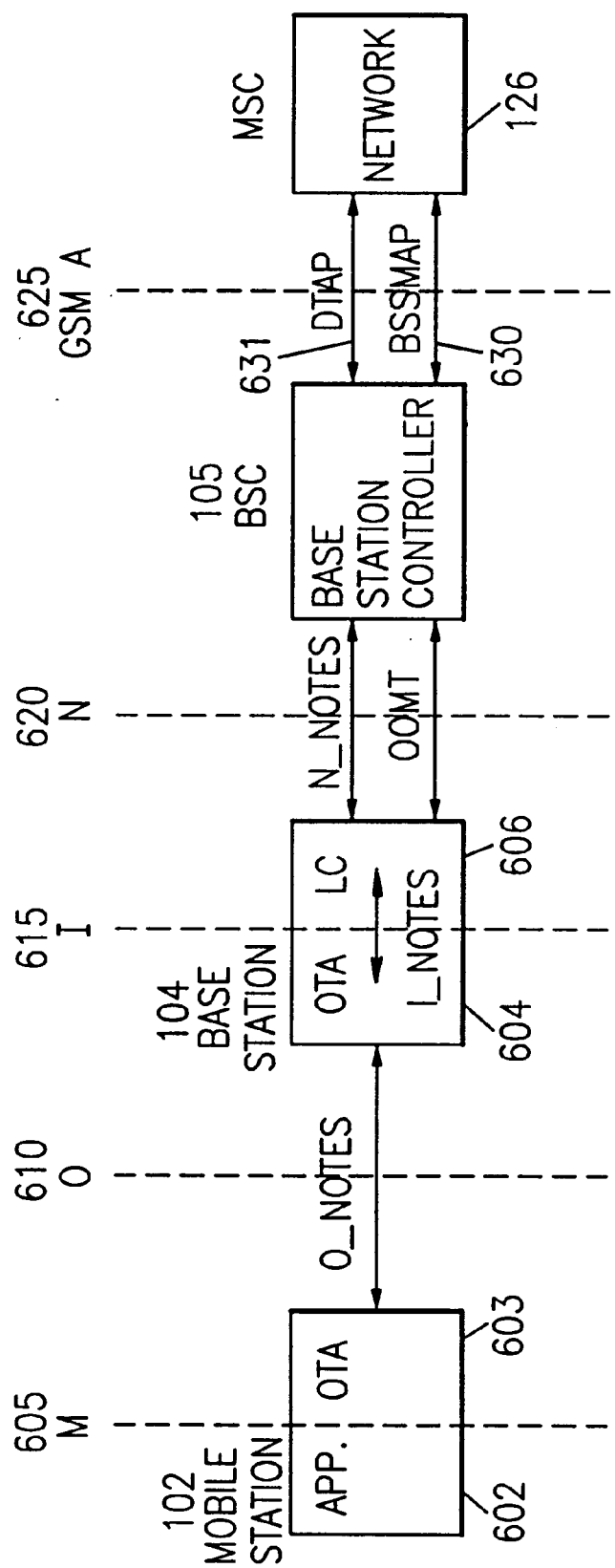
FIG. 6 is an abstract diagram illustrating the transfer of information (including internal signaling messages) among system components in a preferred wireless communication system.
Figure 7:
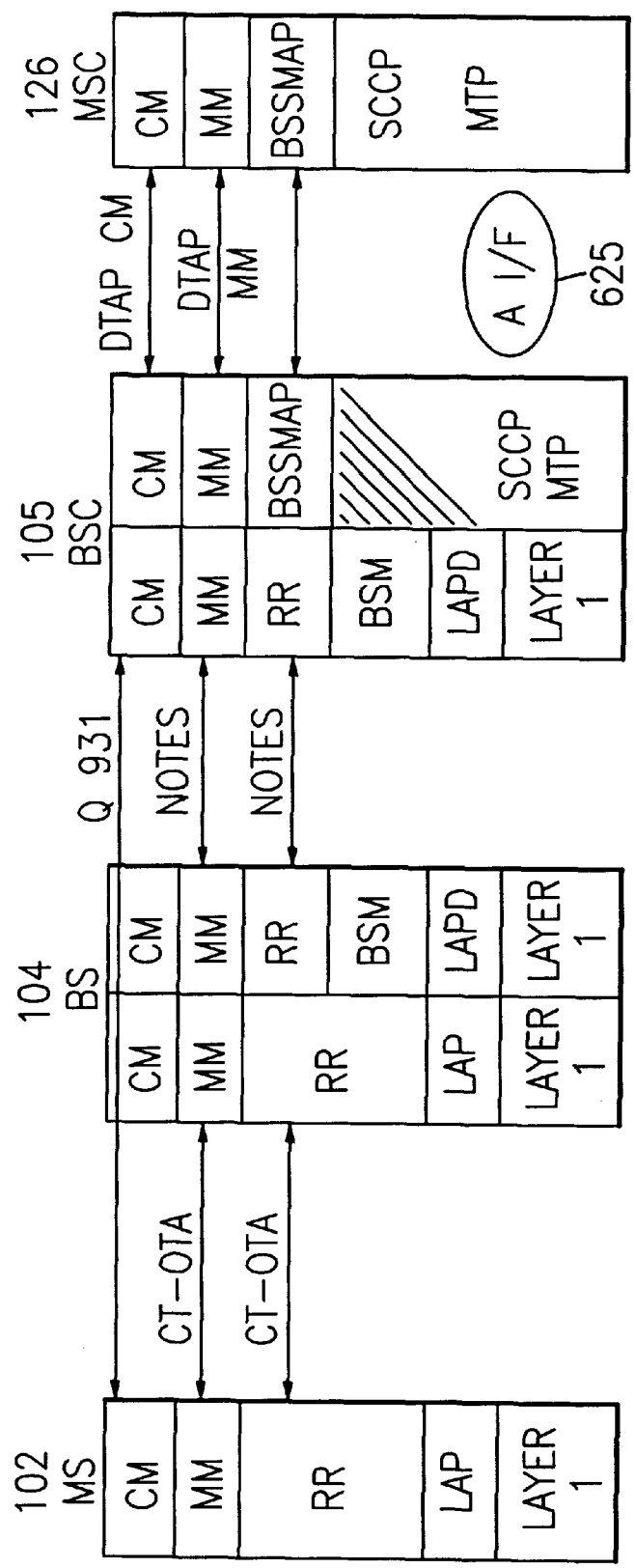
FIG. 7 is an abstract diagram illustrating the transfer of information to and from a particular network in accordance with the system components and interfaces of FIG. 6.

FIG. 6 is a diagram of various system components within a preferred wireless communication system showing interfaces between the components. Four distinct interfaces are defined in the FIG. 6 system, labeled "M", "O", "I", and "N", and are referred to herein as the M-Interface 605, O-Interface 610, I-Interface 615, and N-Interface 620, respectively.

The M-Interface 605 may be internal to a user station 102 and generally defines a boundary between an application end user 602 and a mobile communication transceiver 603 in the user station 102. The O-Interface 610 generally comprises communication channel (typically an over-the-air communication channel) between the mobile communication transceiver 603 in the user station 102 and a base station transceiver 604. The I-Interface 615 may be thought of as "internal" to a base station 104 and generally defines a boundary between the base station transceiver 604 and a base station line card processor 606. Finally, the N-Interface 620 comprises an information channel 607 between the line card processor 606 and a base station controller 609 (such as, e.g., base station controller 105 shown in FIG. 1B).

Within the communication system 101, information is communicated across each interface 605, 610, 615, and 620 according to a particular protocol governing exchange of information across that interface. Thus, a total of four protocols are defined, one for each interface 605, 610, 615, 620. A fifth protocol may be defined for an adaptation layer interface (e.g., the GSM "A" interface) at the base station controller 105.

In a preferred embodiment, the communication system 101 communicates both user data and signaling data across one or more of the system component interfaces under the same or similar protocols. User data (also referred to as bearer data) comprises, in general, data which originates at the application end user and is passed to the communication system across an adaptation layer interface. User data may include voice, error-controlled data, or non-error controlled (raw) data. Signaling data (also called control data), on the other hand, generally comprises information exchanged within the communication system, or between the communication system and application end users, for the purpose of service connection (i.e., connection establishment and maintenance).

The mobile communication system 101 transfers information across one or more system interfaces through a series of packetized messages referred to as "Notes". Each Note may contain data intended for receipt by an application end user (user data) or data to be used for link establishment and maintenance (signaling data), or both. Each interface 605, 610, 615, 620 communicates with Notes formatted according to a particular protocol specific to the interface.

The communication system 101 transfers information in the form of signaling data between the mobile communication transceiver 603 and the application end user 602 across the M-Interface 605 in the form of packetized messages referred to as "M-Notes". Table 1-1 through Table 1-18 describe exemplary M-Notes which may be communicated across the M-Interface 605 in a preferred embodiment of the communication system 101. In Tables 1-1 through 1-18, the application end user 602 may be abbreviated as "MSAPP", and the mobile communication transceiver 603 as "MS-OTA."

TABLE 1-1

Acknowledge [MSAPP <=> MS-OTA]

| Information Element | Length in Octets |
|---|---|
| Command Type | 1 |
| ACK'ed Command | 1 |
| ACK Response | 2 |

This message is sent by either the application end user 602 or the mobile communication transceiver 603 to indicate the acknowledgment of an action based on the receipt of the Message Type identified in the ACK Message Type field. A positive acknowledgment is always indicated by a 0 in the ACK Response IE.

TABLE 1-2

Assist Information [MSAPP <=> MS-OTA]

| Information Element | Length in Octets |
|---|---|
| Command Type | 1 |
| Assist Type | 1 |
| Assist Data | 18 |

This message is sent either from the application end user 602 to the mobile communication transceiver 603 or from the mobile communication transceiver 603 to the application end user 602. It provides a mechanism to impart various items of information to assist the recipient in making well informed decisions. It may be sent in response to a CT-ASR message or it may be unsolicited.

TABLE 1-3

Assist Request [MSAPP <=> MS-OTA]

| Information Element | Length in Octets |
|---|---|
| Message Type | 1 |
| Assist Type | 1 |
| Assist Request Info | 18 |

This message is sent either from the application end user 602 to the mobile communication transceiver 603 or from the mobile communication transceiver 603 to the application end user 602 to request information. It provides a mechanism for the sender to request various items of information to assist in making well informed decisions.

TABLE 1-4

Authenticate [MSAPP <= MS-OTA]

| Information Element | Length in Octets |
|---|---|
| Message Type | 1 |
| TCID | 1 |
| Cipher Type | 1 |
| Cipher Key Sequence # | 1 |
| Authentication Test Number | 16 |

The Authenticate M-Note shall be sent to the application end user 602 from the mobile communication transceiver 603 in response to an Authenticate N-Note as discussed below. The application end user 602 will then encrypt the "random" number using the authentication key provisioned into the mobile user station 102 and send this encrypted number back to the mobile communication transceiver 603 in an Authentication Reply M-Note.

TABLE 1-5

Authenticate Reply [MSAPP => MS-OTA]

| Information Element | Length in Octets |
|---|---|
| Message Type | 1 |
| TCID | 1 |
| Cipher Type | 1 |
| Authentication Test Response | 16 |

The Authenticate Reply M-Note from the application end user 602 to the mobile communication transceiver 603 is the response to an Authentication M-Note from the mobile communication transceiver 603. The M-Note communicates the sixteen octet encrypted response from the application end user 602 to the network 126 for confirmation. In some infrastructure systems, the network 126 will perform encryption on the original random number and compare the results for authentication. In others, the encryption and comparison will be performed by higher level systems. The Authenticate Reply should be the response to an earlier Authenticate N-Note issued for the given personal identification number (PID) by the network 126. If the returned value is incorrect, the proper response of the network 126 shall be to deny access by the mobile user station 102 to the network.

TABLE 1-6

Begin Traffic [MSAPP => MS-OTA]

| Information Element | Length in Octets |
|---|---|
| Message Type | 1 |
| Traffic Type | 1 |

This message indicates to the mobile communication transceiver 603 that traffic of the specified type is to commence.

TABLE 1-7

Circuit Switch Compete [MSAPP <= MS-OTA]

| Information Element | Length in Octets |
|---|---|
| Message Type | 1 |
| (New) Service Provider | 2 |
| (New) Zone | 5 |
| (New) BSC ID | 2 |
| (New) Base ID | 4 |
| (New) Facility | 4 |

This message is sent from the mobile communication transceiver 603 to the application end user 602 upon successful completion of handover between base stations 104.

TABLE 1-8

Connect Link [MSAPP => MS-OTA]

| Information Element | Length in Octets |
|---|---|
| Message Type | 1 |
| Connection Number | 3 |
| Cause | 1 |

This message is sent from the mobile communication transceiver 603 to the application end user 602 when the base station transceiver 604 receives a CT-CNC from a base station 104 over the O-interface 610.

TABLE 1-9

Deregister [MSAPP => MS-OTA]

| Information Element | Length in Octets |
|---|---|
| Message Type | 1 |
| PID | 9 |
| Cause | 1 |

This message is sent from the MS-OTA to the application end user 602 to indicate that the mobile communication transceiver should deregister the PID from the base station 104.

TABLE 1-10

Deregister Complete [MSAPP <= MS-OTA]

| Information Element | Length in Octets |
|---|---|
| Message Type | 1 |
| PID | 9 |
| Cause | 1 |

This message is sent from the mobile communication transceiver 603 to the application end user 602 to indicate that the mobile user station 102 has deregistered from a base station 104.

TABLE 1-11

Initialize MS-OTA [MSAPP => MS-OTA]

| Information Element | Length in Octets |
|---|---|
| Message Type | 1 |
| Service Provider | 2 |
| Class | 2 |

TABLE 1-11-continued

Initialize MS-OTA [MSAPP => MS-OTA]

| Information Element | Length in Octets |
|---|---|
| PID | 9 |
| ESN | 8 |

This message defines the capabilities and identity of the mobile user station 102 to the mobile communication transceiver 603. Upon receipt of the message the mobile communication transceiver 603 shall attempt to register with the specified Service Provider using the specified PID. In the event that the mobile user station is currently registered when it receives this message it shall first de-register—using the previous PID, if different—and then attempt to re-register.

TABLE 1-12

Link Lost [MSAPP <= MS-OTA]

| Information Element | Length in Octets |
|---|---|
| Message Type | 1 |
| Cause | 1 |

The mobile communication transceiver 603 sends this message to the application end user 602 when the link to the base station 104 is lost.

TABLE 1-13

Register [MSAPP => MS-OTA]

| Information Element | Length in Octets |
|---|---|
| Message Type | 1 |
| Registration Status | 1 |
| Service Provider | 2 |
| Zone | 5 |
| BSC ID | 2 |
| Base ID | 4 |

This message is sent from the mobile communication transceiver 603 to the application end user 602 upon each completion of a registration by the mobile user station 102.

TABLE 1-14

Release Link [MSAPP <=> MS-OTA]

| Information Element | Length in Octets |
|---|---|
| Message Type | 1 |
| Cause | 1 |

This message is sent from the mobile communication transceiver 603 to the application end user 602 to indicate that the communication system 101 has dropped the link. This message is sent from the application end user 602 to the mobile communication transceiver 603 to indicate that the application end user 602 has dropped the link.

TABLE 1-15

Service Request [MSAPP => MS-OTA]

| Information Element | Length in Octets |
|---|---|
| Message Type | 1 |
| Resource Request Data | 4 |
| Service Type | 1 |
| Key Sequence # | 1 |
| Class | 2 |
| TCID | 1 |

The application end user 602 sends the Service Request message to the mobile communication transceiver 603 to request call management access to the communication system 101.

TABLE 1-16

Set Link [MSAPP <=> MS-OTA]

| Information Element | Length in Octets |
|---|---|
| Message Type | 1 |
| In-bound Bandwidth | 1 |
| Out-bound Bandwidth | 1 |

This message is sent by either the application end user 602 or the mobile communication transceiver 603 to specify the data bandwidth requirements of the current link (or the link being established). If the mobile communication transceiver 603 receives this message when a link is not established, it initiates the link acquisition sequence.

TABLE 1-17

Transport Data [MSAPP <=> MS-OTA]

| Information Element | Length in Octets |
|---|---|
| Message Type | 1 |
| Transport Data | 19 |

The message is used by the application end user 602 and the mobile communication transceiver 603 to transport peer to peer data between the application end user 602 and an application end user connected to a base station controller 105.

TABLE 1-18

Update ID [MSAPP <= MS-OTA]

| Information Element | Length in Octets |
|---|---|
| Message Type | 1 |
| PID | 9 |
| New PID | 9 |

The Update ID M-Note is sent to the application end user 602 from the mobile communication transceiver 603 to notify the application end user 602 to update the identity of the mobile user station 102 described by the PID information element. The New PID information element may represent a temporary identification for the mobile user station 102 as provided for in the definition of the New Personal ID.

The mobile communication system 101 transfers information comprising signaling data and user data between a base station 104 (i.e., the base station transceiver 604) and a user station 102 (i.e., the mobile station transceiver 603) across the O-Interface 610. In a preferred embodiment, the O-Interface 610 operates according to an over-the-air protocol with time division duplexing (TDD) and time division multiple access (TDMA) techniques. A preferred protocol for the O-Interface 610 is shown in and described with respect to FIG. 3.

Signaling data is passed across the O-Interface 610 in the form of messages referred to as "O-Notes". In a preferred embodiment, the O-Notes are contained either within the base data field 559 (see FIG. 5B) or the user data field 529 (see FIG. 5C), depending upon the origin of the message. Alternatively, an O-Note may be segmented into, e.g., 8-bit segments and transmitted over a plurality of time slots 302 in the D-field 557 of the base message (see FIG. 5B) or the D-field 527 of the user message (see FIG. 5C). Generally, lower priority O-Note messages may be segmented and transmitted in the D-fields 557 or 527, while higher priority O-Note messages may be transmitted in the B-fields 579 or 529. Also, O-Notes may be transmitted in the B-field 579 or 529 when it is not otherwise being used (e.g., when the link is first being established and voice data is not being transferred yet).

A field or flag in the header of a base message or user message can be used to indicate whether an O-Note is contained in the B-field 579 or 529, or in the D-field 557 or 527. In some circumstances, an extended O-Note may be sent in a message covering both the D-field and the B-field.

FIG. 10 is a diagram of an information packet 1005 (e.g., the base message of FIG. 5B or the user message of FIG. 5C) which may be passed across the O-Interface 610. An O-Note 1010 is encapsulated within the packet 1005, and resides in the data field 529, 559 ordinarily reserved for bearer traffic. Each information packet 1005 generally also comprises a header 1015 of, e.g., 24 bits, a D-field of, e.g., 8 bits, and a frame check word 1020 of, e.g., 16 bits, for a total of 240 bits.

In a preferred embodiment, each O-Note 1010 has a length of no more than 160 bits, thereby taking up less space than the entire B-field 529 or 569. The latter 32 bits of the O-Note 1010 (appended to the first 160 bits) may be used for forward error correction.

Table 2-1 through Table 2-30 illustrate exemplary O-Notes 1010 which may be transferred across the O-Interface 610 in a preferred embodiment of the communication system 101. In Table 2-1 through Table 2-30, a mobile communication transceiver 603 may be denoted "MS-OTA" and a base station transceiver 604 may be denoted "BS-OTA."

TABLE 2-1

| CT-ACK (Acknowledge) [MS-OTA <=> BS-OTA] | |
| --- | --- |
| Information Element | Length in Bits |
| Message Type | 8 |
| ACK Response | 8 |
| ACK'ed Command | 8 |
| Cause | 8 |
| Reserved | 128 |

Acknowledge messages can be transmitted by either the BS-OTA or the mobile communication transceiver 603. They are usually the last element of a larger signaling exchange.

TABLE 2-2

| CT-ASI (Assist Information) [MS-OTA <=> BS-OTA] | |
| --- | --- |
| Information Element | Length in Bits |
| Message Type | 8 |
| Assist Type | 8 |
| Assist Data | 144 |

This message is sent either from the BS-OTA to the mobile communication transceiver 603 or from the mobile communication transceiver 603 to the BS-OTA. It provides a mechanism to impart various items of information to assist the recipient in making well formed decisions. It may be sent in response to a CT-ASR message or it may be unsolicited.

TABLE 2-3

| CT-ASR (Assist Request) [MS-OTA <=> BS-OTA] | |
| --- | --- |
| Information Element | Length in Bits |
| Message Type | 8 |
| Assist Type | 8 |
| Assist Request Info | 144 |

This message is sent either from the BS-OTA to the mobile communication transceiver 603 or from the mobile communication transceiver 603 to the BS-OTA to request information. It provides a mechanism for the sender to request various items of information to assist it making well informed decisions.

TABLE 2-4

| CT-AUR (Authentication Reject) [MS-OTA <=> BS-OTA] | |
| --- | --- |
| Information Element | Length in Bits |
| Message Type | 8 |
| TCID | 8 |
| Cause | 8 |
| Reserved | 136 |

This message shall be sent to the mobile communication transceiver 603 from the BS-OTA to inform the mobile communication transceiver 603 that the Network Application has rejected its Authentication Response.

TABLE 2-5

| CT-AUR (Authentication Response) [MS-OTA <=> BS-OTA] | |
| --- | --- |
| Information Element | Length in Bits |
| Message Type | 8 |
| TCID | 8 |
| Authentication Test Response | 128 |
| Reserved | 16 |

The authentication response message shall be the mobile communication transceiver 603 response to an authentication challenge. It shall contain the results of encrypting the test number supplied by the authenticate message using the secret unique mobile user station traffic key.

TABLE 2-6

CT-AUT (Authentication Challenge) [MS-OTA <= BS-OTA]

| Information Element | Length in Bits |
|---|---|
| Message Type | 8 |
| TCID | 8 |
| Cipher Type | 8 |
| Cipher Key Sequence # | 8 |
| Authentication Test Number | 128 |

This message shall be sent to the mobile communication transceiver 603 from the BS-OTA whenever the BS starts an authentication sequence. This message shall supply a 128 bit challenge number to be used by the mobile user station 102 using the unique secret mobile user station traffic key to generate the authentication response message.

TABLE 2-7

CT-AUG (Authentication Rejection) [MS-OTA <= BS-OTA]

| Information Element | Length in Bits |
|---|---|
| Message Type | 8 |
| TCID | 8 |
| Cause | 8 |
| Reserved | 136 |

This message shall be sent to the mobile communication transceiver 603 from the BS-OTA whenever the communication system 101 rejects an Authentication Response from the mobile communication transceiver 603.

TABLE 2-8

CT-CIP (Set Cipher Mode) [MS-OTA <= BS-OTA]

| Information Element | Length in Bits |
|---|---|
| Message Type | 8 |
| Cipher Type | 8 |
| Cipher Algorithm ID | 8 |
| Frame Number | 24 |
| Cause | 8 |
| Reserved | 104 |

This message is sent to the mobile communication transceiver 603 from the BS-OTA whenever the base station 104 wishes the mobile communication transceiver 603 to switch to cipher mode. When the mobile communication transceiver 603 receives this message the mobile communication transceiver 603 uses the cipher mode parameters to set its ciphering equipment and then switches into or out of cipher mode. All traffic after this point will be ciphered.

TABLE 2-9

CT-CNC (Connection Complete) [MS-OTA <= BS-OTA]

| Information Element | Length in Bits |
|---|---|
| Message Type | 8 |
| TCID | 8 |
| Connection Number | 24 |
| OTA Map Type | 8 |
| OTA Map | 32 |
| Cipher Algorithm ID | 8 |

TABLE 2-9-continued

CT-CNC (Connection Complete) [MS-OTA <= BS-OTA]

| Information Element | Length in Bits |
|---|---|
| Frame Number | 24 |
| Reserved | 48 |

The CT-CNC message is set from the terminating base station 104 to the mobile communication transceiver 603 when a handover is completed.

TABLE 2-10

CT-CSC (Circuit Switch Complete) [MS-OTA <= BS-OTA]

| Information Element | Length in Bits |
|---|---|
| Message Type | 8 |
| (New) Zone | 40 |
| (New) Base ID | 32 |
| HRef | 48 |
| Reserved | 32 |

This message is set from the source base station 104 to the mobile communication transceiver 603 to signal that the communication system connection is available at the target base station 104.

TABLE 2-11

CT-DRG (De-registration) [MS-OTA => BS-OTA]

| Information Element | Length in Bits |
|---|---|
| Message Type | 8 |
| Cause | 8 |
| Reserved | 144 |

The mobile communication transceiver 603 shall send a de-registration message to the BS-OTA when the mobile communication transceiver 603 de-registers itself from the base station 104. If the mobile communication transceiver 603 does not send this message, de-registration shall automatically occur a fixed time-out period (e.g., 30 seconds) from the last time the mobile communication transceiver 603 sent a registration request to the base station 104.

TABLE 2-12

CT-HLD (Hold) [MS-OTA <=> BS-OTA]

| Information Element | Length in Bits |
|---|---|
| Message Type | 8 |
| Reserved | 152 |

Hold packets can be transmitted by either the BS-OTA or the mobile communication transceiver 603. They are always part of a larger signaling traffic exchange and are used to maintain the communication link across the O-Interface 610 while waiting for an external event.

TABLE 2-13

CT-IRP (Identity Reply) [MS-OTA => BS-OTA]

| Information Element | Length in Bits |
|---|---|
| Message Type | 8 |
| Identity Type | 8 |
| Identity Data | 72 |
| Reserved | 72 |

The mobile communication transceiver 603 sends a CT-IRP message to the BS-OTA in response to a CT-IRQ message.

TABLE 2-14

CT-IRQ (Identity Request) [MS-OTA <= BS-OTA]

| Information Element | Length in Bits |
|---|---|
| Message Type | 8 |
| Identity Type | 8 |
| Reserved | 144 |

The BS-OTA sends a CT-IRQ message to the mobile communication transceiver 603 when it receives an Identity Request Note from an application end user connected to a base station controller 105. This allows the application end user to obtain one of the mobile user station's Identifiers that is not normally included in the protocol.

TABLE 2-15

CT-HOF (Handover Failure) [MS-OTA <= BS-OTA]

| Information Element | Length in Bits |
|---|---|
| Message Type | 8 |
| Cause | 8 |
| Reserved | 144 |

This message is sent to the mobile communication transceiver 603 by either the originating base station or the terminating base station to indicate to the mobile user station that the request handover (OHR or THR) has failed.

TABLE 2-16

CT-OHC (Originating Handover Complete) [MS-OTA => Target BS-OTA]

| Information Element | Length in Bits |
|---|---|
| Message Type | 8 |
| HRef | 48 |
| PID | 72 |
| Registration Type | 8 |
| Registration Status | 8 |
| Reserved | 16 |

The Originating Handover Complete message is sent from the mobile communication transceiver 603 to the target (new) base station to complete the Originating Handover procedure.

TABLE 2-17

CT-OHR (Originating Handover Request) [MS-OTA => Originating BS-OTA]

| Information Element | Length in Bits |
|---|---|
| Message Type | 8 |
| (New) Zone | 40 |
| (New) BSC ID | 16 |
| (New) Base ID | 32 |
| Remaining Base Count | 8 |
| Reserved | 56 |

Originating Handovers will be attempted in cases when supporting a system such as DCS1900, where a terminating handover is not possible because there is no way the new base station controller 105 can notify the old base station controller 105 that the handover is required. The Originating Handover Request message is sent from the mobile communication transceiver 603 to the source BS-OTA to initiate the originating handover procedure.

TABLE 2-18

CT-RCP (Registration Complete) [MS-OTA <= BS-OTA]

| Information Element | Length in Bits |
|---|---|
| Message Type | 8 |
| Registration Status | 8 |
| Cause | 8 |
| Reg Timers | 8 |
| SBT | 128 |

Upon initial or periodic registration completion, the BS-OTA responds to the mobile communication transceiver 603 with a registration complete message.

TABLE 2-19

CT-REL (Release Link) [MS-OTA <=> BS-OTA]

| Information Element | Length in Bits |
|---|---|
| Message Type | 8 |
| Cause | 8 |
| Reserved | 144 |

This message is sent by either the mobile communication transceiver 603 or the BS-OTA when the sending side released the connection in progress or during link setup.

TABLE 2-20

CT-RRQ (Registration Request) [MS-OTA => BS-OTA]

| Information Element | Length in Bits |
|---|---|
| Message Type | 8 |
| Cipher Key Sequence # | 8 |
| Registration Type | 8 |
| Registration Status | 8 |
| Registration Info | 128 |

A registration request shall be sent from a mobile communication transceiver 603 to a BS-OTA on an initial and a periodic basis. Upon the initial request, the base station 104 shall enter the registration process. If the base station does not receive a periodic (30 seconds or as determined by the service provider) registration request from a mobile communication transceiver 603 which is currently registered with the base station, then the base station will initiate a deregistration procedure.

TABLE 2-21

CT-SPR (Specific Poll Response) [MS-OTA => BS-OTA]

| Information Element | Length in Bits |
| --- | --- |
| Message Type | 8 |
| PID | 72 |
| Service Provider | 16 |
| Class | 16 |
| Cipher Key Sequence # | 8 |
| Reserved | 40 |

The mobile communication transceiver 603 sends the CT-SPR message to the BS-OTA in response to an unsolicited Specific Poll (i.e., one that is not part of link acquisition). This occurs when the base station 104 wishes to initiate a transaction (e.g., incoming call or special operation).

TABLE 2-22

CT-SRS (Service Response) [MS-OTA <= BS-OTA]

| Information Element | Length in Bits |
| --- | --- |
| Message Type | 8 |
| TCID | 8 |
| Cause | 8 |
| Reserved | 136 |

The BS-OTA sends the CT-SRS message to the mobile communication transceiver 603 to inform the mobile user station of the communication system's response to a Service Request.

TABLE 2-23

CT-SRQ (Service Response) [MS-OTA => BS-OTA]

| Information Element | Length in Bits |
| --- | --- |
| Message Type | 8 |
| Resource Request Data | 32 |
| Service Type | 8 |
| Key Sequence # | 8 |
| TCID | 8 |
| Reserved | 96 |

The mobile communication transceiver 603 sends the service request message to the BS-OTA to request call management access to the communication system 101.

TABLE 2-24.1

CT-STL (Set Link) [BS-OTA => MS-OTA]

| Information Element | Length in Bits |
| --- | --- |
| Message Type | 8 |
| Resource Request Data | 32 |
| OTA Map Type | 8 |
| OTA Map | 32 |
| Cause | 8 |
| TCID | 8 |
| Connection Number | 24 |
| Reserved | 40 |

The BS-OTA sends the STL message to the mobile communication transceiver 603 when the BS-OTA wishes to change the characteristics of the over the air service across the O-Interface 610.

TABLE 2-24.2

CT-STL (Set Link) [MS-OTA => BS-OTA]

| Information Element | Length in Bits |
| --- | --- |
| Message Type | 8 |
| Resource Request Data | 32 |
| OTA Map Type | 8 |
| OTA Map | 32 |
| TCID | 8 |
| Reserved | 72 |

The mobile communication transceiver 603 sends the CT-STL message to the BS-OTA when the mobile user station wishes to change the characteristics of the over the air service across the O-Interface 610.

TABLE 2-25

CT-SYN (Synchronize) [MS-OTA <=> BS-OTA]

| Information Element | Length in Bits |
| --- | --- |
| Message Type | 8 |
| Reserved | 152 |

Synchronize messages can be transmitted by either the BS-OTA or the mobile communication transceiver 603. They are always part of recovery from an error in a signaling transaction. They are initiated by whichever side discovered the error.

TABLE 2-26

CT-THC (Terminating Handover Complete)
[MS-OTA => Target BS-OTA]

| Information Element | Length in Bits |
| --- | --- |
| Message Type | 8 |
| Registration Type | 8 |
| Registration Status | 8 |
| Reserved | 136 |

The terminating Handover Complete message is sent from the mobile communication transceiver 603 to the target (new) base station to complete the Terminating Handover procedure.

TABLE 2-27

CT-THR (Terminating Handover Request)
[MS-OTA => Target BS-OTA]

| Information Element | Length in Bits |
| --- | --- |
| Message Type | 8 |
| (Old) Zone | 40 |
| (Old) BSC ID | 16 |
| (Old) BS ID | 32 |
| (Old) Connection Number | 24 |
| Resource Request Data | 32 |
| Service Type | 8 |

Handovers can, with certain limitations, be initiated either from the old base station 104 (an originating handover) or the new base station 104 (a terminating handover). The mobile communication transceiver 603 will attempt a terminating handover whenever possible because they are faster and more robust. The Terminating Handover Request message is sent from the mobile communication transceiver 603 to the target BS-OTA to initiate the terminating handover procedure.

TABLE 2-28

CT-TRA (Transport Message) [MS-OTA <=> BS-OTA]

| Information Element | Length in Bits |
| --- | --- |
| Message Type | 8 |
| Transport Data | 152 |

The Transport message transports bearer or user data between the BS-OTA and mobile communication transceiver 603 on the circuit specified by TCID (part of the Message Type for CT-TRA Notes).

TABLE 2-29

CT-TSI (Time Slot Interchange) [MS-OTA => BS-OTA]

| Information Element | Length in Bits |
| --- | --- |
| Message Type | 8 |
| Reserved | 152 |

A Time Slot Interchange request shall be sent from a mobile communication transceiver 603 to a BS-OTA when the mobile communication transceiver 603 determines that its signal quality might improve if it were communicating with the BS-OTA on different time slot(s). The BS-OTA will respond with a CT-STL message, giving the mobile communication transceiver 603 a different time slot map, if it can accommodate the TSI request. If the BS-OTA cannot accommodate the TSI request it will respond with a CT-HOF message.

TABLE 2-30

CT-UID (Update ID) [MS-OTA <= BS-OTA]

| Information Element | Length in Bits |
| --- | --- |
| Message Type | 8 |
| New Personal ID | 72 |
| Reserved | 80 |

Upon receipt of an Update ID N-Note from a base station controller 105, the base station 104 sends the mobile user station 102 a CT-UID message.

The mobile communication system 101 transfers information in the form of signaling data and user data between a base station 104 and a base station controller 105 across an N-Interface 620. In a preferred embodiment, the N-Interface 620 comprises one or more 64 kbps DS0 lines between the base station 104 and base station controller 105. In a presently preferred embodiment, a base station 104 and base station controller 105 communicate signaling data across a single dedicated 64 kbps DS0 line, while user data is communicated across one or more separate 64 kbps DS0 lines. Each DS0 line operates according to the same protocol for the N-Interface 620.

Signaling data is communicated across the N-Interface 620 according to a protocol described in CCITT Recommendation Q.920/Q.921 called "Link Access Procedures on the D-channel ("LAPD"). LAPD is a subset of the ISO standard protocol High-level Data Link Control ("HDLC"). Further information regarding the LAPD protocol may be found in the CCITT IX Plenary Assembly Recommendations ("CCITT Blue Book"), Vol. VI, pp. 19–60, which is incorporated by reference as if set forth fully herein.

Signaling data information is transferred over the N-Interface 620 in the form of N-Notes. FIG. 11 is a diagram of a preferred format for a data frame 1105 which may be passed across the N-Interface 620 in the communication system 101. Each N-Note 1110 is encapsulated within a data frame 1105.

Each data frame 1105 generally begins with an opening flag 1115 and ends with a closing flag 1120. The opening flag 1115 and closing flag 1120 each comprise a predefined bit sequence (e.g., "01111110") which signals the beginning and end of a data frame 1105. A system component sending data across the N-Interface 620 examines the frame content between the opening flag 1115 and closing flag 1120, and inserts a 0-bit after all sequences of five consecutive 1-bits. A system component receiving data across the N-Interface 620 discards any 0-bit which directly follows five consecutive 1-bits.

Figure 12:
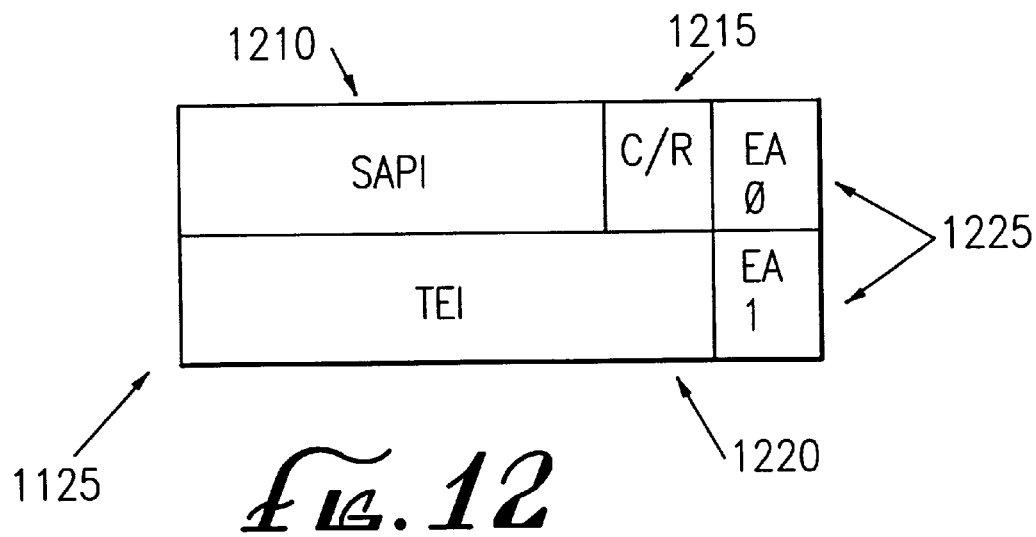
FIG. 12 is a diagram of an exemplary address field in the data packet of FIG. 11.

The opening flag 1115 is immediately followed by an address field 1125 comprising, e.g., 16 bits. FIG. 12 is a diagram of a preferred address field 1125 format. In the FIG. 12 embodiment, the address field 1125 comprises a Service Access Point Identifier (SAPI) subfield 1210 comprising, e.g., 6 bits, a command/response (C/R) bit 1215, and a terminal endpoint identifier (TEI) subfield 1220 comprising, e.g., 7 bits. The address field 1125 also has two extension address (EA) bits 1225, one in the first address field octet having a value of 0, and the second in the second address field octet having a value of 1.

The SAPI subfield 1210 identifies a protocol under which the current data frame 1105 operates. In one aspect, the SAPI subfield 1210 specifies an upper layer software entity for which the data carried by the current data frame 1105 is formatted. In a preferred embodiment, the N-Interface protocol may be specified by a SAPI subfield 1210 having a predefined value.

The TEI subfield 1220 identifies a specific terminal endpoint which is the destination for the current data frame 1105. Since the Q.921 link across the N-Interface 620 is actually a simple point-to-point connection between a base station 104 and a base station controller 105, only one TEI needs to be assigned to each physical interface in the mobile communication system 101. In a preferred embodiment, a unique TEI value is stored in each base station 104 and used during system initialization.

The address field 1125 is followed by a control field 1130 which identifies the type of frame as a command or response frame. The control field may be either a numbered information transfer (I), an unnumbered information transfer (U), or a supervisory frame (S).

The control field 1130 is followed by an information field 1135 which contains an N-Note 1110. The information field 1135 is followed by a frame check sequence 1140 comprising two eight-bit bytes.

Table 3-1 through Table 3-38 describe exemplary N-Notes which may be communicated across the N-Interface 620 in a preferred embodiment of the communication system 101. In Table 3-1 through Table 2-38, a base station 104 is denoted "BS" and a base station controller 105 is denoted "BSC."

TABLE 3-1

| Assist Information [BS <=> BSC] | |
| --- | --- |
| Information Element | Length in Octets |
| Protocol | 1 |
| System Type | 1 |
| Message Type | 1 |
| Assist Type | 1 |
| Assist Data | 18 |

This message is sent either from the base station 104 to the base station controller 105 or from the base station controller 105 to the base station 104. It provides a mechanism to impart various items of information to assist the recipient in making well informed decisions.

TABLE 3-2

| Assist Request [BS <=> BSC] | |
| --- | --- |
| Information Element | Length in Octets |
| Protocol | 1 |
| System Type | 1 |
| Message Type | 1 |
| Assist Type | 1 |
| Assist Request Info | 18 |

This message is sent either from the base station 104 to the base station controller 105 or from the base station controller 105 to the base station 104 to request information. It provides a mechanism for the sender to request various items of information to assist in making well informed decisions.

TABLE 3-3

| Authenticate [BS <= BSC] | |
| --- | --- |
| Information Element | Length in Octets |
| Protocol | 1 |
| System Type | 1 |
| Message Type | 1 |
| PID | 9 |
| TCID | 1 |
| Cipher Key Sequence # | 1 |
| Authentication Test Number | 16 |

The Authenticate N-Note is sent to the base station 104 from the network 126 to request that the base station 104 send to the mobile user station 102 in an Authenticate O-Note. The mobile user station 102 will then encrypt the "random" number using the authentication key provisioned into the mobile station 102 and send this encrypted number back to the base station 104 in an Authentication Response Message (CT-AUR) reply. The base station 104 then sends this result to the network 126 in an Authentication Reply N-Note.

TABLE 3-4

| Authenticate Reply [BS => BSC] | |
| --- | --- |
| Information Element | Length in Octets |
| Protocol | 1 |
| System Type | 1 |
| Message Type | 1 |

TABLE 3-4-continued

| Authenticate Reply [BS => BSC] | |
| --- | --- |
| Information Element | Length in Octets |
| PID | 9 |
| Authentication Test Response | 16 |

The Authenticate Reply N-Note from the base station 104 to the network 126 is triggered by an Authentication Response O-Note (CT-AUR) from the mobile user station 102. The Authenticate Reply N-Note communicates a sixteen octet encrypted response from the mobile user station 102 to the network 126 for confirmation. The network 126 will perform encryption on the original random number and compare the results for authentication. The Authenticate Reply should be the response to an earlier Authenticate N-Note issued for the given PID by the network 126. If the return value is incorrect, the proper response of the network 126 is to deny access by the mobile user station 102.

TABLE 3-5

| Authentication Reject [BS <= BSC] | |
| --- | --- |
| Information Element | Length in Octets |
| Protocol | 1 |
| System Type | 1 |
| Message Type | 1 |
| PID | 9 |
| TCID | 1 |
| Cause | 1 |

The Authentication Reject N-Note is sent to the base station 104 from the network 126 to inform the mobile user station 102 that the network 126 has rejected its Authenticate Reply.

TABLE 3-6

| Base Status Request [BS <= BSC] | |
| --- | --- |
| Information Element | Length in Octets |
| Protocol | 1 |
| System Type | 1 |
| Message Type | 1 |
| PID | 9 |
| Base ID | 4 |

The Base Status Request N-Note is sent to the base station 104 by the network 126 to initiate a Base Status Response N-Note from the base station 104.

TABLE 3-7

| Base Status Response [BS => BSC] | |
| --- | --- |
| Information Element | Length in Octets |
| Protocol | 1 |
| System Type | 1 |
| Message Type | 1 |
| PID | 9 |
| Base ID | 32 |

The Base Status Response N-Note is sent to the network 126 by the base station 104 after receiving a Base Status Request N-Note from the network 126.

TABLE 3-8

Cipher Response [BS => BSC]

| Information Element | Length in Octets |
|---|---|
| Protocol | 1 |
| System Type | 1 |
| Message Type | 1 |
| PID | 9 |
| Cause | 2 |

The Cipher Response N-Note is sent to the network 126 to inform it that the base station 104 and mobile user station 102 have configured and keyed their encryption equipment and have enabled the equipment.

TABLE 3-9

Circuit Switch Complete [BS <= BSC]

| Information Element | Length in Octets |
|---|---|
| Protocol | 1 |
| System Type | 1 |
| Message Type | 1 |
| PID | 9 |
| (New) Zone | 5 |
| (New) Base ID | 4 |
| HRef | 6 |

The Circuit Switch Complete N-Note is sent to the originating base station 104 from the network 126 when a handover circuit switch operation has completed. This message informs the originating base station 104 that the bearer channel has been switched from the originating base station 104 to the terminating base station 104 and that the originating base station 104 may release all the resources associated with the mobile user station 102.

TABLE 3-10

Circuit Switch Refused [BS => BSC]

| Information Element | Length in Octets |
|---|---|
| Protocol | 1 |
| System Type | 1 |
| Message Type | 1 |
| PID | 9 |
| (New) Zone | 5 |
| (New) Base ID | 4 |
| HRef | 6 |

The Circuit Switch Refused N-Note is sent to the network 126 from the originating base station 104 when the mobile user station 102 has rejected the circuit switch.

TABLE 3-11

Connect Link [BS => BSC]

| Information Element | Length in Octets |
|---|---|
| Protocol | 1 |
| System Type | 1 |
| Message Type | 1 |
| PID | 9 |
| TCID | 1 |

The Connect Link N-Note is sent from the base station 104 to the network 126 as the result of a CT-CNL message received from an mobile user station 102 while the base station 104 and mobile user station 102 are in a HOLD sequence initiated during an incoming call. The CT-ACK control traffic will be returned from the mobile user station 102. This message informs the network 126 that it may complete the connection with the calling station.

TABLE 3-12

Connect Link [BS <= BSC]

| Information Element | Length in Octets |
|---|---|
| Protocol | 1 |
| System Type | 1 |
| Message Type | 1 |
| PID | 9 |
| TCID | 1 |
| Connection Number | 3 |
| Cause | 1 |

The Connect Link N-Note is sent to the base station 104 from the network 126 when a connection has been made to another station via the network 126. This message associates the PID of an mobile user station 102 with a Connection Number.

TABLE 3-13

Connection Complete [BS <= BSC]

| Information Element | Length in Octets |
|---|---|
| Protocol | 1 |
| System Type | 1 |
| Message Type | 1 |
| PID | 9 |
| TCID | 1 |
| Cipher Algorithm ID | 1 |
| Cipher Key | 8 |
| Connection Number | 3 |

The Connection Complete N-Note is sent to the termination base station 104 from the network 126 when a handover circuit switch operation has completed. This message informs the terminating base station 104 that the bearer channel has been switched from the originating base station 104 to the terminating base station 104.

TABLE 3-14

Deregister [BS => BSC]

| Information Element | Length in Octets |
|---|---|
| Protocol | 1 |
| System Type | 1 |
| Message Type | 1 |
| PID | 9 |
| Class | 2 |
| Cause | 1 |

The Deregister N-Note is issued from the base station 104 to the network 126 as the result of either a DRG control traffic response message or a base station time-out, which indicates that the identified mobile user station 102 is no longer in the response range of the base station 104. The proper response of the network 126 is to release all resources which may have been preallocated to the mobile user station 102.

TABLE 3-15

Handover Failure [BS <= BSC]

| Information Element | Length in Octets |
|---|---|
| Protocol | 1 |
| System Type | 1 |
| Message Type | 1 |
| PID | 9 |
| Cause | 1 |

The Handover Failed N-Note is sent to both the source and target base stations 104 from the network 126 when the higher order network infrastructure has rejected the terminating or originating handover request from the mobile user station 102. Each base station must send a CT-HOF O-Note to the mobile user station 102 if/when it communicates with the mobile user station 102. The source base station 104 will maintain the existing connection to the mobile user station 102; the target base station 104 will release the connection with the mobile user station 102 after sending the CT-HOF.

TABLE 3-16

Handover Request [BS <= BSC]

| Information Element | Length in Octets |
|---|---|
| Protocol | 1 |
| System Type | 1 |
| Message Type | 1 |
| TCID | 1 |
| HRef | 6 |
| Connection Number | 3 |
| Cipher Algorithm ID | 1 |
| Cipher Key | 8 |
| Resource Request Data | 4 |
| Service Type | 1 |

The Handover Request N-Note is sent to the target base stations from the base station controller when the higher order network infrastructure is attempting to perform an originating handover request from the mobile user station 102. The target base station 104 will reserve the requisite resources for the circuit being handed over, if available, and will respond to the base station controller 105 with a Handover Request ACK message.

TABLE 3-17

Handover Request Reply [BS => BSC]

| Information Element | Length in Octets |
|---|---|
| Protocol | 1 |
| System Type | 1 |
| Message Type | 1 |
| HRef | 6 |
| Backhaul Map Type | 1 |
| Backhaul Map | 4 |
| Cause | 1 |

The Handover Request Reply N-Note is sent to the base station controller 105 in response to the Handover Request message.

TABLE 3-18

ID Updated [BS <=> BSC]

| Information Element | Length in Octets |
|---|---|
| Protocol | 1 |
| System Type | 1 |
| Message Type | 1 |
| PID | 9 |
| Cause | 1 |

The ID Updated N-Note is sent by the base station 104 to the network 126 to indicate the successful updating of an mobile user station PID.

TABLE 3-19

Identity Reply [BS => BSC]

| Information Element | Length in Octets |
|---|---|
| Protocol | 1 |
| System Type | 1 |
| Message Type | 1 |
| PID | 9 |
| Identity Type | 1 |
| Identity Data | 9 |

The Identity Reply N-Note is sent by the base station 104 to the network 126 to provide the mobile user station's requested identity.

TABLE 3-20

Identity Request [BS <= BSC]

| Information Element | Length in Octets |
|---|---|
| Protocol | 1 |
| System Type | 1 |
| Message Type | 1 |
| PID | 9 |
| Identity Type | 1 |

The ID Updated N-Note is sent by the network 126 to the base station 104 to request a mobile user station identifier that has not been provided as part of the mobile user station's normal communications with the network 126.

TABLE 3-21

Originating Handover [BS => BSC]

| Information Element | Length in Octets |
|---|---|
| Protocol | 1 |
| System Type | 1 |
| Message Type | 1 |
| PID | 9 |
| Count BasE | 1 |
| (New) Zone | 5 |
| (New) BSC ID | 2 |
| (New) Base ID | 4 |

The Originating Handover N-Note is sent from the base station 104 to the network 126 after an mobile user station 102 has returned to the originating base station 104 and has completed the originating handover control traffic sequence. This message contains the PID of the mobile user station 102, the base station ID and Zone of the terminating base station 104. This information is to be used by the network 126 to establish a bearer connection to the terminating base station 104. The network 126 should respond to the originating base station 104 with a Circuit Switch Complete N-Note signifying that the terminating base station 104 is now connected to the proper bearer channel.

Provision is made for this message to provide a list of base stations 104 the mobile user station 102 is willing to handover to. This allows the potential ability for the mobile user station 102 to signal the base station 104, as part of the CT-OTH message, that there are several acceptable alternatives and to send each of them to the originating base station 104 as sequential CT-OTH messages. The base station 104 may accumulate the acceptable base station list and send it to the base station controller 105 in a single message. The Count Base field lists the number of base stations 104 in the list.

TABLE 3-22

Originating Handover Complete [BS => BCS]

| Information Element | Length in Octets |
|---|---|
| Protocol | 1 |
| System Type | 1 |
| Message Type | 1 |
| PID | 9 |
| HRef | 6 |

The Originating Handover Complete N-Note is issued from the terminating base station 104 to the terminating application end user (e.g., network 126) connected to the base station controller 105 when a mobile user station 102 has completed its transfer of its bearer traffic from the originating base station 104 to the terminating base station 104. This happens when the mobile user station 102 issues a Originating Handover Complete control traffic message to the terminating base station 104.

TABLE 3-23

Page [BS <= BSC]

| Information Element | Length in Octets |
|---|---|
| Protocol | 1 |
| System Type | 1 |
| Message Type | 1 |
| PID | 9 |
| TCID | 1 |

The Page N-Note is sent to the base station 104 from the network 126 to notify the base station 104 of an incoming call. The base station 104 should initiate a Specific Poll sequence for the mobile user station 102 named by the PID. When the mobile user station 102 responds to the Specific Poll, the base station 104 should send an Altering N-Note back to the network 126.

TABLE 3-24

Page Response [BS => BSC]

| Information Element | Length in Octets |
|---|---|
| Protocol | 1 |
| System Type | 1 |
| Message Type | 1 |
| PID | 9 |
| TCID | 1 |
| Cipher Key Sequence # | 1 |
| Class | 2 |

The Page Response N-Note is sent from the base station 104 to the network 126 as soon as a specific poll response, which is the result of an Setup N-Note initiated specific poll, is received from the mobile user station 102 named by the PID. This notification can be used by the network 126 to indicate a successful attempt to find a specific mobile user station 102. If the network 126 does not receive Page Response from the base station 104 sometime after the network 126 has sent a Setup N-Note to the base station 104, the network 126 may infer that the given mobile user station 102 is not currently reachable through this base station 104. Being unavailable should trigger a Deregistration sequence.

TABLE 3-25

Register [BS <= BSC]

| Information Element | Length in Octets |
|---|---|
| Protocol | 1 |
| System Type | 1 |
| Message Type | 1 |
| PID | 9 |
| Registration Type | 1 |
| Registration Info | 18 |
| Cipher Key Sequence # | 1 |
| Class | 2 |

The Register N-Note is sent to the network 126 from the base station 104 as a result of the completion of an acquire and registration poll and control traffic sequence between the mobile user station 102 and the base station 104. This message requests that resources needed to access application end user be allocated in the network 126 for this mobile user station 102. If these resources have already been allocated, then the network 126 should not allocate new resources. In any event, the network 126 should reply with a Registration Result N-Note.

TABLE 3-26

Registration Result [BS <= BSC]

| Information Element | Length in Octets |
|---|---|
| Protocol | 1 |
| System Type | 1 |
| Message Type | 1 |
| PID | 9 |
| Cause | 1 |

The Registration Result N-Note is sent to the base station 104 from the network 126 when the higher order network infrastructure responds to the mobile user station's Register request.

TABLE 3-27

Release Link [BS <= BSC]

| Information Element | Length in Octets |
|---|---|
| Protocol | 1 |
| System Type | 1 |
| Message Type | 1 |
| PID | 9 |
| TCID | 1 |
| Cause | 18 |

The N-Note Release Link is sent by either the base station 104 or the network 126 to indicate that the sender wishes to release the link. If the TCID is non-zero, the Release Link is for a virtual circuit and the request is ignored. If the TCID is zero, a Release Link Complete message is always sent (even if recipient does not recognize the PID).

TABLE 3-28

Release Link Complete [BS <= BSC]

| Information Element | Length in Octets |
|---|---|
| Protocol | 1 |
| System Type | 1 |
| Message Type | 1 |
| PID | 9 |
| TCID | 1 |

The Release Link Complete N-Note is sent by either the base station 104 or the network 126 to indicate that the sender has released the channel and the TCID.

TABLE 3-29

Service Information [BS <= BSC]

| Information Element | Length in Octets |
|---|---|
| Protocol | 1 |
| System Type | 1 |
| Message Type | 1 |
| PID | 9 |
| Backhaul Map Type | 1 |
| Backhaul Map | 4 |
| Cause | 1 |

The Service Information N-Note is sent from the base station 104 to the network 126. This message informs the network 126 of the bearer channels that have been assigned by the base station 104 for this call.

TABLE 3-30

Cipher Mode [BS <= BSC]

| Information Element | Length in Octets |
|---|---|
| Protocol | 1 |
| System Type | 1 |
| Message Type | 1 |
| PID | 9 |
| Cipher Algorithm ID | 1 |
| Cipher Key | 8 |

The Set Cipher Mode N-Note is sent from the network 126 to the base station 104. It requests the base station 104 to set the mode key and key sequence of its encryption equipment. The base station 104 does not enable its encryption equipment at this time.

TABLE 3-31

Service Request [BS => BSC]

| Information Element | Length in Octets |
|---|---|
| Protocol | 1 |
| System Type | 1 |
| Message Type | 1 |
| PID | 9 |
| TCID | 1 |
| Resource Request Data | 4 |
| Service Type | 1 |
| Key Sequence # | 1 |
| Class | 2 |

The Service Request N-Note is sent to the network 126 the base station 104 upon the completion of CT-SRQ control traffic exchange. Failure to respond will result in dropping the connection between the base station 104 and mobile user station 102.

TABLE 3-32

Service Response [BS <= BSC]

| Information Element | Length in Octets |
|---|---|
| Protocol | 1 |
| System Type | 1 |
| Message Type | 1 |
| PID | 9 |
| TCID | 1 |
| Cause | 1 |

The Service Response N-Note is sent to the base station 104 by the network 126 to notify the base station 104 of the results of the base station's Service Request message.

TABLE 3-33

Set Link [BS <= BSC]

| Information Element | Length in Octets |
|---|---|
| Protocol | 1 |
| System Type | 1 |
| Message Type | 1 |
| PID | 9 |
| TCID | 1 |
| Resource Request Data | 4 |
| Connection Number | 1 |

The Set Link N-Note is sent to the base station 104 from the network 126 to notify the base station 104 of a SETUP message from the network 126.

TABLE 3-34

Terminating Handover [BS => BSC]

| Information Element | Length in Octets |
|---|---|
| Protocol | 1 |
| System Type | 1 |
| Message Type | 1 |
| PID | 9 |
| (Old) Zone | 5 |
| (Old) BSC ID | 2 |
| (Old) Base ID | 4 |
| Connection Number | 3 |
| (New) Backhaul Map Type | 1 |
| (New) Backhaul Map | 4 |

The Terminating Handover N-Note is sent from the base station 104 to the network 126 after an mobile user station 102 has acquired a base station channel (i.e., time slot) on the terminating base station 104 and has completed the Terminating Handover Request Control Traffic sequence. This message contains the PID and Universal Phone number of the mobile user station 102, as well as the Connection Number, Zone and base station controller ID of the base station controller which had been previously carrying the connection. This information is used by the network 126 to establish a bearer connection to the previous connection and to inform the old base station 104 to release its connection and the resources allocated to this mobile user station 102. Within a reasonable amount of time, the network 126 should respond to the base station 104 with a Circuit Switch Complete N-Note signifying that this base station 104 is now connected to the proper bearer channel.

TABLE 3-35

Terminating Handover Complete [BS => BSC]

| Information Element | Length in Octets |
| --- | --- |
| Protocol | 1 |
| System Type | 1 |
| Message Type | 1 |
| PID | 9 |

The Terminating Handover Complete N-Note is issued from the terminating base station 104 to the terminating application end user connected to the base station controller 105 when a mobile user station 102 has completed its transfer of its bearer traffic from the originating base station 104 to the terminating base station 104. This happens when the mobile user station 102 issues a Terminating Handover Complete O-Note to the terminating base station 104.

TABLE 3-36

Transfer Complete [BS => BSC]

| Information Element | Length in Octets |
| --- | --- |
| Protocol | 1 |
| System Type | 1 |
| Message Type | 1 |
| PID | 9 |

The Transfer Complete N-Note is issued from the base station 104 to the network 126 when a mobile user station 102 transfers its bearer traffic from the originating base station 104 to the terminating base station 104. This is assumed to occur when the originating base station 104 sends a Circuit Switch Complete (CSC) O-Note to the mobile user station 102.

TABLE 3-37

Transport [BS <=> BSC]

| Information Element | Length in Octets |
| --- | --- |
| Protocol | 1 |
| System Type | 1 |
| Message Type | 1 |
| PID | 9 |
| TCID | 1 |
| Transport Data | 19 |

The Transport N-Note is sent from the base station 104 to the network 126 to send signaling or bearer data to the network 126.

TABLE 3-38

Update ID [BS <= BSC]

| Information Element | Length in Octets |
| --- | --- |
| Protocol | 1 |
| System Type | 1 |
| Message Type | 1 |
| PID | 9 |
| New PID | 9 |

The Update ID N-Note is sent to the base station 104 from the application end user connected to the base station controller 105 to notify the base station 104 to update the identity of the mobile user station 102 described by the PID information element. The New PID information element may represent a temporary identification for the mobile user station 102 as provided for in the definition of the New PID.

Figure 8:
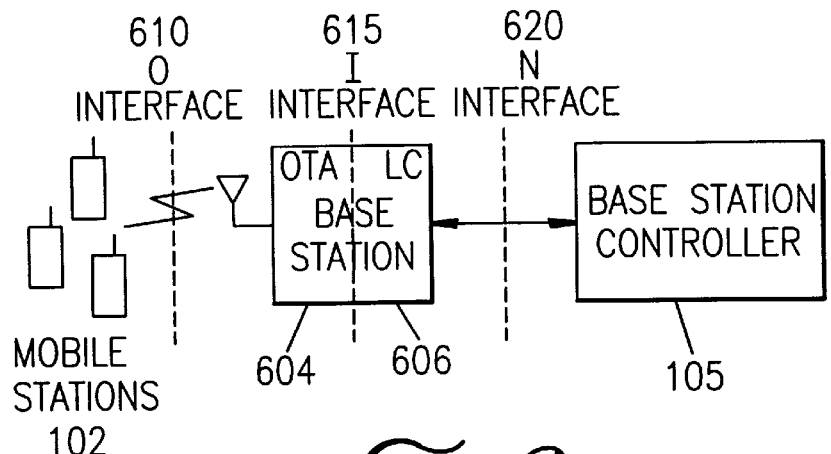
FIG. 8 is a diagram of an embodiment of the FIG. 6 system architecture focusing on the base station interfaces.

The mobile communication system 101 transfers information in the form of signaling data within the base station 104 between the base station transceiver 604 and the base station line card processor 606 across the I-Interface 615 in the form of I-Notes. FIG. 8 is a diagram of the FIG. 6 system architecture focusing on the base station interfaces, showing the separation between the base station transceiver 604 and the line card processor 606. The base station transceiver 604 and the line card processor 606 preferably each has its own local microprocessor or controller, and its own resident software.

Figure 9:
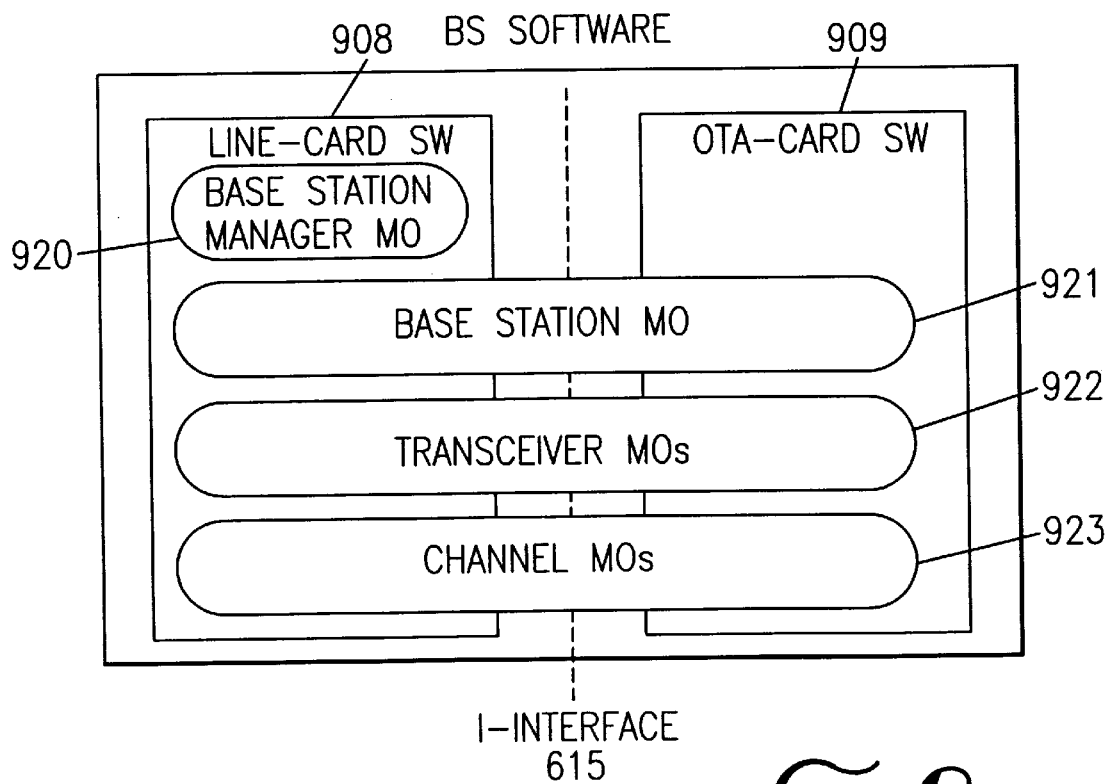
FIG. 9 is a diagram illustrating a breakdown of software functionality within a base station.

FIG. 9 is a diagram illustrating a breakdown of software functionality for operations, administration, maintenance and provisioning (OAM&P) within a base station 104. In FIG. 9 is shown a functional division between base station transceiver software 909 and the line card processor software 908. The base station transceiver software 909 and line card processor software 908 are directed to the control of managed objects. The line card processor software 908 is responsible by itself for the control of a base station manager managed object 920, and shares responsibility with the base station transceiver software 909 for control of a base station managed object 921, transceiver managed objects 922, and channel managed objects 923.

The base station manager managed object 920 is responsible for communication of high layer information between the base station 104 and the base station controller 105, and for the management of all functionality related to the line-card processor 606. The base station managed object 921 provides the OAM&P control functions common to one or more transceivers, and is responsible for all OAM&P base station functionality other than the line card processor 606. The transceiver managed objects 922 are responsible for the management of the base station equipment that provides the time slot structure shown in FIG. 3, including modulation and transmission of information data as well as reception and demodulation. The channel managed objects 923 are responsible for the management of individual physical channels (i.e., separate time slots 302).

Control of the OAM&P functions are carried out across the OOMT interface between the base station controller 105 and the base station 104 shown in FIG. 6.

Figure 14:
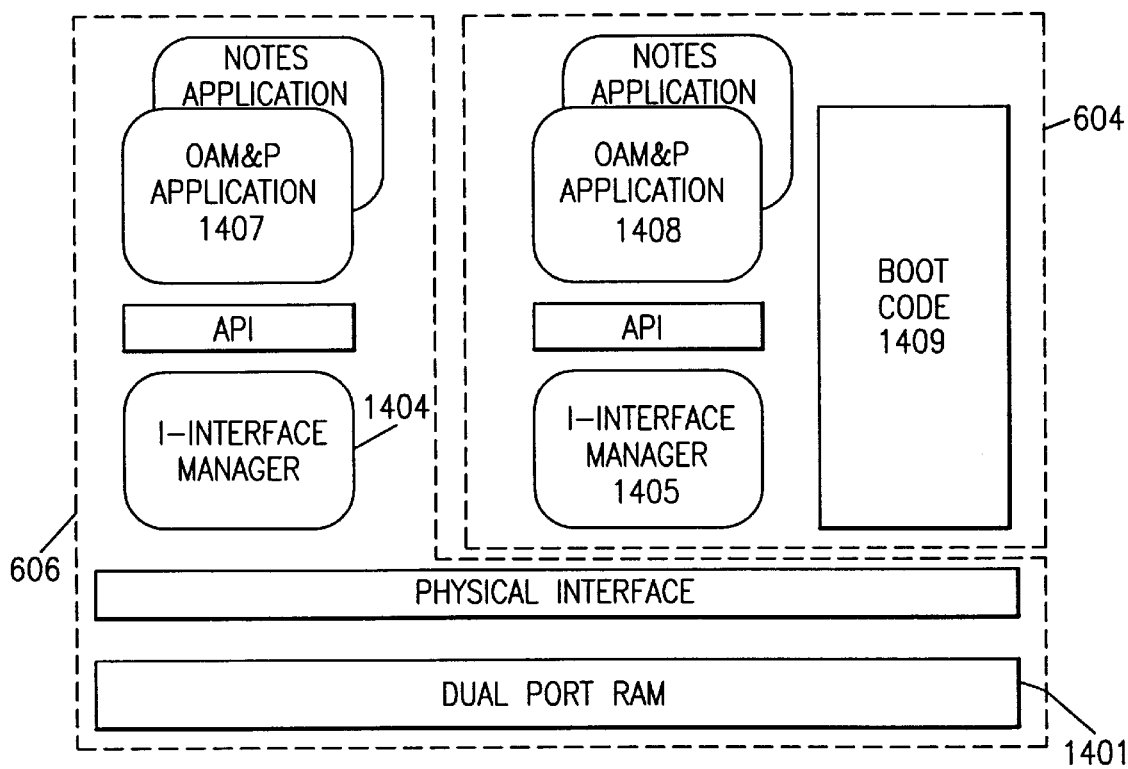
FIG. 14 is a diagram of a particular I-interface architecture utilizing a shared memory element (i.e., dual-port RAM)

In a preferred embodiment, the I-Interface 615 includes a dual port random access memory (RAM). FIG. 14 is a high-level diagram of a base station 104 including a dual-port RAM 1401 for implementing the I-interface 615. Application information 1407, 1408 is communicated across the I-interface using the dual-port RAM 1401. The base station transceiver 604 and line card processor 606 each comprise an I-interface manager 1405 and 1404, which may be implemented as software subroutines. The I-interface managers 1404, 1405 facilitate transfer of information across the I-interface 615.

The physical interface to the dual-port RAM 1401 is preferably identical for both the base station transceiver 604 and the line card processor 606. The base station transceiver 604 comprises boot code 1409 (in addition to operational code); thus, two modes of use are provided: (1) a non-operational mode, wherein the dual-port RAM 1401 may be used for initialization of the base station transceiver 604 (including software download from a base station controller 105, if desired), and (2) an operational mode, wherein the dual-port RAM 1401 is used for transfer of information to and from an application end user 602 using the I-interface 615.

The dual port RAM 1401 comprises a common memory which may be accessed by both the line card processor 606 and the base station transceiver 604 in the base station 104. The line card processor 606 and the base station transceiver 604 transfer information across the I-Interface 615 by reading and writing I-Notes to the common dual port RAM 1401. The dual port RAM 1401 is also used for transfer of bearer information for each of the time slot channels, and thus comprises adequate storage to transfer data blocks to and from mobile user stations 102. Alternatively, the bearer data could be provided in a direct link to the line card processor 606 from the base station transceiver 604.

System requirements may specify that certain events or messages have a greater priority over other events occurring in the system. For example, handoff events or emergency events may have a relatively high priority. Call control events may also have a relatively high priority, but less than that of handoff events or emergency events. Application messages may be given a lower priority than signaling messages.

The I-interface may be configured so as to facilitate prioritization of various events and system messages. A plurality of distinct priority groups may be defined. In a particular embodiment, three priority groups are defined, a high priority group including, e.g., handoff events and emergency events, a medium priority group including, e.g., communication management events and call control messages, and a low priority group including other types of less urgent messages.

A plurality of prioritized queues may be provided, each prioritized queue associated with one of the three priority groups. Each prioritized queue comprises a plurality of message buffers (preferably fixed length message buffers). Messages from the high priority group are placed in a first queue; messages from the medium priority group are placed in a second queue; and messages from the low priority group are placed in a third queue. The I-interface managers 1404, 1405 keep track of the prioritized queues and handle message transfers to and from the queues.

The queues may each operate on a "first-in first-out" (FIFO) basis. Where several messages are to be aggregated for delivery or reception over a particular channel (e.g., time slot), each channel may be provided with its own individual FIFO. Both "send" and "receive" queues are provided for bi-directional transfer of information.

The I-interface managers 1404, 1405 each implement at least three software functions with respect to the prioritized queues. A first software function returns a pointer to the next available send NOTE buffer in the designated queue. A NULL return pointer indicates that the queue is full. A second software function activates any semaphore and updates pointers for a queue acting on the current send NOTE buffer. A zero return value indicates success. A third software function returns a pointer to the next available NOTE buffer in the designated queue. A NULL return pointer indicates that the queue is full.

FIG. 15 is a table of an exemplary partial map for a dual-port RAM 1401. The dual port RAM map includes the total number of prioritized queues and, for each queue, the address of a read ("get") pointer, the address of a write ("put") pointer, the start address of the queue, and the queue length.

The dual-port RAM 1401 is used for both bearer data message transfer and prioritization of certain signaling messages. Bearer data messages are stored in predefined locations in the dual-port RAM 1401, and can be accessed by either the line card processor 606 or the base station transceiver 604. The dual-port RAM 1401 may preferably hold at least 2,304 bearer-bytes of information (for a base station 104 supporting up to 32 user stations 102), and has an additional 32 kilobytes for the prioritized queues.

Figure 16A:
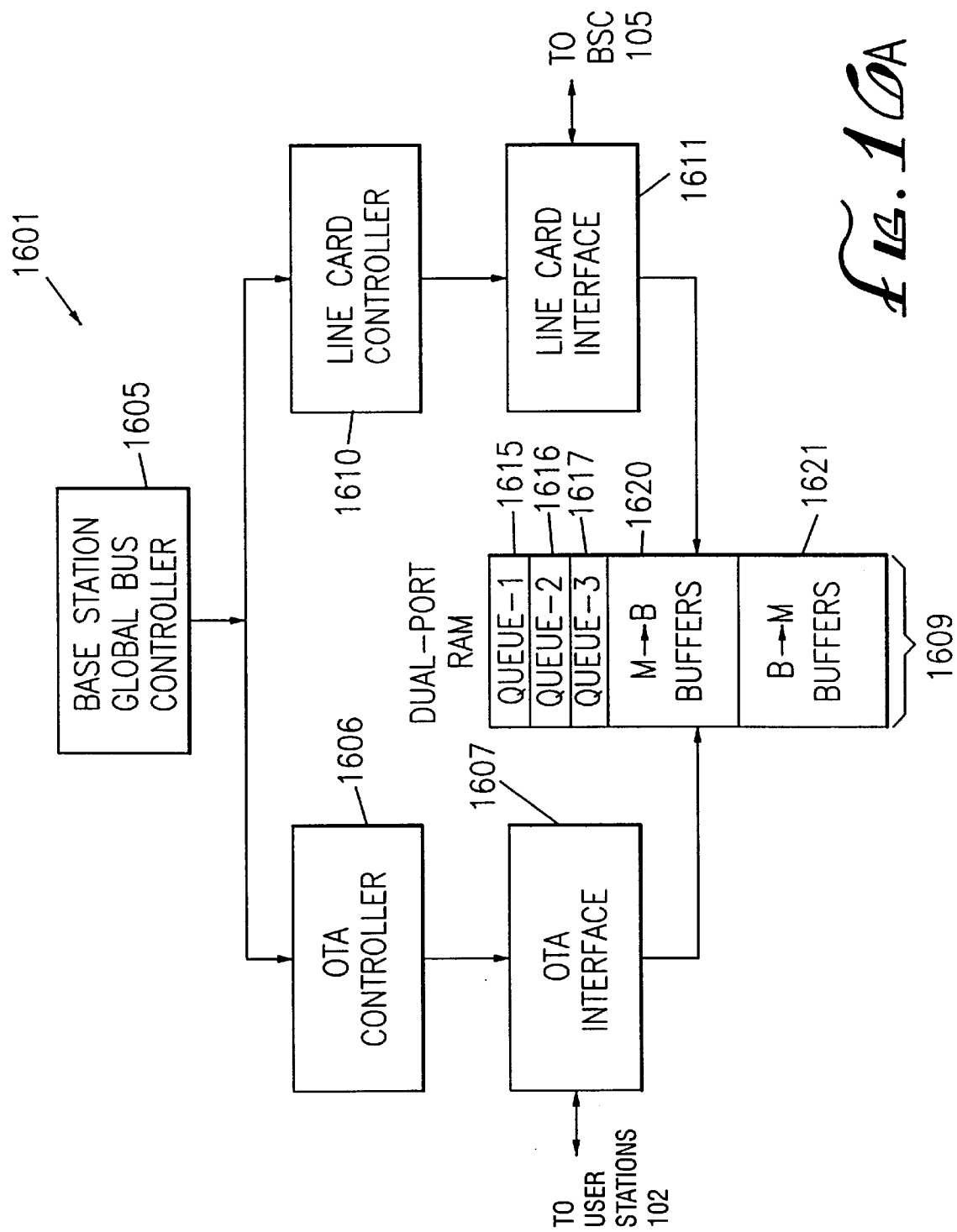
FIGS. 16A and 16B are a block diagrams of a base station showing separate controllers and interface components.

FIG. 16A is a block diagram of a base station 1601 in accordance with one embodiment of the present invention. In FIG. 16, a dual-port RAM 1609 (e.g., dual-port RAM 1401 of FIG. 14) comprises a plurality of queues 1615, 1616, and 1617, and buffers 1620, 1621 for storing messages originating from and destined for user stations 102. An over-the-air (OTA) interface 1607, under control of an OTA controller 1606, transmits and receives messages from user stations 102. A line card interface 1611, under control of a line card controller 1610, transmits and receives messages from a base station controller 105 (see FIG. 1B). A base station global bus controller 1605 controls mode selection of the OTA controller 1606 and line card controller 1610, handles interrupts, and responds to commands from the system regarding operation of the base station 1601 as a whole (e.g., whether the base station 104 should be on-line or off-line, etc.).

Figures 1, 16B:
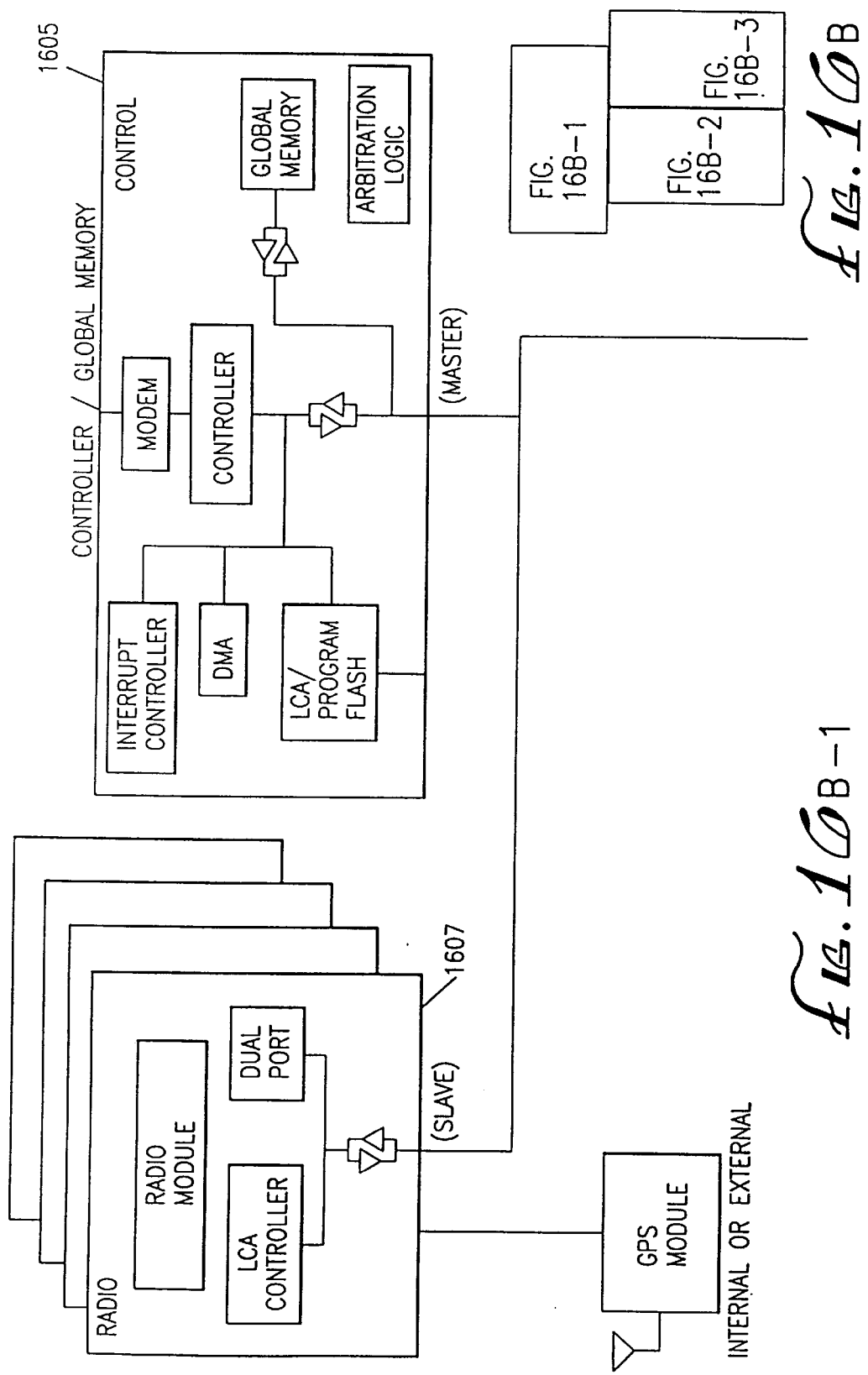
Figures 2, 16B:
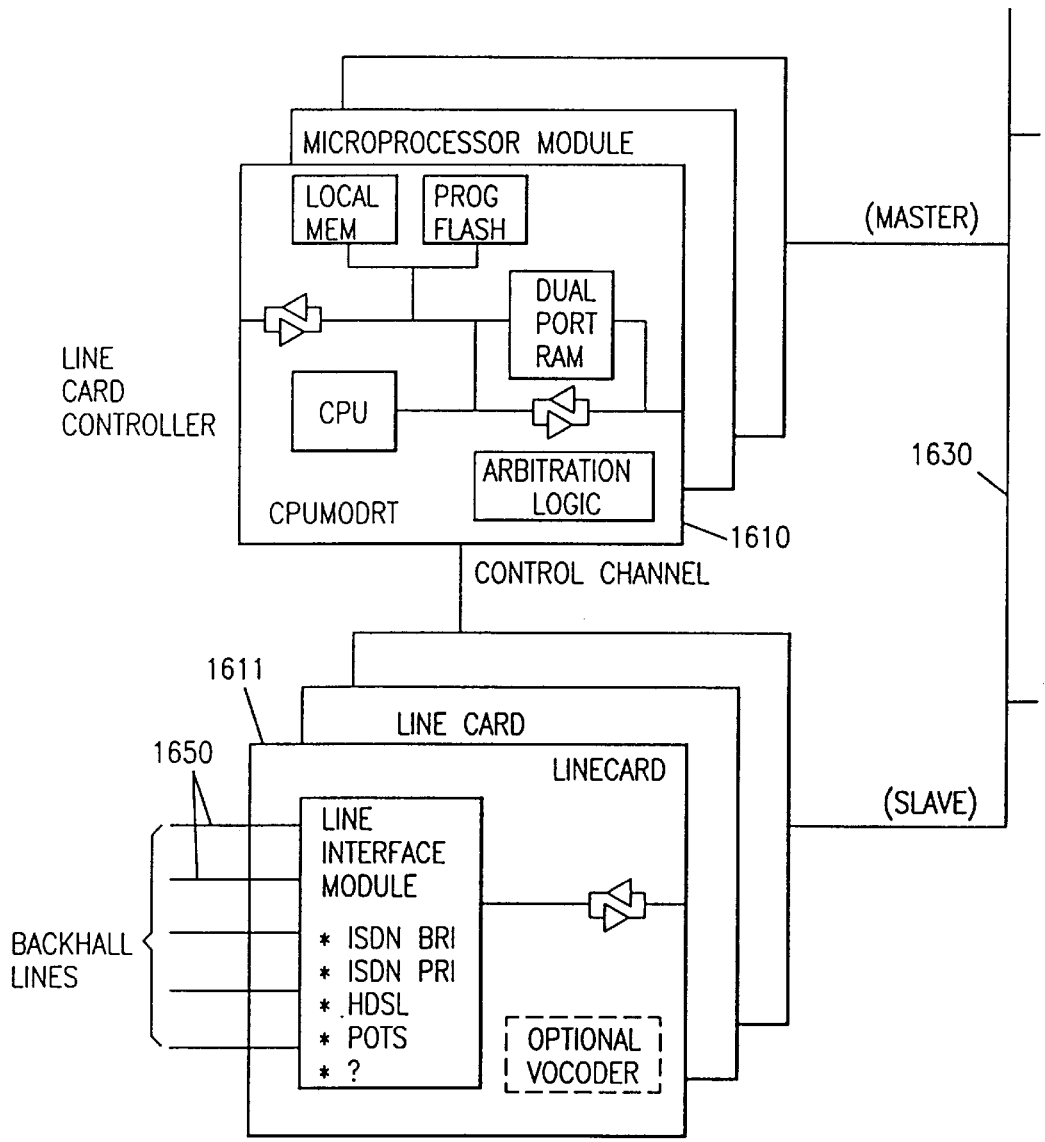
Figure 16B:
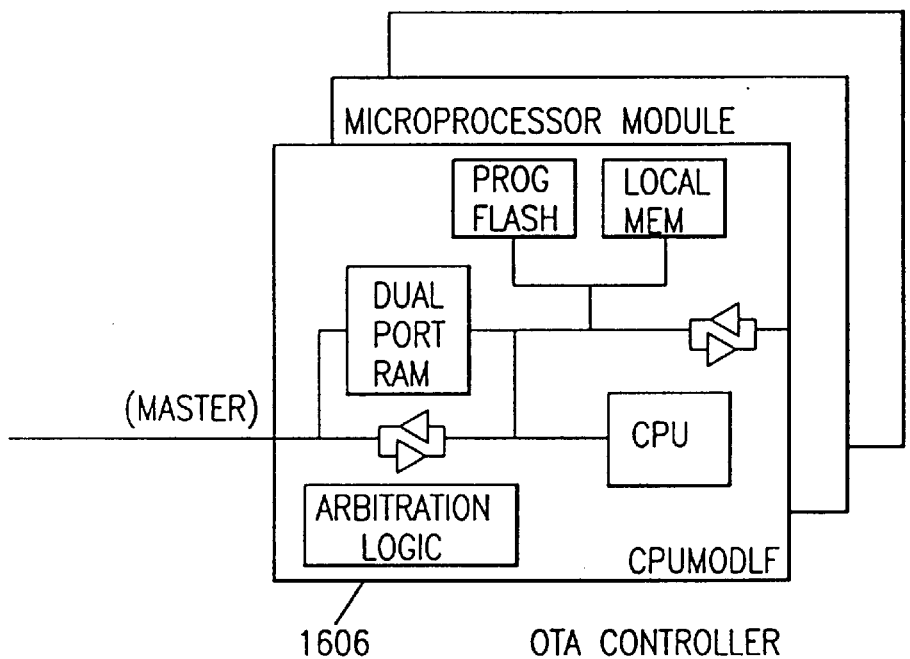
Figure 3:
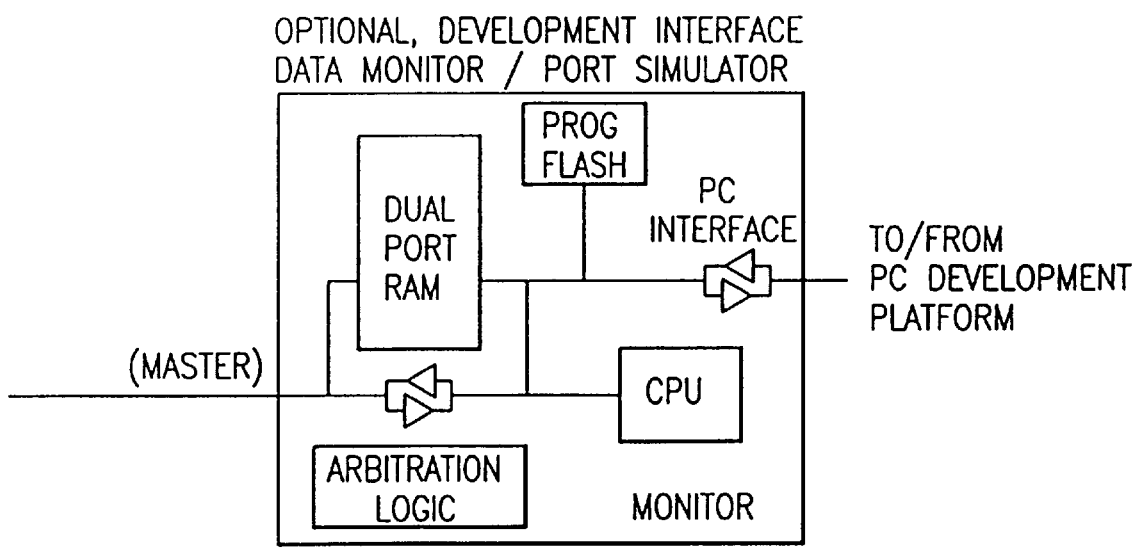

FIG. 16B is a more detailed diagram of internal components of the base station 1601, showing the internal components and connections of the components shown in FIG. 16A. The FIG. 16B diagram shows a global bus 1630 connected to several of the internal components, as well as backhaul lines 1650 from the line card interface 1611 which ultimately connect to the base station controller 105.

FIG. 17A is a diagram of an exemplary memory map for the dual-port RAM 1401, not considering the map portion for the prioritized queues shown in FIG. 15. FIG. 17B is an alternative memory map for the dual-port RAM 1401, and is configured for analog backhaul lines from the base station 104 to the base station controller 105.

In a preferred embodiment, the communication system 101 uses I-Notes having the same format as the N-Notes as shown in FIG. 11. Examples of I-Notes which may be communicated across the I-Interface are given in Table 3-1 through Table 3-38.

Because messages to and from the user stations 102 are generally not in the form of I-Notes, the base station transceiver 604 translates relevant portions of the over-the-air messages into an I-Note format, and either uses or sends I-Notes received from the line card processor 606 across the I-interface 605. If an O-Note is contained in a B-field 529 of a user message (as indicated by a flag in the header 523), then the base station transceiver 604 extracts the O-Note and places it in one of the three queues 1615, 1616 or 1617. If an O-Note is contained in segments within D-fields 527 sent over several messages, then the base station transceiver 604 may store the O-Note in a buffer associated with the user station 102 on the particular channel until the entire O-Note is received, and then place the entire O-Note in the appropriate one of the three queues 1615, 1616 or 1617. In some cases, the base station transceiver 604 performs a translation (or removes or adds fields or other information) before storing the message (now an I-Note) in the appropriate queue 1615, 1616 or 1617.

Similarly, when the base station transceiver 604 reads an I-Note from the dual-port RAM 1609, it may perform a translation of the I-Note (or remove or add fields as necessary) and insert the message (now an O-Note) in the B-field 559 of a base message, and indicate the presence of an O-Note by setting the appropriate flag in the base message header 553. If the O-Note does not represent a relatively urgent signaling message, and voice data or other user data is being sent in the B-field 559, the base station transceiver 604 may send the O-Note in segments over a plurality of base messages, utilizing the D-field 557.

In a preferred embodiment, the communication system 101 operates with Notes which contain common Information Elements which may be passed across several system interfaces. Table 4-1 through Table 4-65 describe Information Elements which may be included in Notes which are communicated across system interfaces in a preferred embodiment of the communication system 101. Information Elements may comprise signaling data which is used by components within the communication system 101 to perform functions in support of one or more application end users. A specific Information Element, referred to as Transport Data, comprises application level data and is described in Table 4-62.

TABLE 4-1

ACK'ed Command [O,M]

The ACK'ed Command information element contains the Type of the specific command being acknolwed. The values are the same as the Message Type on the given interface.

| Bits | Octets |
|---|---|
| 8 7 6 5 4 3 2 1 | |
| ACK'ed Command | 1 |

TABLE 4-2

ACK Response [O,M]

The ACK Response information element contains the acknowledgement response.

| Bits | Octets |
|---|---|
| 8 7 6 5 4 3 2 1 | |
| ACK'ed Response | 1 |

| ACK Response | |
|---|---|
| 0 | Successful acknowledge |
| 1 | Unsuccessful acknowledge (NAK) |
| 2-255 | Reserved |

TABLE 4-3

Assist Data [O, M, N, I]

The Assist Data element is a 144 bit field that is used by the sender to pass information to the receiver. This information may or may not have been solicited by an Assist Request. The format and meaning of the Assist Information is dependent upon the Assist Type.

TABLE 4-3-continued

Assist Data [O, M, N, I]

| Bits | Octets |
|---|---|
| 8 7 6 5 4 3 2 1 | |
| 144 bit Assist Data | 1 |
| | 2 |
| | 3 |
| | 4 |
| | . |
| | . |
| | . |
| | 18 |

TABLE 4-4

Assist Request Info

The Assist Request Info element is a 144 bit field that is used by the sender of an Assist Request to provide additional information identifying the request. The most lekely use of this element will be to provide a PID when requesting information about a specific user station 102. This information element also contains the identity of the requester so that the requester can be named as the recipient of the Assist Information message which results from this request. The format and meaning of the Assist Request Info is dependent upon the Assist Type.

| Bits | Octets |
|---|---|
| 8 7 6 5 4 3 2 1 | |
| Assist Requester \| 141 bits Assist Request Info | 1 |
| | 2 |
| | 3 |
| | 4 |
| | . |
| | . |
| | . |
| | 18 |

Same values and meanings as the Assist Msg Recipient subfield of the Assist Type information element.

TABLE 4-5

Assist Type [O, M, N, I]

The Assist Type is divided into two subfields,

| Bits | Octets |
|---|---|
| 8 7 6 5 4 3 2 1 | |
| Assist Msg Recipient \| Assist Item | 1 |

TABLE 4-5.1

Assist Item
Identifies the Information being Requested

| Assist Type | Information Source | Item |
|---|---|---|
| 0 | — | Reserved |
| 1 | BS-OTA | Surrounding Base Table |

TABLE 4-5.1-continued

Assist Item
Identifies the Information being Requested

| Assist Type | Information Source | Item |
|---|---|---|
| 2 | BS-OTA | Surrounding Base Table (Continuation) |
| 3 | BS-OTA | Recommend Time Slot Interchange |
| 4 | BS-OTA | Recommend Handover |
| 5 | BS-OTA | Date & Time |
| 6 | BS-OTA | OTA Map |
| 7 | BS-OTA | Backhaul Map |
| 8 | BSC | Date & Time |
| 9 | BSC | Code-Frequency Redefinition |
| 10–31 | — | Reserved |

TABLE 4-5.2

Assist Msg Recipient
Identifies the recipient of the assist message. If the message is an Assist Request message, then the recipient is the Information Source (i.e., the process which provides the information). If the message is an Assist Information message, then the recipient is the Information Destination (i.e., the process which may use the information). If the Assist Information message was requested, the Assist Message Recipient will be the Assist Requester subfield of the Assist Request Info information element of the Assist Request message is unsolicited, the sender will be able to supply the Assist Message Recipient independently.
The following recipients are defined:

| 0 | MS-APP |
|---|---|
| 1 | MS-OTA |
| 2 | BS-OTA |
| 3 | BS-Line Card |
| 4 | BSC |
| 5–7 | Reserved |

TABLE 4-6

Authentication Test Number [O, M, N, I]

The Authentication Test Number information element contains a 16 byte (128 bit) value to be used in authenticating an user station 102.

TABLE 4-6.1

Key Type is DSC1900:

If the Protocol of an Authenticate message is DSC1900, then the authentication parameter is a 128 bit pseudo random number which is sent to the user station 102 for the authentication process.

TABLE 4-6.1-continued

Key Type is DSC1900:

| Bits | Octets |
|---|---|
| 8 7 6 5 4 3 2 1 | |
| 128 bit Pseudo Random Number | 1 |
| | 2 |
| | 3 |
| | 4 |
| | 5 |
| | 6 |
| | 7 |
| | 8 |
| | 9 |
| | 10 |
| | 11 |
| | 12 |
| | 13 |
| | 14 |
| | 15 |
| | 16 |

TABLE 4-6.2

Protocol is Bellcore "C"

If the Protocol is Bellcore "C", then the authentication parameter is RAND (a random number), 64 bits of which are to be used by the base station 104 in the authentication process.

| Bits | Octets |
|---|---|
| 8 7 6 5 4 3 2 1 | |
| 64 bit RAND | 1 |
| . | 2 |
| . | 3 |
| . | 4 |
| . | 5 |
| . | 6 |
| . | 7 |
| . | 8 |
| Reserved | 9 |
| . | 10 |
| . | 11 |
| . | 12 |
| . | 13 |
| . | 14 |
| . | 15 |
| Reserved | 16 |

TABLE 4-7

Authentication Test Response [O, M, N, I]

The contents of the Authentication Test Response information element depends upon the infrastructure of the system. If the Authenticate N_Notes RMT message that stimulated the response was of type DCS1900, then the contents is the 32 bit result of applying the authentication algorithm to the pseudo- random number supplied. If the Authentication N_Notes RMT message was of Bellcore "C" type, then a single bit of the result signifies either successful authentication or failure.

TABLE 4-7.1

DCS1900 Response

| Bits | | | | | | | | Octets |
|---|---|---|---|---|---|---|---|---|
| 8 | 7 | 6 | 5 | 4 | 3 | 2 | 1 | |
| Response Data ||||||||  1 |
| Response Data ||||||||  2 |
| Response Data ||||||||  3 |
| Response Data ||||||||  4 |
| Reserved ||||||||  5 |
| . ||||||||  |
| . ||||||||  |
| . ||||||||  |
| Reserved ||||||||  16 |

TABLE 4-7.2

IS-54 Response

| Bits | | | | | | | | Octets |
|---|---|---|---|---|---|---|---|---|
| 8 | 7 | 6 | 5 | 4 | 3 | 2 | 1 | |
| Result ||||||||  1 |
| Reserved ||||||||  2 |
|  ||||||||  3 |
|  ||||||||  4 |
|  ||||||||  5 |
| . ||||||||  |
| . ||||||||  |
| . ||||||||  |
| Reserved ||||||||  16 |

Result

| | |
|---|---|
| 0 | Authentication Success |
| 1 | Authentication Failure |
| 2-255 | Reserved |

TABLE 4-8

Auth Type [0]

The Authentication Type information element defines the type of infrastructure that is providing the authentication procedure.

| Bits | | | | | | | | Octets |
|---|---|---|---|---|---|---|---|---|
| 8 | 7 | 6 | 5 | 4 | 3 | 2 | 1 | |
| Auth Type ||||||||  1 |

Auth Type

| | |
|---|---|
| 0 | DCS1900 Authentication |
| 1 | Bellcore Generic C Authentication |
| 2-255 | Reserved |

TABLE 4-9

High Bandwidth Bearer data

| Bits | | | | | | | | Octets |
|---|---|---|---|---|---|---|---|---|
| 8 | 7 | 6 | 5 | 4 | 3 | 2 | 1 | |
| <TBD> bits of bearer data ||||||||  1 |
|  ||||||||  2 |
| . ||||||||  |
| . ||||||||  |
|  ||||||||  <TBD> |

TABLE 4-9.1

Low Bandwidth Bearer Data

The Low Bandwidth Bearer Data Element consists of fewer bits of user data than the High Bandwidth Bearer Data Element. Data transmitted via this mode may suffer temporal distortion but will be correctly delivered with no undetected lost or duplicated packets to the limits of the FCW algorithm.

| Bits | | | | | | | | Octets |
|---|---|---|---|---|---|---|---|---|
| 8 | 7 | 6 | 5 | 4 | 3 | 2 | 1 | |
| <TBD> bits of bearer data ||||||||  1 |
|  ||||||||  2 |
| . ||||||||  |
| . ||||||||  |
|  ||||||||  <TBD> |

TABLE 4-9.2

Symmetric Bandwidth Bearer Data

The Symmetric Bandwidth Bearer Data Element consists of 192 bits of user data. The low order bit of the 192 bit number resides in Bit 1 Octet 1 while the high order bit of the 192 bit number resides in Bit 8 of Octet 24. Data transmitted via this mode may suffer temporal distortion but will be correctly delivered with no undetected lost or duplicated packets to the limits of the FCW algorithm.

| Bits | | | | | | | | Octets |
|---|---|---|---|---|---|---|---|---|
| 8 | 7 | 6 | 5 | 4 | 3 | 2 | 1 | |
| 192 bits of bearer data ||||||||  1 |
|  ||||||||  2 |
| . ||||||||  |
| . ||||||||  |
|  ||||||||  24 |

TABLE 4-10

Backhaul Map [N, I]

The Backhaul Map information element details the allocation of backhaul channels on the backhaul link between the base station 104 and the base station controller 105. There are two types of Backhaul Maps. The first is the Superframe Backhaul Map, which consists of a bit map shoing the specific backhaul channels assigned to the MS represented by the Personal ID associated with the N_Notes RMT message in which the Backhaul Map appears. The second type is the Subframe Backhaul Map, which identifies a single backhaul channel and the submultiplexing rate to be applied to the channel.

TABLE 4-10-continued

Backhaul Map [N, I]

When the Backhaul Map Type is Superframe:

| Bits | Octets |
|---|---|
| 8 7 6 5 4 3 2 1 | |
| 32 bits of backhaul channel absolute position | 1 |
| . | 2 |
| . | 3 |
| . | 4 |

When the Backhaul Map Type is Subframe:

| Bits | Octets |
|---|---|
| 8 7 6 5 4 3 2 1 | |
| 8 bits Backhaul channel # | 1 |
| Multiplex rate | 2 |
| Multiplex rate offset | 3 |
| Reserved | 4 |

TABLE 4-11

Backhaul Map Type [N, I]

The Map Type information element is used to define the type of Backhaul Map that follows. There are two types of Backhaul Maps: Superframe and Subframe. Superframe maps detail the assignment of one or more complete 9.6 kbps backhaul channels in the base station 104 to base station controller 105 backhaul link to a single call. Subframe maps describe the submultiplexing characteristics of a less than 9.6 kbps rate onto a single 9.6 kbps backhaul channel.

| Bits | Octets |
|---|---|
| 8 7 6 5 4 3 2 1 | |
| 8 bit Map Type | 1 |

Map Type

| | |
|---|---|
| 0 | No Map |
| 1 | Superframe |
| 2 | Subframe |
| 3–255 | Reserved |

If Backhaul Map Type indicates No Map, then the Backhaul Map should be zero.

TABLE 4-12

Bandwidth [M]
<TBD>

TABLE 4-13

Base ID [O, M, N, I]

The Base Identifier, in conjunction with the PLMN, uniquely identifies the specific base station 104. The low order bit of the 32 bit number is located in Bit 1 Octet 1. The high order bit of the 32 bit number is located in Bit 8 of Octet 4.

TABLE 4-13-continued

Base ID [O, M, N, I]

| Bits | Octets |
|---|---|
| 8 7 6 5 4 3 2 1 | |
| 32 bits of unique Base Identification | 1 |
| | 2 |
| | 3 |
| | 4 |

TABLE 4-14

Base Status [N, I]

The Base Status information element is comprised of 32 octets.

| Bits | Octets |
|---|---|
| 8 7 6 5 4 3 2 1 | |
| 32 Octets of Base Status | 1 |
| | 2 |
| . | |
| . | |
| | 32 |

TABLE 4-15

Broadcast ID [O]

The Broadcast ID information element is used to identify specific broadcast data streams. The Broadcast ID is assigned to the specific broadcast stream on a connection basis. It is the responsibility of the broadcast Network Application to provide periodic application broadcast heading information. The Broadcast ID is assigned at the start of a connection and released to the Broadcast ID pool at the termination of the connection.

| Bits | Octets |
|---|---|
| 8 7 6 5 4 3 2 1 | |
| 8 bits of Broadcast ID | 1 |

TABLE 4-16

BSC ID [O, M]

The base station controller identifier, in conjunction with the PLMN, uniquely identifies the specific base station controller 105. The low order bit of the 16 bit number is located in Bit 1 Octet. The high order bit of the 16 bit number is located in Bit 8 of Octet 2.

| Bits | Octets |
|---|---|
| 8 7 6 5 4 3 2 1 | |
| 16 bits of unique BSC identification | 1 |
| | 2 |

TABLE 4-17

Cause [O]

The Cause information element consists of 8 bits identifying the cause for, or the result of, a specific action. The particular meanings of Cause values are determined by the message in which the Cause information element appears.

```
        Bits                        Octets
 8  7  6  5  4  3  2  1
|  8 bits of Cause information  |    1
```

TABLE 4-17.1

Cause: Authentication Reject [N, J]
CT-RCP [O]
Registration Result [M, N, J]
Service Response [M, N, I]

| Value | Meaning |
|---|---|
| 0 | Success |
| 1 | IMSI Unknown in HLR |
| 2 | Illegal MS |
| 3 | Illegal ME |
| 4 | PLMN Not Allowed (i.e., don't try any cells with same MCC, MNC) |
| 5 | LAI Not Allowed (i.e., don't try any cells with the same LAI) |
| 6 | National Roaming Not Allowed in the LAI |
| 7 | Protocol Error |
| 8 | Network Failure |
| 9–255 | Reserved |

TABLE 4-17.2

Cause: Cipher Response [N, I]

| Value | Meaning |
|---|---|
| 0 | No Result |
| 1 | Success, Cipher |
| 2 | Success, Clear Mask |
| 3 | BS Reject |
| 4 | MS Reject |
| 5–255 | Reserved |

TABLE 4-17.3

Cause: Connect Link [N, I]
Setup Link [N, I]

| Value | Meaning |
|---|---|
| 0 | Link Successful |
| 1 | Link Failure |
| 2–255 | Reserved |

TABLE 4-17.4

Cause: CT-ACK [O]

Unless specified otherwise below, the Cause Information Element in CT-ACK messages always has a value of zero.

TABLE 4-17.4.1

Cause: CT-ACK in response to CT-CSC

| Value | Meaning |
|---|---|
| 0 | Acknowledged |
| 1 | Circuit Switch Refused |
| 2–255 | Reserved |

TABLE 4-17.5

Cause: CT-CIP [O]

| Value | Meaning |
|---|---|
| 0 | Set or Change Cipher |
| 1 | Synchronize Cipher |
| 2–255 | Reserved |

TABLE 4-17.6

Cause: CT-CNC [O]

| Value | Meaning |
|---|---|
| 0 | The requested connection has been connected |
| 1 | Unable to complete the requested connection |
| 2–255 | Reserved |

TABLE 4-17.7

Cause: CT-DRG [O]
Deregister [M, N, I]

| Value | Meaning |
|---|---|
| 0 | Release by MS |
| 1–255 | Reserved |

TABLE 4-17.8

Cause: CT-HOF [O]
Handover Failed [N, I]

| Value | Meaning |
|---|---|
| 0 | Reserved |
| 1 | Refused by Originating BS |
| 2 | Refused by Terminating BS |
| 3 | Refused by Originating BSC |
| 4 | Refused by Terminating BSC |
| 5 | THR Failed, OHR Suggested |
| 6 | Invalid HRef |
| 7–255 | Reserved |

See Cause: Authentication Reject [N, I]

TABLE 4-17.9

Cause: CT-REL [O]
Release Link [M, N, I]

| Value | Meaning |
|---|---|
| 0 | Release by Network |
| 1 | Release by MS |
| 2 | Release by BS (Link Lost) |

TABLE 4-17.9-continued

Cause: CT-REL [O]
Release Link [M, N, I]

| Value | Meaning |
|---|---|
| 3 | Release by BS During Handover (e.g., Circuit Switch Complete) |
| 4–255 | Reserved |

TABLE 4-17.10

Cause: CT-SET [O]

| Value | Meaning |
|---|---|
| 0 | Link Successful |
| 1 | Link Failed |
| 2–255 | Reserved |

See Cause: CT-DRG [O]
See Cause: CT-HOF [O]

TABLE 4-17.11

Cause: Handover Request ACK [N, I]

| Value | Meaning |
|---|---|
| 0 | No Result |
| 1 | Success, Cipher |
| 2 | Success, Clear Mask |
| 3 | Fail, No Resources |
| 4 | Fail, Cipher Algorithm Not Supported |
| 5–255 | Reserved |

See Cause: CT-RCP [O]
See Cause: CT-REL [O]

TABLE 4-17.12

Cause: Service Info [O]

This Cause is unique in that it is divided into two subfield to carry results for both the MS and the BS.

| Bits | | | | | | | | Octets |
|---|---|---|---|---|---|---|---|---|
| 8 | 7 | 6 | 5 | 4 | 3 | 2 | 1 | |
| MS Cause | | | | BS Cause | | | | 1 |

The meanings of each subfield are:

| Value | Meaning |
|---|---|
| 0 | Success |
| 1 | Failure |
| 2–15 | Reserved |

See Cause: CT-RCP [O]
See Cause: Connect Link [N, I]

TABLE 4-17.13

Cause: Specific Poll Result [O]

| Value | Meaning |
|---|---|
| 0 | No Result |
| 1 | Specific poll for PID |

TABLE 4-17.13-continued

Cause: Specific Poll Result [O]

| Value | Meaning |
|---|---|
| 2 | General poll response from PID is rejected |
| 3 | Page to MS |
| 4–256 | Reserved |

TABLE 4-18

Cipher Algorithm ID [N, I]

The Cipher Algorithm ID specifies that algorithm to be used for ciphering.

| Bits | | | | | | | | Octets |
|---|---|---|---|---|---|---|---|---|
| 8 | 7 | 6 | 5 | 4 | 3 | 2 | 1 | |
| 8 bits of Algorithm ID | | | | | | | | 1 |

Algorithm ID

| 0 | Transparent (Clear) |
|---|---|
| 1 | A5/1 Algorithm |
| 2 | A5/2 Algorithm |
| 3 | A5/3 Algorithm |
| 4–255 | Reserved |

TABLE 4-19

Cipher Key [N, I]

The Cipher Key information element contains the clear text key to be used to set the key of the BS's encription equipment.

| Bits | | | | | | | | Octets |
|---|---|---|---|---|---|---|---|---|
| 8 | 7 | 6 | 5 | 4 | 3 | 2 | 1 | |
| 64 bit Clear Text Cipher Key | | | | | | | | 1 |
| | | | | | | | | 2 |
| . | | | | | | | | |
| . | | | | | | | | |
| | | | | | | | | 8 |

TABLE 4-20

Cipher Key Sequence # [O, M, N, I]

The Key Sequence # information element is used to select a cipher key in both the BS and MS without having to explicitly pass the key over the air. The Key Sequence # will be generated as defined in <TBD>. Not all bits of the key sequence # may be significant.

| Bits | | | | | | | | Octets |
|---|---|---|---|---|---|---|---|---|
| 8 | 7 | 6 | 5 | 4 | 3 | 2 | 1 | |
| 8 bit Key Sequence # | | | | | | | | 1 |

Bits 5–8: Must be zero
Bits 1–4: Are Significant
Default is 'OFx' in there is no Cipher Key Sequence #.

TABLE 4-21

Class [O, N, I]

The Class information element specifies some of the operational parameters of the particular type of MS being used.

| Bits | | | | | | | | Octets |
|---|---|---|---|---|---|---|---|---|
| 8 | 7 | 6 | 5 | 4 | 3 | 2 | 1 | |
| Class Type | | | | Class Information | | | | 1 |
| Class Information | | | | | | | | 2 |

Class Type

| | |
|---|---|
| 0 | Reserved |
| 1 | DCS1900 Class Type |
| 2 | IS-41 Class Type |
| 3–7 | Reserved |

TABLE 4-21.1

Class Information for DCS1900 Class Type

| Bits | | | | | | | | Octets |
|---|---|---|---|---|---|---|---|---|
| 8 | 7 | 6 | 5 | 4 | 3 | 2 | 1 | |
| Not Available | | | Reserved | Revision Level | | A5/1 | A5/2 | 1 |
| A5/2 | SM | SS Screen Ind. | Reserved | | | | | 2 |

Revision Level

| | |
|---|---|
| 0 | PCS2000 phase 1 Mobiles |
| 1–3 | Reserved |

A5/1

| | |
|---|---|
| 0 | A5/1 encription algorithm not available |
| 1 | A5/1 encription algorithm is available |

A5/[2|3]

| | |
|---|---|
| 0 | A5/[2|3] encription algorithm is available |
| 1 | A5/[2|3] encription algorithm is not available |

SM

| | |
|---|---|
| 0 | short message capability not present |
| 1 | short message capability present |

TABLE 4-21.1-continued

Class Information for DCS1900 Class Type

SS Screen Indicator

| | |
|---|---|
| 0 | GSM phase 1 |
| 1 | capable of handling ellipsis notation and phase 2 error handling |
| 2–3 | reserved |

TABLE 4-21.2

Class Information for IS-41 Class Type

| Bits | | | | | | | | Octets |
|---|---|---|---|---|---|---|---|---|
| 8 | 7 | 6 | 5 | 4 | 3 | 2 | 1 | |
| Not Available | | | Reserved | | | | | 1 |
| H | G | F | E | D | C | B | A | 2 |

Power Class (PCP) (octet 1, bits A, B and E)

| Bits | H | G | F | E | D | C | B | A | Value | Meaning |
|---|---|---|---|---|---|---|---|---|---|---|
| | | | | 0 | | 0 | 0 | - | Class I |
| | | | | 0 | | 0 | 1 | - | Class II |
| | | | | 0 | | 1 | 0 | - | Class III |
| | | | | 0 | | 1 | 1 | - | Class IV |
| | | | | 1 | | 0 | 0 | - | Class V |
| | | | | 1 | | 0 | 1 | - | Class VI |
| | | | | 1 | | 1 | 0 | - | Class VII |
| | | | | 1 | | 1 | 1 | - | Class VIII |

Transmission (TX) (octet 1, bit C)

| Bits | H | G | F | E | D | C | B | A | Value | Meaning |
|---|---|---|---|---|---|---|---|---|---|---|
| | | | | | | 0 | | | - | Continuous |
| | | | | | | 1 | | | - | Discontinuous |

Bandwidth (BW) (octet 1, bit D)

| Bits | H | G | F | E | D | C | B | A | Value | Meaning |
|---|---|---|---|---|---|---|---|---|---|---|
| | | | | | 0 | | | | - | 20 MHz |
| | | | | | 1 | | | | - | 25 MHz |

TABLE 4-21.2.1

Mobile Station Nominal Power Levels

| Mobile Station Power Level (PL) | Mobile Attenuation Code (MAC) | Nominal ERP (dBW) for Mobile Station Power Class | | | | | | | |
|---|---|---|---|---|---|---|---|---|---|
| | | I | II | III | IV | V | VI | VII | VIII |
| 0 | 0000 | 6 | 2 | −2 | −2 | * | * | * | * |
| 1 | 0001 | 2 | 2 | −2 | −2 | * | * | * | * |
| 2 | 0010 | −2 | −2 | −2 | −2 | * | * | * | * |
| 3 | 0011 | −6 | −6 | −6 | −6 | * | * | * | * |
| 4 | 0100 | −10 | −10 | −10 | −10 | * | * | * | * |
| 5 | 0101 | −14 | −14 | −14 | −14 | * | * | * | * |
| 6 | 0110 | −18 | −18 | −18 | −18 | * | * | * | * |
| 7 | 0111 | −22 | −22 | −22 | −22 | * | * | * | * |
| Dual Mode Only | | | | | | | | | |
| 8 | 1000 | −22 | −22 | −22 | −26 +/− 3 dB | * | * | * | * |
| 9 | 1001 | −22 | −22 | −22 | −30 +/− 6 dB | * | * | * | * |
| 10 | 1010 | −22 | −22 | −22 | −34 +/− 9 dB | * | * | * | * |

The three lease significant bits of MAC are used in the CMAC/VMAC field. All four bits of MAC are used in the DMAC field.

TABLE 4-22

Connection Number [O, M, N, I]

The Connection Number information element specifies the specific network connection which was allocated to carrying the bearer channel of this user station 102 from the base station 104 to the network. All octets of this information element may not be significant. Unused nibbles and octets must be filled with "F" hex.

The Connection Number in conjunction with the Zone and the base station controller ID uniquely identify every possible connection in the world.

| Bits | Octets |
|---|---|
| 8 7 6 5 4 3 2 1 | |
| 24 bits of Connection Number | 1 |
| | 2 |
| | 3 |

TABLE 4-23

Connection Result [M]
<TBD>

TABLE 4-24

Correlative ID [O]

The Correlative information element is used to temporarily identify a group of frames as being destined to a specific user station 102. The ID is assigned for the duration of the connection and is released for reuse by another user station 102 at the termination of a connection. The specific value of "OFFx" is reserved for broadcast use. The correlative ID for a specific user station 102 will not be changed during a connection.

| Bits | Octets |
|---|---|
| 8 7 6 5 4 3 2 1 | |
| 8 bits of correlative ID | 1 |

TABLE 4-25

Count Base [N, I]

The Count Base information element is used to specify the number of sets of base information which follow in the Notes_RMT Originating Handover message. Each set of base information consists of three information elements: Zone, base station controller (BSC) ID and Base ID.

| Bits | Octets |
|---|---|
| 8 7 6 5 4 3 2 1 | |
| 8 bits of Count Base | 1 |

TABLE 4-26

D Channel [O]

The D Channel information element transmits the out of band application channel in a byte serial manner. The data is transmitted with the low order bit of the D channel information in Bit 1 of the Octet.

TABLE 4-27

ESN [O, M, N, I]

The equipment serial number uniquely identifies the user station 102.

| Bits | Octets |
|---|---|
| 8 7 6 5 4 3 2 1 | |
| 64 bits of ESN | 1 |
| | 2 |
| : | |
| | 8 |

TABLE 4-28

Facility [O, M]

The Facility information element describes the services being offered by the base station 104. The internal format of this element is shown below.

| 8 | 7 | 6 | 5 | 4 | 3 | 2 | 1 | Octets |
|---|---|---|---|---|---|---|---|---|
| Bits | | | | | | | | |
| Base Features | | | | | | | | 1 |
| Base Features | | | | | | | | 2 |
| Base Features | | | | Access Class | | | | 3 |
| Leveling Bits | | | | | | | | 4 |

The Base Features subfield is 20 bits in length. These bits are used to provide the user station 102 information about the base station 104 and correspond to various base station capabilities or features. Features such as ethernet access, aggregate data capability, enhanced voice, etc. are selected here. The particular features depend upon the networks which the base station 104 supports.

TABLE 4-28.1

Base Features for DCS1900 Systems

| 8 | 7 | 6 | 5 | 4 | 3 | 2 | 1 | Octets |
|---|---|---|---|---|---|---|---|---|
| Bits | | | | | | | | |
| Base Features | | | | | | | | 1 |
| Base Features | | | | | | | | 2 |
| Base Features | | | | | | | | 3 |

1 Bit: This bit, if set to 1, indicates that this base station 104 is capable of Inter-BSC Terminating Handovers.

All bits not explicitly defined are reserved.

TABLE 4-28.2

Facilities: Access Class
Integral value from 0 through 15 which designates the lowest class allowed access to the base station 104. That is, if the user station 1021 were provisioned with an access class of 3, it would be allowed to register with base stations 104 that broadcast an access class of 3 or lower. This subfield is active only if the CU field in the Header specifies that Class Control is in effect.

| Value | Access Allowed to |
|---|---|
| 15 | Test Mobiles only |
| 14 | 911 calls only |
| 13 | Reserved |
| 12 | Reserved |
| 11 | Reserved |
| 10 | Mobiles with Access Class 10 |
| 9 | Mobiles with Access Class 9 or 10 |
| . | |
| . | |
| . | |
| 1 | Mobiles with Access Class 1, 2, . . . 10 |
| 0 | All Mobiles |

8 bits, set by the base station to level out the number of user stations 102 registering or using a base station 104. A user station 102 would be allowed to access a base station 104 if the leveling bit of the user station 102 was set in this field. The leveling bit number will be selected by taking the modulo 15 of the user station PID. If the corresponding bit in the base station 104 leveling field were set then the user station 102 would be allowed access, otherwise, the user station 102 would have to access another base station 104. This subfield is active only if the CU field in the Header specifies that Class Control is in effect.

TABLE 4-29

FCW [O]

The Frame Check Word, which checks the content of a packet information element, is be a 16 bit sequence. It comprises the ones complement of the sum (modulo 2) of:

a) The remainder of
$_x k_{(x} 15_{+x} 14_{+x} 13_{+x} 12_{+x} 11_{+x} 10_{+x} 9_{+x} 8_{+x} 7_{+x} 6_{+x} 5_{+x} 4_{+x} 3_{+x} 2_{+x} 1_{+1})$
divided (modulo 2) by the generator polynomial
$x^{16} + x^{12} + x^5 + 1$, where k is the number of bits in the packet not including the FCW.

b) The remainder of the division (modulo 2) by the generator polynomial $x^{16} + x^{12} + x^5 + 1$ of the product of $x^{16}$ by the content of the packet existing from and including the first bit of the packet to but not including the first bit of the FCW.

| 8 | 7 | 6 | 5 | 4 | 3 | 2 | 1 | Octets |
|---|---|---|---|---|---|---|---|---|
| Bits | | | | | | | | |
| 16 bits of FCW | | | | | | | | 1 |
| | | | | | | | | 2 |

TABLE 4-30

Frame Number [O]

The Frame Number information element is used in ciphering algorithms. Each base station 104 keeps its frame number as a count of the number of frames it has traversed since power up.

| 8 | 7 | 6 | 5 | 4 | 3 | 2 | 1 | Octets |
|---|---|---|---|---|---|---|---|---|
| Bits | | | | | | | | |
| | | 22 bits of Frame Number | | | | | | 1 |
| | | | | | | | | 2 |
| | | | | | | | | 3 |

TABLE 4-31

HRef (Handover Reference)

The HRef (Handover Reference) information element is used to identify a specific process that has already been initiated by an Originating Handover Request sequence. Not all bits are significant.

| 8 | 7 | 6 | 5 | 4 | 3 | 2 | 1 | Octets |
|---|---|---|---|---|---|---|---|---|
| Bits | | | | | | | | |
| 48 bits of HRef (Handover Reference) | | | | | | | | 1 |
| . | | | | | | | | 2 |
| . | | | | | | | | 3 |
| . | | | | | | | | 4 |
| . | | | | | | | | 5 |
| . | | | | | | | | 6 |

TABLE 4-31.1

| HRef for DCS1900 Systems |
| --- |

In a DCS1900 infrastructure system, the HRef is assigned by the terminating Base Station Controller. Only one octet is significant.

| Bits | Octets |
| --- | --- |
| 8 7 6 5 4 3 2 1 | |
| 8 bits of HRef (Handover Reference) | 1 |
| Reserved | 2 |
| . | 3 |
| . | 4 |
| . | 5 |
| . | 6 |

TABLE 4-32

| Identity Data [O, N, I] |
| --- |

The Identity Data information element contains one of the identifiers of the MS as specified by the associated Identity Type. The precise length and format of the Identity Data information element will be determined by the Identity Type. If the length is less than the maximum 9 octets provided for the Identity Data information element, unused space will be at the end of the Identity Data information element (Octets 9, 8, . . .) and all unused bits will be set to zero.

| Bits | Octets |
| --- | --- |
| 8 7 6 5 4 3 2 1 | |
| 72 bits of Identity Element | 1 |
| | 2 |
| | 3 |
| | 4 |
| | 5 |
| | 6 |
| | 7 |
| | 8 |
| | 9 |

TABLE 4-33

| Identity Type [O, N, I] |
| --- |

The Identity Type information element specifies which identity is being requested or supplied.

| Bits | Octets |
| --- | --- |
| 8 7 6 5 4 3 2 1 | |
| 8 bits of Identity Type | 1 |

| value | Identity Type |
| --- | --- |
| 0 | IMSI |
| 1 | TMSI |
| 2 | ESN |
| 3 | UPT# |
| 4-255 | Reserved |

TABLE 4-34

LAC (Location Area Code) See Zone.

TABLE 4-35

LAI (Location Area Identifier) See Zone.

TABLE 4-36

| Location [N, I] |
| --- |

The Location information element provides the identification of a specific element in the given table. The actual element identifiers are table dependent.

| Bits | Octets |
| --- | --- |
| 8 7 6 5 4 3 2 1 | |
| 16 bits of Location Identifier | 1 |
| | 2 |

TABLE 4-37

MCC (Mobile Country Code) See Zone.

TABLE 4-38

Message Length [M, N, I]

The Message Length field is to be filled in with the size of the message including the size field itself. The length of the message is measured in octets.

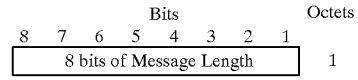

TABLE 4-39

Message Type [O, M, N, I]

The Message Type information element defines the format of the rest of the message. The interpretation of the Message Type depends upon which particular Notes protocol is being discussed. Currently, the messages are sorted in alphabetical order by name. An effort is made, where possible, to maintain the same Message Type across all interfaces for common messages (e.g., Set Link).

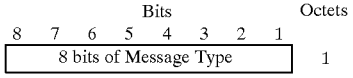

TABLE 4-39.1

O Notes Message Type [O]

| Bits 1-8 (Hex) | Type |
|---|---|
| 00 | Reserved |
| 01 | ACK-Acknowledge |
| 02 | AUR-Authentication Response |
| 03 | AUT-Authentication Request |
| 04 | BAI-Base Assist Information |
| 05 | BAR-Base Assist Request |
| 06 | CIP-Set Cipher Mode |
| 07 | CNC-Call Connected |
| 08 | CNL-Connect Link |
| 09 | CSC-Circuit Switch Complete |
| 0A | DRG-De-registration Request |
| 0B | HLD-Hold |
| 0C | HOF-Handover Failed |
| 0D | MAI-MS Assist Information |

TABLE 4-39.1-continued

O Notes Message Type [O]

| 0E | MAR-MS Assist Request |
|---|---|
| 0F | OHC-Originating Handover Complete |
| 10 | OHR-Originating Handover Request |
| 11 | ORG-Originate Call |
| 12 | RCP-Registration Complete |
| 13 | REL-Release Link |
| 14 | RRQ-Registration Request |
| 15 | SPR-Specific Response |
| 16 | STL-Set Link |
| 17 | SYN-Synchronize |
| 18 | THC-Terminating Handover Complete |
| 19 | THC-Target Handover Request |
| 1A-7F | Reserved |
| 80-FF | TRA-Transport Message w. TCID |

If the most significant bit of the Message Type is set to 1, the message is a Transport Message. The seven least significant bits are used to specify the Transport Channel ID with which the data is associated.

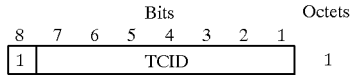

TABLE 4-39.2

M Notes Message Type [M]
The Message Type information element defines the format for the remainder of the M Notes message.

| Value (Hex) | Description |
|---|---|
| 01 | Diagnostic |
| 02 | Initialize OTA |
| 03 | Register |
| 04 | Deregister |
| 05 | Setup Link |
| 06 | Release Link |
| 07 | Connect Link |
| 08 | Acknowledge |
| 09 | Provision OTA |
| 0A | Radio Status |
| 0B | Link Status |
| 0C | Data Message |
| 0D | Power Off |
| 0E | Circuit Switch Complete |
| 0F | Begin Traffic |
| 10 | Acknowledge |
| 11 | Authenticate |
| 12 | Authenticate Reply |

TABLE 4-39.3

N Notes Message Type [N, I]
This Message Type information element defines the use of O-Notes and I-Notes. It defines the action of the message as well as the format of the message.

| Type (Hex) | Meaning |
|---|---|
| 00 | Reserved |
| 01 | Acknowledge |
| 02 | Authenticate |
| 03 | Authenticate Reply |
| 04 | Base Status Request |
| 05 | Base Status Response |

TABLE 4-39.3-continued

N Notes Message Type [N, I]
This Message Type information element defines the use
of O-Notes and I-Notes. It defines the action of the message as
well as the format of the message.

| Type (Hex) | Meaning |
|---|---|
| 06 | Cipher ACK |
| 07 | Circuit Switch Complete |
| 08 | Connect Link |
| 09 | Deregister |
| 0A | DTMF Start |
| 0B | DTMF Stop |
| 0C | Originating Handover |
| 0D | Page |
| 0E | Page Response |
| 0F | Register |
| 10 | Registration Reject |
| 11 | Service Information |
| 12 | Set Cipher Mode |
| 13 | Set Link |
| 14 | Terminiating Handover |
| 15 | Terminating Handover Complete |
| 16 | Transport |
| 17 | Update ID |
| 18-7F | Reserved for Notes RMT |
| 80 | Diagnostic |
| 81 | Diagnostic Result |
| 82 | Download |
| 83 | Provision Table |
| 84 | Read Table |
| 85 | Reject |
| 86 | Reset |
| 87 | Reset ACK |
| 88 | Table Data |
| 89-FF | Reserved for Notes_OAM |

TABLE 4-40

MNC (Mobile Network Code) See Zone.

TABLE 4-41

MS Capabilities [O]

The MS Capabilities information element defines the
capabilities (features) present in the user station 102 (e.g.,
whether the user station 102 can receive a FAX or a data
connection, whether the user station 102 is capable of ciphering,
etc.).

| Bits<br>8 7 6 5 4 3 2 1 | Octets |
|---|---|
| 16 bits of MS Capabilities | 1 |
|  | 2 |

TABLE 4-42

OTA Map [O]

The OTA Map information element describes the mapping of the OTA time slots to a particular user station 102. The format of this element is dependent upon the OTA Map Type information element in the same packet.

TABLE 4-42.1

Superframe Map:

| Bits<br>8 7 6 5 4 3 2 1 | Octets |
|---|---|
| 16 bits of slot mapping description | 1 |
|  | 2 |
| 16 bits reserved | 3 |
|  | 4 |

Each bit in the superframe map indicates a time slot
relative to the current time slot.

| Octet | Bit | Time slot |
|---|---|---|
| 1 | 1 | Same time slot, next frame |
| 1 | 2 | This frame, one time slot later |
| 1 | 3 | This frame, two time slots later |
| 2 | 8 | This frame, 15 time slots later |

TABLE 4-42.2

Subframe Map:

| Bits 8 7 6 | Bits 5 4 3 2 1 | Octets |
|---|---|---|
| Reserved | Submultiplex | 1 |
| Reserved | Frame Phase | 2 |
| Reserved | Time lot Phase | 3 |
| Reserved | | 4 |

| | |
|---|---|
| Submultiplex Rate (Subrate0) | The number of frames skipped between transmissions, plus one. |
| Frame Phase | The number of frames skipped before the first transmission. |
| Time slot Phase | The number of time slots skipped before the first transmission. |

As an example, where the substrate is four, the frame phase is three, and the time slot phase is two, the user station 102 will wait three time frames 301 and two time slots 302 before the first transmission. Subsequent transmissions will occur in the same time slot 302 every fourth time frame 301.

TABLE 4-43

OTA Map Type [O]

The OTA Type information element identifies the type of
OTA Map to follow.

| Bits<br>8 7 6 5 4 3 2 1 | Octets |
|---|---|
| 8 bits of OTA Map type | 1 |

| OTA Map Type | Meaning |
|---|---|
| 0 | Unused |
| 1 | Superframe |
| 2 | Subframe |
| 3-256 | Reserved |

TABLE 4-44

PID [O, M, N, I]

This information element is the personal identification number assigned to this user station 102. The low order byte defines the PID Type. The identifier is represented by the following 64 bits. The low order bit of the 64 bit number resides in Bit 1 of Octet 2 while the high order bit of the 64 bit number resides in Bit 8 of Octet 9.

If the PID Type is absolute, the PID absolutely and uniquely identifies the user station 102. The number is 72 bits long.

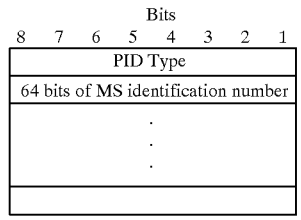

TABLE 4-44.1

PID Type

| PID Type | Meaning |
| --- | --- |
| 0 | Permanent PID |
| 1 | Temporary PID |
| 2 | ESN |
| 3 | UPT# |
| 4 | HRef |
| 5-255 | Reserved |

In DCS1900 Systems, the Permanent PID associated with a user station 102 is the IMSI.

In DCS1900 Systems, the Temporary PID associated with a user station 102 MS is its TMSI.

In DCS1900 Systems, the ESN associated with an user station 102 is its IMEI.

A PID of Type=HRef occurs in only limited cases:

1. In a Specific Poll for the user station 102 from the (New) base station 104 during an Originating Handover.

2. In a Release Link (in either direction) during an Originating Handover (if the Originating Handover fails).

A number which uniquely—within the PID Type—identifies the user station 102.

TABLE 4-45

PLMN (Public Land Mobile Network)

See Zone.

TABLE 4-46

Protocol [N, I]

The protocol information element identifies the signaling protocol.

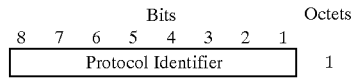

| Protocol Type | Protocol |
| --- | --- |
| 1 | Notes RMT signaling protocol |
| 2 | Notes OAM signaling protocol |
| 3-255 | Reserved |

TABLE 4-47

Registration Info [O]

Registration Info contains information that is required by the System for registration. The precise format of the Registration Info depends upon the value of System Type.

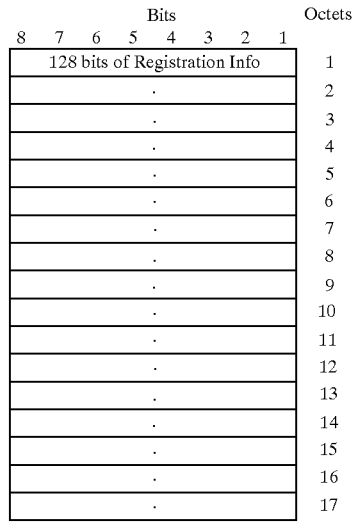

TABLE 4-47.1

DCS1900 Systems

For DCS1900 Systems, the Zone of the base station 104 on which the user station 102 was previously registered must be provided so the network 126 can locate the appropriate VLR for TMSI validation.

| Bits 8 7 6 5 4 3 2 1 | Octets |
|---|---|
| 40 bits (Old) Zone | 1 |
| . | 2 |
| . | 3 |
| . | 4 |
| . | 5 |
| 88 bits Reserved | 6 |
| . | 7 |
| . | 8 |
| . | 9 |
| . | 10 |
| . | 11 |
| . | 12 |
| . | 13 |
| . | 14 |
| . | 15 |
| . | 16 |
| . | 17 |

TABLE 4-47.2

Bellcore Generic C Systems

For Bellcore Generic C Systems, the required registration information consists of the user station's UPT# and ESN.

| Bits 8 7 6 5 4 3 2 1 | Octets |
|---|---|
| 64 bits of ESN | 1 |
| . | 2 |
| . | 3 |
| . | 4 |
| . | 5 |
| . | 6 |
| . | 7 |
| . | 8 |
| 64 bits reserved | 9 |
| . | 10 |
| . | 11 |
| . | 12 |
| . | 13 |
| . | 14 |
| . | 15 |
| . | 16 |
| . | 17 |

TABLE 4-48

Registration Status [O, M]

The Registration Status identifies the user station's current registration status.

| Bits | | Octets |
|---|---|---|
| 8 7 6 5 4 3 2 1 | | |
| Page Pend | Registration Status | 1 |

Page Pend:

| value | meaning |
|---|---|
| 0 | There is no page pending |
| 1 | There is a page pending (only valid in CT-RCP) |

Registration Status:

| value | status |
|---|---|
| 0 | Not Registered |
| 1 | Accepted |
| 2 | Pending |
| 3–127 | <TBD> |

TABLE 4-49

Registration Timer [O]

The Registration Timer information element sets the intervals between periodic re-registrations.

| Bits | | Octets |
|---|---|---|
| 8 7 6 5 4 3 2 1 | | |
| Network Interval | Base Interval | 1 |

TABLE 4-49.1

Network Interval

| Value | Interval |
|---|---|
| 0 | <TBD> |
| 1 | |
| 2 | |
| 3 | |
| 4 | |
| 5 | |
| 6 | |
| 7 | |
| 8 | |
| 9 | |
| A | |
| B | |
| C | |
| D | |
| E | |
| F | |
| 0 | <TBD> |
| 1 | |
| 2 | |
| 3 | |
| 4 | |
| 5 | |
| 6 | |
| 7 | |

TABLE 4-49.1-continued

Network Interval

| Value | Interval |
|-------|----------|
| 8 | |
| 9 | |
| A | |
| B | |
| C | |
| D | |
| E | |
| F | |

TABLE 4-50

Registration Type [O, N, I]

The Registration Type identifies the type of registration. Registration is the result of either a position change (geopgraphic) or the expiration of the registration timer (periodic).

```
           Bits              Octets
8  7  6  5  4  3  2  1
     Registration Type         1
```

Registration Type:

| value | type |
|-------|------|
| 0 | Base Geographic Registration |
| 1 | Network Geographic Registration |
| 2 | Base Periodic Reregistration |
| 3 | Network Periodic Reregistration |
| 4 | Power Up |
| 5-255 | Reserved |

TABLE 4-51

Remaining Base Count [O]

The Remaining Base Count specifies the number of base stations 104 in addition to the current one (the one specified in the CT-OHR message containing the Information Element) for which the user station 102 intends to request an Originating Handover at this time.

```
           Bits              Octets
8  7  6  5  4  3  2  1
     Remaining Base Count       1
```

TABLE 4-52

Reserved [O, M, N, I]

The Reserved information element represents unused space. All unused space is reserved for future use. All Reserved bits shall be set to zero by the transmitting station. All Reserved bits shall be ignored by the receiving station unless specifically defined otherwise.

Some Information Elements contain Reserved subfields. The same comments about reserved bits apply.

TABLE 4-53

Resource Request Data [O, M, N, I]

This 32 bit information element specifies the type of service being requested by the user station 102.

```
               Bits                      Octets
8    7    6      5     4     3     2    1
DVS    | CRC-ARQ | Symmetry | Reserved |    1
           Bandwidth                         2
DVP |      Transport Protocol               3
           Reserved                          4
```

DCS1900 ignores this information element in the N Notes RMT Service Request message.

TABLE 4-53.1

Bandwidth

| value | meaning |
|-------|---------|
| 0–255 | <TBD> |

TABLE 4-53.2

CRC-ARQ

| value | meaning |
|-------|---------|
| 00 | Neither CRC nor ARQ in effect |
| 01 | Reserved |
| 10 | CRC in effect |
| 11 | CRC and ARQ in effect |

TABLE 4-53.3

DVS

| value | meaning |
|-------|---------|
| 00 | Reserved |
| 01 | Voice service requested |
| 10 | Data service requested |
| 11 | Signaling service requested |

TABLE 4-53.4

Symmetry

| value | meaning |
|-------|---------|
| 00 | Symmetric Bandwidth |
| 01 | Maximum MS bandwidth minimum BS bandwidth |
| 10 | Maximum BS bandwidth minimum MS bandwidth |
| 11 | Variable symmetry |

TABLE 4-53.5

Transport Protocol

| value | meaning |
|-------|---------|
| 0 | 8 bit transparency mode. |
| 1–255 | Reserved for future use |

TABLE 4-54

Service Provider [O, M]

This 16 bit information element, when present in a base-to-user signaling message, identifies the PCS service provider that operates the base station 105. When present in a user-to-base signaling message, it specifies the identification of the PCS service provider that the user station 102 wishes to use. The low order bit of this 16 bit element resides in Bit 1 of Octet 1 while the high order bit of this 16 bit element resides in Bit 8 of Octet 2.

| Bits | Octets |
|---|---|
| 8 7 6 5 4 3 2 1 | |
| 16 bits of unique Service Provider Identification number | 1 |
|  | 2 |

TABLE 4-55

Service Type
The Service Type information element indicates the type of service being requested.

| value | meaning |
|---|---|
| 0000 | Null Service. Indicates that service resources are not yet being requested. |
| 0001 | Normal call |
| 0010 | Emergency (911) call |
| 0100 | Short Message Service |
| 1000 | Supplementary Service Activation |

When this information appears in a N Notes RMT Handover Request message, the only legal values are Normal Call and Emergency Call. Furthermore, DCS1900 may not be able to provide this element, in which case it will default to Normal Call.

TABLE 4-56

Set/Query [M]

The field will have a value of 0 to indicate that a query operation is to take place and a value of 1 to indicate that a set operation is to take place.

TABLE 4-57

Slot Quality [O]

The Slot Quality information element identifies the radio frequency quality of the channel (time slot) in which the information element was received. To allow for flexibility, the meaning of the values is implementation specific.

| Bits | Octets |
|---|---|
| 8 7 6 5 4 3 2 1 | |
| 8 bits Slot Quality | 1 |

| value | Slot Quality |
|---|---|
| 0 | <TBD> |
| 255 | |

TABLE 4-58

Surrounding Base Table (SBT) [O]

| Bits | | Octets |
|---|---|---|
| 8 7 6 5 4 3 2 1 | | |
| SBT Sequence # | SBT Length | 1 |
| Base 1 Info | Base 1 Code Index | |
| Base 1 Frequency Index | | 2 |
| Base 2 Info | Base 2 Code Index | |
| Base 2 Frequency Index | | 3 |
| ... | ... | ... |
| Base <SBT Length> Info | Base <SBT Length> Code Index | |
| Base <SBT Length> Frequency Index | | |

Note that the table is of variable length. When it occurs in the CT-RCP message, it can store a maximum of 10 base index pairs, when it occurs in the CT-BAI message, it can store a maximum of 11 base index pairs.

Includes the frequency index and the code index for the <ith> surrounding base station 104.

TABLE 4-58.1

SBT: Base <i> Info
Information about Base <i> to help the user station 102 rank the base station 104

| Bits | | | | Meaning if Bit is Set |
|---|---|---|---|---|
| 8 | 7 | 6 | 5 | |
| 0 | 0 | 0 | 1 | This base station represents a Micro Cell |
| 0 | 0 | 1 | 0 | This base station is concentric with current base station |
| 0 | 1 | 0 | 0 | Reserved |
| 1 | 0 | 0 | 0 | Reserved |

Defines the number of base stations 104 which are contained in this SBT segment.

If the number of surrounding base stations 104 exceeds the maximum that can be held in the message (10 in the case of the CT-RCP), this number will indicate the number of following messages (CT-ASIs) required to transmit the rest of the data. The number will thus serve as:

An indication of the existence of more surrounding bases than will fit in the table.

A unique identifier of which subset of base stations 104 are contained in this SBT. E.g., a value of zero means this is the only (or last) set of SBT entries. A value of 2 means that there will be two additional SBT segments following the current one.

TABLE 4-59

System Type [O]

The System Type information element identifies the code set of the supporting infrastructure.

```
       Bits              Octets
8  7  6  5  4  3  2  1
|      System Type     |    1
```

| value | System Type |
|---|---|
| 0 | DCS1900 |
| 1 | Bellcore Generic C |
| 2-255 | Reserved |

TABLE 4-60

TCID [O, M, N, I]

The TCID (Transport Channel ID) information element specifies the Transport Channel to which data in the message belongs.

```
       Bits              Octets
8  7  6  5  4  3  2  1
|Reserved|  6 bits of TCID |    1
```

When Transport Data is embedded in an O Notes_RMT_CT-TRA message, the TCID is embedded in the Message Type. In this case:
bit 8 of the Message Type is set to 1.
bit 7 is used for segmentation: it is set to 1 for the last segment of a Transport Message and to 0 for all other segments.

| TCID | Meaning |
|---|---|
| 0 | DCS1900 (SAPI 0) |
| 1 | Reserved |
| 2 | Reserved |
| 3 | DCS1900 (SAPI 3) |
| 4-63 | Reserved |

Defaults: When the Protocol in use is DCS1900, the TCID must be zero in all cases except when SMS traffic is being sent.

TABLE 4-61

Traffic Type [M]

The traffic type indicates voice or data traffic.

TABLE 4-62

Transport Data [O, M, N, I]

The Transport Data information element contains 19 bytes (152 bits) of application level data transferred between the user station 102 and the base station controller 105. The low order bit of the data resides in bit 1 of octet 1 and the high order bit resides in bit 8 of octet 19. The Transport Data information element may be larger (e.g., up to 260 bytes using LAPD) for interfaces other than the O-interface, which is restricted in size due to the length of the over-the-air information packet.

TABLE 4-62-continued

Transport Data [O, M, N, I]

```
       Bits                 Octets
8  7  6  5  4  3  2  1
| 152 bits of Transport Data |   1
|                            |   2
              .
              .
              .
|                            |  19
```

TABLE 4-63

UPT [O, M, N, I]

This 80 bit information element is the Universal Personal Telecommunications number that has beeng ranted to the subscriber operating the user station 102, and consists of 20 four-bit characters.

```
       Bits                  Octets
8  7  6  5  4  3  2  1
| 80 bits of Universal Personal |   1
| Telecommunications Number     |
|                               |   2
              .
              .
              .
|                               |  10
```

TABLE 4-64

Value [M]

The Value field contents are variable depending upon the item in the OTA which is being queried or modified.

TABLE 4-65

Zone [O, M, N, I]

The Zone and the Base ID combine to uniquely identify each base station 104 in the world. The precise format of the Zone depends upon the value of the System Type.

```
       Bits              Octets
8  7  6  5  4  3  2  1
| 40 bits of unique Zone |    1
              .             2
                            3
              .             4
                            5
```

A subset of the Zone, uniquely identifies the operator of the network. This portion is called the PLMN (Public Land Mobile Network) and, in the case of DCS1900 Systems, consists of the MCC and MNC.

TABLE 4-65.1

Zone: DCS1900 Systems

For DCS1900 Systems, the Zone is the Location Area Identifier (LAI); it consists of a 16 bit Mobility Country Code (MCC), an 8 bit Mobility Network Code (MNC) and a 16 bit Location Area Code (LAC).

| Bits | Octets |
|---|---|
| 8 7 6 5 4 3 2 1 | |
| 16 bits of unique MCC | 1 |
|  | 2 |
| 8 bits of unique MNC | 3 |
| 16 bits of unique LAC | 4 |
|  | 5 |

TABLE 4-65.1.1

LAC

The LAC is an Location Area Code. The combination of the Base ID, MCC, and LAC uniquely identify a given base station 104.

| Bits | Octets |
|---|---|
| 8 7 6 5 4 3 2 1 | |
| 16 bits of Location Area Code | 1 |
|  | 2 |

TABLE 4-65.1.2

MCC

The MCC is a Mobility Country Code. The combination of the Base ID, MCC, MNC and LAC uniquely identify a given base station 104.

| Bits | Octets |
|---|---|
| 8 7 6 5 4 3 2 1 | |
| 16 bits of Mobility Country Code | 1 |
|  | 2 |

TABLE 4-65.1.3

MNC

The MNC is a Mobility Network Code. The combination of the Base ID, MCC, MNC and LAC uniquely identify a given base station 104.

| Bits | Octets |
|---|---|
| 8 7 6 5 4 3 2 1 | |
| 8 bits of Mobility Network Code | 1 |

The operation of Notes to communicate Information Elements comprising user and signaling data within the communication system 101 can be explained by way of example with respect to the "Base ID" Information Element shown in Table 4-13. The Base ID is a 32-bit Information Element uniquely identifying within a particular message or Note a specific base station 104. The Base ID Information Element may be communicated within the communication system in O-Notes, M-Notes, N-Notes and I-Notes. For example, the Base ID Information Element is contained within the "Circuit Switch Complete" N-Note shown in Table 3-9, the "Circuit Switch Complete" M-Note shown in Table 1-7, and the "CTCSC (Circuit Switch Complete)" O-Note shown in Table 2-10.

The operation of Notes to execute internal operations within the communication system 101 may be explained with respect to a process for switching communication paths for a mobile user station 102 within the communication system 101. Such a switch might occur, for example, when a user station 102 begins to leave a cell 106 for a first base station 104 with which it is communicating, and begins to enter a second cell 106 for a second base station 104. In that case, it may be desired to handoff communication with the user station 102 from the first base station 104 to the second base station 104.

Figure 13:
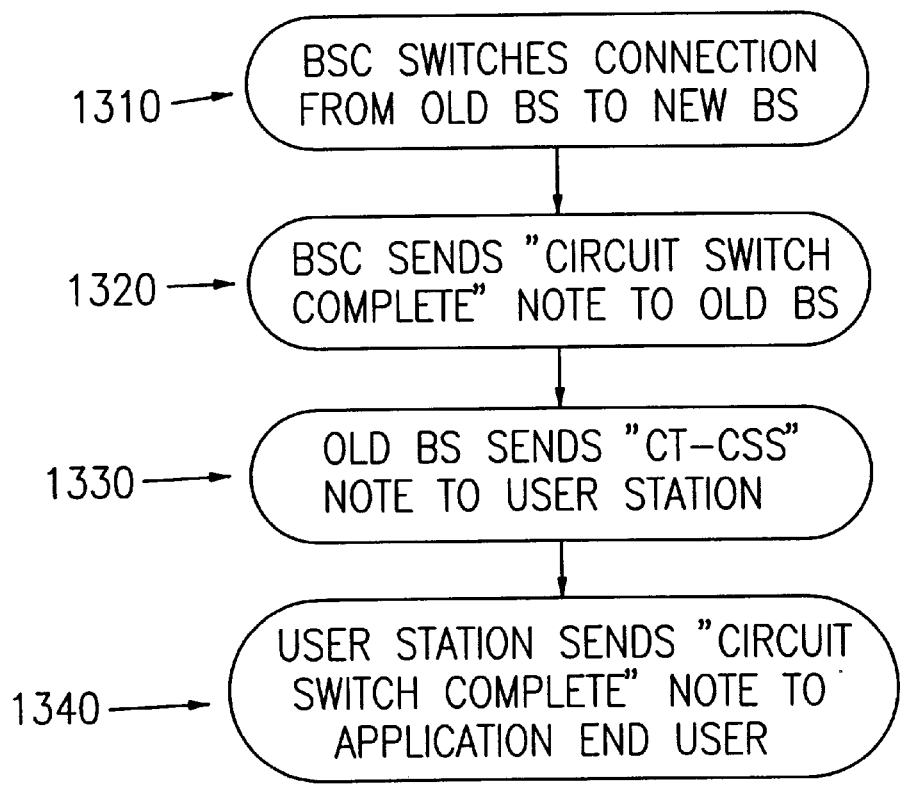
FIG. 13 is a diagram of a process for communicating signaling data among system components in a preferred mobile communication system.

FIG. 13 is a flowchart setting forth a procedure for communicating the completion of a handoff of a mobile user station 102 between a first base station 104 and a second base station 104 in the communication system 101, wherein the two base stations 104 are connected to the same base station controller 105.

In a first step 1310, the base station controller 105 initiates a process to switch the call connection from the first base station 104 to the second base station 104. In a next step 1320, the base station controller 105 communicates a Circuit Switch Complete N-Note across the N-Interface 620 between the base station controller 105 and the first base station 104. The format for the Circuit Switch Complete N-Note is given in Table 3-9 and includes an Information Element containing the Base ID of the second base station 104.

In a next step 1330, the base station 104 communicates a CT-CSC (Circuit Switch Complete) O-Note across an O-Interface 610 between the first base station 104 and the user station 102. The format for the CT-CSC (Circuit Switch Complete) O-Note is given in Table 2-10. As shown in Table 2-10, the CT-CSC (Circuit Switch Complete) O-Note passes along the Information Element for the Base ID of the second base station 104.

The CT-CSC (Circuit Switch Complete) O-Note passes some common Information Elements from the Circuit Switch Complete N-Note, such as the New Base ID and HRef (Handover Reference Number), to the mobile user station 102. By contrast, the base station 104 does not pass the PID (personal ID) Information Element to the mobile user station 102 in the O-Note, as the mobile user station 102 already knows its own PID. The PID which is contained in the N-Note is used by the base station 104 so that it can identify the particular user station 102 for which the base station controller 105 has completed a circuit switch. With the PID, the base station 104 can determine the proper slot within its polling loop for transmitting the O-Note containing a CT-CSC (Circuit Switch Complete) message.

Similarly, for each N-Note received from the base station controller 104 across the N-Interface, the base station 104 uses some Information Elements for its own internal operations, and passes other Information Elements along to the mobile user station 102.

In a next step 1340, the mobile user station 102 communicates a Circuit Switch Complete M-Note across an M-Interface 605 between the mobile communication transceiver in the user station 102 and an application end user hosted in the user station 102. The Circuit Switch Complete M-Note contains the Base ID Information Element. The Circuit Switch Complete M-Note also contains other Information Elements (e.g., BSC ID, Facility) added by the mobile communication transceiver 603 in the mobile user station 102. By contrast, the Circuit Switch Complete M-Note does not contain the HRef Information Element which is used by the mobile communication transceiver 603 to identify the particular handover request.

Technical Appendices

The disclosure herein is supplemented by material appearing in Technical Appendices A, B, C and D, hereby incorporated by reference as if set forth fully herein. No prior art admission is made with respect to the material appearing in any of the Technical Appendices.

Alternative Embodiments

While preferred embodiments are disclosed herein, many variations are possible which remain within the spirit and scope of the invention. Such variations would become clear to one of ordinary skill in the art after inspection of the specification, drawings and claims herein. The invention therefore is not to be restricted except by the scope of the appended claims.

What is claimed is:

1. A base station for wireless communication comprising:
   a transceiver;
   a transceiver controller coupled to the transceiver that receives signals from said transceiver and that transmits signals to said transceiver;
   a backhaul interface allowing communication with external systems;
   a backhaul interface processor in communication with said backhaul interface that receives signals from said backhaul interface and that transmits signals to the backhaul interface;
   a dual-port RAM that stores information written by said backhaul interface processor and said transceiver controller;
   a bus coupled so that said transceiver, said transceiver controller, said backhaul interface, said backhaul interface processor, and said dual-port RAM communicate utilizing said bus; and
   a global bus controller that regulates communication along said bus.

2. The base station of claim 1 wherein said dual-port RAM comprises a first area that stores information transmitted from said transceiver controller and addressed to said backhaul interface and a second area that stores information transmitted from said backhaul interface and addressed to said transceiver.

3. The base station of claim 2 wherein said second area comprises a plurality of second areas each corresponding to one user station of a plurality of user stations that communicate with said base station.

4. The base station of claim 3 wherein said first area comprises a plurality of first area each corresponding to one user station of said plurality of user stations.

5. The base station of claim 2 wherein said dual-port RAM further comprises a plurality of priority queues each priority queue of said priority queues assigned a priority level and each priority queue storing messages assigned a same priority level as said priority level assigned to said priority queue.

6. The base station of claim 5 wherein said plurality of priority queues are three in number.

7. The base station of claim 1 wherein messages transmitted between said user stations to said transceiver are in a first format, messages transmitted between said transceiver controller and said dual-port RAM are in a second format, and messages transmitted between said backhaul interface processor and said dual-port RAM are in a third format.

8. The base station of claim 1 wherein bearer data is transmitted from said backhaul interface processor to said transceiver controller without storage in said dual-port RAM and bearer data is transmitted from said transceiver controller to said backhaul interface processor without storage in said dual-port RAM.

9. The base station of claim 1 further comprising a base station controller coupled with said backhaul interface.

10. The base station of claim 1 wherein a message written into a first memory location of said dual-port RAM by said transceiver controller is read from said first memory location by said backhaul interface processor.

11. A base station comprising:
    a transceiver;
    a backhaul interface; and
    a memory coupled between said backhaul interface and said transceiver, said memory comprising a first area and a second area, wherein data written by said transceiver is stored in first memory locations of said first area and read from said first memory locations by said backhaul interface and wherein data written by said backhaul interface is stored in second memory locations of said second area and read from said second memory locations by said transceiver.

12. The base station of claim 11 wherein said memory comprises further comprises a plurality of priority queues each priority queue of said priority queues storing messages assigned a different predetermined priority level from each other of said priority queues.

13. The base station of claim 12 wherein said plurality of priority queues are three in number.

14. The base station of claim 11 wherein said second area comprises a plurality of second areas each corresponding to one user station of a plurality of user stations that communicate with said base station.

15. The base station of claim 13 wherein said first area comprises a plurality of first area each corresponding to one user station of said plurality of user stations.

16. The base station of claim 11 wherein said backhaul interface comprises a backhaul interface processor.

17. The base station of claim 11 wherein said transceiver comprises an over-the-air transceiver and an over-the-air processor.

18. The base station of claim 11 further comprising:
    a bus coupled so that said transceiver and said backhaul interface and said memory communicate across said bus; and
    a global bus controller that regulates communication along said bus.

19. The base station of claim 11 wherein messages transmitted between said user stations to said transceiver are in a first format, messages transmitted between said transceiver and said memory are in a second format, and messages transmitted between said backhaul interface and said memory are in a third format.

20. A method for transferring information within a base station utilized for wireless communication comprising:
    writing data by a transceiver into a first memory location in an area of memory reserved for writing by said transceiver; and
    reading said data written by said transceiver from said first memory location by a backhaul interface.

21. The method of claim 20 further comprising the steps of
    writing data by said backhaul interface into a second memory location in an area of said memory reserved for writing by said backhaul interface, said second memory location being distinct from said first memory location; and
    reading said data written by said backhaul interface from said second memory location by said transceiver.

22. The method of claim 21 wherein said first memory location is part of a first area of said memory reserved for data transmitted by said transceiver and destined for said backhaul interface and said second memory location is part of a second area reserved for data transmitted by said backhual interface and destined for said transceiver.

23. The method of claim 20 wherein said transceiver and said backhaul interface read and write data along a same bus.

24. The method of claim 20 further comprising a step of receiving by said transceiver a message from said user station, said message comprising said data written by said transceiver into said first memory location.

* * * * *